(12) United States Patent
Munoz et al.

(10) Patent No.: US 12,126,982 B2
(45) Date of Patent: Oct. 22, 2024

(54) SOUND FIELD ADJUSTMENT

(71) Applicant: QUALCOMM Incorporated, San Diego, CA (US)

(72) Inventors: Isaac Garcia Munoz, San Diego, CA (US); Nils Gunther Peters, San Diego, CA (US); Vinay Melkote Krishnaprasad, Bangalore (IN); Andre Schevciw, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 17/360,895

(22) Filed: Jun. 28, 2021

(65) Prior Publication Data

US 2021/0409887 A1 Dec. 30, 2021

Related U.S. Application Data

(60) Provisional application No. 63/053,331, filed on Jul. 17, 2020, provisional application No. 63/045,297, filed on Jun. 29, 2020.

(51) Int. Cl.
*H04S 1/00* (2006.01)
*G06F 3/16* (2006.01)
(Continued)

(52) U.S. Cl.
CPC .............. *H04S 1/007* (2013.01); *G06F 3/165* (2013.01); *H04L 65/70* (2022.05); *H04L 65/75* (2022.05);
(Continued)

(58) Field of Classification Search
CPC ... H04S 1/007; H04S 1/00; H04S 7/30; H04S 7/00; H04S 7/303; H04S 7/304;
(Continued)

(56) References Cited

U.S. PATENT DOCUMENTS 6,721,280 B1\* 4/2004 Mauro ................. H04L 1/0014
704/E19.041
11,218,773 B2 1/2022 Gilson et al.
(Continued)

FOREIGN PATENT DOCUMENTS

EP 3076609 A1 10/2016
WO 2019012133 A1 1/2019

OTHER PUBLICATIONS

Peters N., et al., "Scene-Based Audio Implemented with Higher Order Ambisonics (HOA)", SMPTE 2015 Annual Technical Conference & Exhibition, Oct. 26, 2015, URL: http://ieeexplore.IEEE.org/stampPDF/getPDF.jsp? p=&arnumber=7399639. [Retrieved on Dec. 9, 2016], Abstract, Section "Layered Coding with HOA" starting on p. 9, Section "Decoding of Scene-based Audio" Starting on p. 9, Section "Headphone Rendering-Binauralization" starting on p. 11; Section "Conclusion" on p. 12, pp. 1-13.
(Continued)

*Primary Examiner* — Leshui Zhang
(74) *Attorney, Agent, or Firm* — QUALCOMM Incorporated; Espartaco Diaz Hidalgo

(57) ABSTRACT

A device includes one or more processors configured to obtain sound information from an audio source. The one or more processors are further configured to select, based on a latency criterion associated with a playback device, a compression mode in which a representation of the sound information is compressed prior to transmission to the playback device or a bypass mode in which the representation of the sound information is not compressed prior to transmission to the playback device. The one or more processors are further configured to generate audio data that includes, based on the selected one of the compression mode or the bypass mode, a compressed representation of the sound information or an uncompressed representation of the sound information. The one or more processors are also
(Continued)

configured to send the audio data as streaming data, via wireless transmission, to the playback device.

27 Claims, 33 Drawing Sheets

(51) Int. Cl.
| | |
|---|---|
| H04L 65/70 | (2022.01) |
| H04L 65/75 | (2022.01) |
| H04R 3/00 | (2006.01) |
| H04R 3/12 | (2006.01) |
| H04R 5/033 | (2006.01) |
| H04R 5/04 | (2006.01) |
| H04S 7/00 | (2006.01) |

(52) U.S. Cl.
CPC .............. *H04R 3/00* (2013.01); *H04R 3/12* (2013.01); *H04R 5/033* (2013.01); *H04R 5/04* (2013.01); *H04S 7/30* (2013.01); *H04S 7/304* (2013.01); *H04R 2420/07* (2013.01); *H04S 2420/01* (2013.01); *H04S 2420/11* (2013.01)

(58) Field of Classification Search
CPC ... H04S 2420/01; H04S 2420/11; H04R 3/00; H04R 3/12; H04R 5/033; H04R 5/04; H04R 27/00; H04R 2420/07; H04R 2460/07; H04R 29/001; H04R 29/00; G06F 3/162; G06F 3/165; G06F 3/16; G06F 3/1454; G06F 15/16; G10L 19/008; G10L 19/00; G10L 19/002; G10L 19/038; H04L 65/70; H04L 65/75; H04L 65/612; H04L 65/752; H04N 19/105; H04N 19/30; H04N 19/172; H04N 19/33; H04N 19/597; H04N 19/50; H04N 19/00; H04N 21/254327; H04H 20/89
USPC ......... 704/500–504; 381/1–23, 300–311, 26, 381/27, 56, 61, 63, 74, 77–85, 86, 381/98–110, 111, 118, 119, 123; 700/94
See application file for complete search history.

(56) References Cited

U.S. PATENT DOCUMENTS

| | | | |
|---|---|---|---|
| 11,395,084 B2 | 7/2022 | Kordon et al. | |
| 2011/0145442 A1* | 6/2011 | Diab | H04N 7/15 709/247 |
| 2014/0016786 A1* | 1/2014 | Sen | H04S 3/008 381/23 |
| 2014/0025386 A1* | 1/2014 | Xiang | G10L 19/00 704/500 |
| 2015/0163615 A1* | 6/2015 | Boehm | H04S 3/008 381/1 |
| 2015/0264484 A1* | 9/2015 | Peters | G10L 19/008 381/17 |
| 2018/0243341 A1* | 8/2018 | June | A61K 35/17 |
| 2018/0268827 A1 | 9/2018 | Kordon et al. | |
| 2019/0007781 A1* | 1/2019 | Peters | G06F 3/167 |
| 2019/0349662 A1* | 11/2019 | Lindahl | H04R 3/12 |
| 2020/0094141 A1* | 3/2020 | Fersch | H04S 7/303 |
| 2021/0098004 A1 | 4/2021 | Sen et al. | |
| 2021/0409886 A1 | 12/2021 | Schevciw | |
| 2021/0409888 A1 | 12/2021 | Schevciw | |
| 2022/0262373 A1 | 8/2022 | Sen et al. | |

OTHER PUBLICATIONS

Shankar S., et al., "Efficient Compelling, and Immersive VR Audio Experience Using Scene Based Audio/Higher Order Ambisonics", CONFERENCE: 2016 AES International Conference on Audio For Virtual And Augmented Reality, Sep. 30-Oct. 1, 2016, Sections 7. 8. 10, figure 2, pp. 1-10.
Partial International Search Report—PCT/US21/39599—ISA/EPO—Nov. 2, 2021, pp. 1-17.
International Search Report and Written Opinion—PCT/US2021/039599—ISA/EPO—Feb. 28, 2022.

* cited by examiner

SOUND FIELD ADJUSTMENT

I. CROSS-REFERENCE TO RELATED APPLICATIONS

The present application claims priority from Provisional Patent Application No. 63/045,297, filed Jun. 29, 2020, entitled "SOUND FIELD ADJUSTMENT," and from Provisional Patent Application No. 63/053,331, filed Jul. 17, 2020, entitled "SOUND FIELD ADJUSTMENT," the content of each of which is incorporated herein by reference in its entirety.

II. FIELD

The present disclosure is generally related to adjusting sound fields.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

One application of such devices includes providing wireless immersive audio to a user. As an example, a headphone device worn by a user can receive streaming audio data from a remote server for playback to the user. To illustrate, the headphone device detects a rotation of the user's head and transmits head tracking information to the remote server. The remote server updates an audio scene based on the head tracking information, generates binaural audio data based on the updated audio scene, and transmits the binaural audio data to the headphone device for playback to the user.

Performing audio scene updates and binauralization at the remote server enables the user to experience an immersive audio experience via a headphone device that has relatively limited processing resources. However, due to latencies associated with transmitting the head tracking information to the remote server, updating the audio data based on the head rotation, and transmitting the updated binaural audio data to the headphone device, such a system can result in an unnaturally high motion-to-sound latency. In other words, the time delay between the rotation of the user's head and the corresponding modified spatial audio being played out at the user's ears can be unnaturally long, which may diminish the user's experience.

IV. SUMMARY

According to a particular implementation of the techniques disclosed herein, a device includes one or more processors configured to obtain sound information from an audio source. The one or more processors are further configured to select, based on a latency criterion associated with a playback device, a compression mode in which a representation of the sound information is compressed prior to transmission to the playback device or a bypass mode in which the representation of the sound information is not compressed prior to transmission to the playback device. The one or more processors are further configured to generate audio data that includes, based on the selected one of the compression mode or the bypass mode, a compressed representation of the sound information or an uncompressed representation of the sound information. The one or more processors are also configured to send the audio data as streaming data, via wireless transmission, to the playback device.

According to a particular implementation of the techniques disclosed herein, a method includes obtaining sound information from an audio source and selecting, based on a latency criterion associated with a playback device, a compression mode in which a representation of the sound information is compressed prior to transmission to the playback device or a bypass mode in which the representation of the sound information is not compressed prior to transmission to the playback device. The method also includes generating audio data that includes, based on the selected one of the compression mode or the bypass mode, a compressed representation of the sound information or an uncompressed representation of the sound information. The method further includes sending the audio data as streaming data, via wireless transmission, to the playback device.

According to a particular implementation of the techniques disclosed herein, an apparatus includes means for obtaining sound information from an audio source. The apparatus also includes means for selecting, based on a latency criterion associated with a playback device, a compression mode in which a representation of the sound information is compressed prior to transmission to the playback device or a bypass mode in which the representation of the sound information is not compressed prior to transmission to the playback device. The apparatus further includes means for generating audio data that includes, based on the selected one of the compression mode or the bypass mode, a compressed representation of the sound information or an uncompressed representation of the sound information. The apparatus also includes means for sending the audio data as streaming data, via wireless transmission, to the playback device.

According to a particular implementation of the techniques disclosed herein, a non-transitory computer-readable medium comprising instructions that, when executed by one or more processors, cause the one or more processors to obtain sound information from an audio source. The instructions, when executed, also cause the one or more processors to select, based on a latency criterion associated with a playback device, a compression mode in which a representation of the sound information is compressed prior to transmission to the playback device or a bypass mode in which the representation of the sound information is not compressed prior to transmission to the playback device. The instructions, when executed, further cause the one or more processors to generate audio data that includes, based on the selected one of the compression mode or the bypass mode, a compressed representation of the sound information or an uncompressed representation of the sound information. The instructions, when executed, also cause the one or more processors to send the audio data as streaming data, via wireless transmission, to the playback device.

According to another particular implementation of the techniques disclosed herein, a device includes one or more processors configured to receive, via wireless transmission from a playback device, data associated with a pose of the playback device. The one or more processors are also configured to select, based on the data, a particular representation of a sound field from a plurality of representations of the sound field. Each respective representation of the sound field corresponds to a different sector of a set of sectors. A sector represents a range of values associated with movement of the playback device. The one or more processors are further configured to generate audio data corresponding to the selected representation of the sound field. one or more processors are also configured to send, via wireless transmission, the audio data as streaming data to the playback device.

According to another particular implementation of the techniques disclosed herein, a method includes receiving, at a device via wireless transmission from a playback device, data associated with a pose of the playback device. The method also includes selecting, based on the data, a particular representation of a sound field from a plurality of representations of the sound field. Each respective representation of the sound field corresponds to a different sector of a set of sectors. A sector represents a range of values associated with movement of the playback device. The method further includes generating, at the device, audio data corresponding to the selected representation of the sound field. The method also includes sending, via wireless transmission, the audio data as streaming data from the device to the playback device.

According to another particular implementation of the techniques disclosed herein, a non-transitory computer-readable storage medium stores instructions that, when executed by one or more processors, cause the one or more processors to receive, via wireless transmission from a playback device, data associated with a pose of the playback device. The instructions, when executed by the one or more processors, also cause the one or more processors to select, based on the data, a particular representation of a sound field from a plurality of representations of the sound field. Each respective representation of the sound field corresponds to a different sector of a set of sectors. A sector represents a range of values associated with movement of the playback device. The instructions, when executed by the one or more processors, further cause the one or more processors to generate audio data corresponding to the selected representation of the sound field. The instructions, when executed by the one or more processors, also cause the one or more processors to send, via wireless transmission, the audio data as streaming data to the playback device.

According to another particular implementation of the techniques disclosed herein, an apparatus includes means for receiving, via wireless transmission from a playback device, data associated with a pose of the playback device. The apparatus also includes means for selecting, based on the data, a particular representation of a sound field from a plurality of representations of the sound field. Each respective representation of the sound field corresponds to a different sector of a set of sectors. A sector represents a range of values associated with movement of the playback device. The apparatus further includes means for generating audio data corresponding to the selected representation of the sound field. The apparatus also includes means for sending, via wireless transmission, the audio data as streaming data to the playback device.

According to another particular implementation of the techniques disclosed herein, a device includes one or more processors configured to receive, via wireless transmission from a streaming device, encoded ambisonics audio data representing a sound field. The one or more processors are also configured to perform decoding of the ambisonics audio data to generate decoded ambisonics audio data. The decoding of the ambisonics audio data includes base layer decoding of a base layer of the encoded ambisonics audio data and selectively includes enhancement layer decoding in response to an amount of movement of the device. The one or more processors are further configured to adjust the decoded ambisonics audio data to alter the sound field based on data associated with at least one of a translation or an orientation associated with the movement of the device. The one or more processors are also configured to output the adjusted decoded ambisonics audio data to two or more loudspeakers for playback.

According to another particular implementation of the techniques disclosed herein, a method includes receiving, at a device via wireless transmission from a streaming device, encoded ambisonics audio data representing a sound field. The method also includes performing, at the device, decoding of the ambisonics audio data to generate decoded ambisonics audio data. The decoding of the ambisonics audio data includes base layer decoding of a base layer of the encoded ambisonics audio data and selectively includes enhancement layer decoding in response to an amount of movement of the device. The method further includes adjusting, at the device, the decoded ambisonics audio data to alter the sound field based on data associated with at least one of a translation or an orientation associated with the movement of the device. The method also includes outputting the adjusted decoded ambisonics audio data from the device to two or more loudspeakers for playback.

According to another particular implementation of the techniques disclosed herein, a non-transitory computer-readable storage medium stores instructions that, when executed by one or more processors, cause the one or more processors to receive, via wireless transmission from a streaming device, encoded ambisonics audio data representing a sound field. The instructions, when executed by the one or more processors, also cause the one or more processors to perform decoding of the ambisonics audio data to generate decoded ambisonics audio data. The decoding of the ambisonics audio data includes base layer decoding of a base layer of the encoded ambisonics audio data and selectively includes enhancement layer decoding in response to an amount of movement of the device. The instructions, when executed by the one or more processors, further cause the one or more processors to adjust the decoded ambisonics audio data to alter the sound field based on data associated with at least one of a translation or an orientation associated with the movement of the device. The instructions, when executed by the one or more processors, also cause the one or more processors to output the adjusted decoded ambisonics audio data to two or more loudspeakers for playback.

An apparatus includes means for receiving, via wireless transmission from a streaming device, encoded ambisonics audio data representing a sound field. The apparatus also includes means for performing decoding of the ambisonics audio data to generate decoded ambisonics audio data. The decoding of the ambisonics audio data includes base layer decoding of a base layer of the encoded ambisonics audio data and selectively includes enhancement layer decoding in response to an amount of movement of the device. The apparatus further includes means for adjusting the decoded ambisonics audio data to alter the sound field based on data associated with at least one of a translation or an orientation associated with the movement of the device. The apparatus also includes means for outputting the adjusted decoded ambisonics audio data to two or more loudspeakers for playback.

According to a particular implementation of the techniques disclosed herein, a device includes one or more processors configured to receive, via wireless transmission, compressed audio data representing a sound field and to decompress the compressed audio data. The one or more processors are also configured to adjust the decompressed audio data to alter the sound field based on data associated with at least one of a translation or an orientation associated with movement of a device, to render the adjusted decompressed audio data into two or more loudspeaker gains to drive two or more loudspeakers, and to output the adjusted decompressed audio data to the two or more loudspeakers for playback.

According to another particular implementation of the techniques disclosed herein, a method includes receiving, at one or more processors via wireless transmission, compressed audio data representing a sound field and decompressing the compressed audio data. The method also includes adjusting the decompressed audio data to alter the sound field based on data associated with at least one of a translation or an orientation associated with movement of a device, rendering the adjusted decompressed audio data into two or more loudspeaker gains to drive two or more loudspeakers, and outputting the adjusted decompressed audio data to the two or more loudspeakers for playback.

According to another particular implementation of the techniques disclosed herein, a non-transitory computer-readable medium includes instructions that, when executed by one or more processors, cause the one or more processors to receive, via wireless transmission, compressed audio data representing a sound field and to decompress the compressed audio data. The instructions, when executed by the one or more processors, also cause the one or more processors to adjust the decompressed audio data to alter the sound field based on data associated with at least one of a translation or an orientation associated with movement of a device, to render the adjusted decompressed audio data into two or more loudspeaker gains to drive two or more loudspeakers, and to output the adjusted decompressed audio data to the two or more loudspeakers for playback.

According to another particular implementation of the techniques disclosed herein, an apparatus includes means for receiving, at one or more processors via wireless transmission, compressed audio data representing a sound field and means for decompressing the compressed audio data. The apparatus also includes means for adjusting the decompressed audio data to alter the sound field based on data associated with at least one of a translation or an orientation associated with movement of a device, means for rendering the adjusted decompressed audio data into two or more loudspeaker gains to drive two or more loudspeakers, and means for outputting the adjusted decompressed audio data to the two or more loudspeakers for playback.

According to a particular implementation of the techniques disclosed herein, a device includes one or more processors configured to receive sound information from an audio source and to receive translation data from a playback device. The translation data corresponds to a translation associated with the playback device. The one or more processors are also configured to convert the sound information to audio data that represents a sound field based on the translation, and to send the audio data as streaming data, via wireless transmission, to the playback device.

According to another particular implementation of the techniques disclosed herein, a method includes receiving sound information from an audio source and receiving translation data from a playback device. The translation data corresponds to a translation associated with the playback device. The method also includes converting the sound information to audio data that represents a sound field based on the translation and sending the audio data as streaming data, via wireless transmission, to the playback device.

According to another particular implementation of the techniques disclosed herein, a non-transitory computer-readable medium includes instructions that, when executed by one or more processors, cause the one or more processors to receive sound information from an audio source and to receive translation data from a playback device. The translation data corresponds to a translation associated with the playback device. The instructions, when executed by the one or more processors, also cause the one or more processors to convert the sound information to audio data that represents a sound field based on the translation and to send the audio data as streaming data, via wireless transmission, to the playback device.

According to another particular implementation of the techniques disclosed herein, an apparatus includes means for receiving sound information from an audio source and means for receiving translation data from a playback device. The translation data corresponds to a translation associated with the playback device. The apparatus also includes means for converting the sound information to audio data that represents a sound field based on the translation and means for sending the audio data as streaming data, via wireless transmission, to the playback device.

According to a particular implementation of the techniques disclosed herein, a device includes one or more processors configured to obtain data, at a plurality of time instances, associated with tracking location and an orientation associated with movement of the device, and to send the data, via wireless transmission, to a remote device. The one or more processors are further configured to receive, via wireless transmission from the remote device, compressed audio data representing a sound field, and to decompress the compressed audio data representing the sound field. The one or more processors are also configured to adjust the decompressed audio data to alter the sound field based on the orientation associated with the device and output the adjusted decompressed audio data to two or more loudspeakers.

According to another particular implementation of the techniques disclosed herein, a method includes obtaining data, at a plurality of time instances, associated with tracking location and an orientation associated with movement of a device and sending the data, via wireless transmission, to a remote device. The method further includes receiving, via wireless transmission from the remote device, compressed audio data representing a sound field and decompressing the compressed audio data representing the sound field. The method also includes adjusting the decompressed audio data to alter the sound field based on the orientation associated with the device and outputting the adjusted decompressed audio data to two or more loudspeakers.

According to another particular implementation of the techniques disclosed herein, a non-transitory computer-readable medium includes instructions that, when executed by one or more processors, cause the one or more processors to obtain data, at a plurality of time instances, associated with tracking location and an orientation associated with movement of a device, and to send the data, via wireless transmission, to a remote device. The instructions, when executed by the one or more processors, further cause the one or more processors to receive, via wireless transmission from the remote device, compressed audio data representing a sound field, and to decompress the compressed audio data representing the sound field. The instructions, when executed by the one or more processors, also cause the one or more processors to adjust the decompressed audio data to alter the sound field based on the orientation associated with the device and to output the adjusted decompressed audio data to two or more loudspeakers.

According to another particular implementation of the techniques disclosed herein, an apparatus includes means for obtaining data, at a plurality of time instances, associated with tracking location and an orientation associated with movement of the apparatus and means for sending the data, via wireless transmission, to a remote device. The apparatus further includes means for receiving, via wireless transmission from the remote device, compressed audio data representing a sound field, and means for decompressing the compressed audio data representing the sound field. The apparatus also includes means for adjusting the decompressed audio data to alter the sound field based on the orientation associated with the apparatus, and means for outputting the adjusted decompressed audio data to two or more loudspeakers.

According to a particular implementation of the techniques disclosed herein, a device includes one or more processors configured to receive sound information from an audio source and to receive, from a playback device, data corresponding to locations associated with the playback device at a plurality of time instances. The one or more processors are also configured to convert the sound information to audio data that represents a sound field based on the data corresponding to the locations associated with the playback device and to send the audio data as streaming data, via wireless transmission, to one or both of the playback device or a second device that is coupled to the playback device.

According to another particular implementation of the techniques disclosed herein, a method includes receiving sound information from an audio source and receiving, from a playback device, data corresponding to locations associated with the playback device at a plurality of time instances. The method also includes converting the sound information to audio data that represents a sound field based on the data corresponding to the locations associated with the playback device and sending the audio data as streaming data, via wireless transmission, to one or both of the playback device or a second device that is coupled to the playback device.

According to another particular implementation of the techniques disclosed herein, a non-transitory computer-readable medium includes instructions that, when executed by one or more processors, cause the one or more processors to receive sound information from an audio source and to receive, from a playback device, data corresponding to locations associated with the playback device at a plurality of time instances. The instructions, when executed by the one or more processors, also cause the one or more processors to convert the sound information to audio data that represents a sound field based on the data corresponding to the locations associated with the playback device, and to send the audio data as streaming data, via wireless transmission, to one or both of the playback device or a second device that is coupled to the playback device.

According to another particular implementation of the techniques disclosed herein, an apparatus includes means for receiving sound information from an audio source and means for receiving, from a playback device, data corresponding to locations associated with the playback device at a plurality of time instances. The apparatus further includes means for converting the sound information to audio data that represents a sound field based on the data corresponding to the locations associated with the playback device. The apparatus also includes means for sending the audio data as streaming data, via wireless transmission, to one or both of the playback device or a second device that is coupled to the playback device.

According to a particular implementation of the techniques disclosed herein, a device includes one or more processors configured to receive, from a streaming device, compressed audio data that represents a sound field. The one or more processors are also configured to receive, from a playback device, data corresponding to locations associated with the playback device at a plurality of time instances and to generate a predicted location of the device based on the data corresponding to the locations associated with the playback device. The predicted location indicates a prediction of where the playback device will be when the audio data is played out at the playback device. The one or more processors are further configured to decompress the compressed audio data, to adjust the decompressed audio data to translate the sound field based on the predicted location, to compress the adjusted audio data, and to send the compressed adjusted audio data as streaming data, via wireless transmission, to the playback device.

According to another particular implementation of the techniques disclosed herein, a method includes receiving, from a streaming device, compressed audio data that represents a sound field. The method further includes receiving, from a playback device, data corresponding to locations associated with the playback device at a plurality of time instances and generating a predicted location of the device based on the data corresponding to the locations associated with the playback device. The predicted location indicates a prediction of where the playback device will be when the audio data is played out at the playback device. The method also includes decompressing the compressed audio data, adjusting the decompressed audio data to translate the sound field based on the predicted location, compressing the adjusted audio data, and sending the compressed adjusted audio data as streaming data, via wireless transmission, to the playback device.

According to another particular implementation of the techniques disclosed herein, a non-transitory computer-readable medium includes instructions that, when executed by one or more processors, cause the one or more processors to receive, from a streaming device, compressed audio data that represents a sound field. The instructions, when executed by the one or more processors, further cause the one or more processors to receive, from a playback device, data corresponding to locations associated with the playback device at a plurality of time instances and to generate a predicted location of the playback device based on the data corresponding to the locations associated with the playback device. The predicted location indicates a prediction of where the playback device will be when the audio data is played out at the playback device. The instructions, when executed by the one or more processors, also cause the one or more processors to decompress the compressed audio data, to adjust the decompressed audio data to translate the sound field based on the predicted location, to compress the adjusted audio data, and to send the compressed adjusted audio data as streaming data, via wireless transmission, to the playback device.

According to another particular implementation of the techniques disclosed herein, an apparatus includes means for receiving, from a streaming device, compressed audio data that represents a sound field. The apparatus further includes means for receiving, from a playback device, data corresponding to locations associated with the playback device at a plurality of time instances and means for generating a predicted location of the device based on the data corresponding to the locations associated with the playback device. The predicted location indicates a prediction of where the playback device will be when the audio data is played out at the playback device. The apparatus also includes means for decompressing the compressed audio data, means for adjusting the decompressed audio data to translate the sound field based on the predicted location, means for compressing the adjusted audio data, and means for sending the compressed adjusted audio data as streaming data, via wireless transmission, to the playback device.

According to a particular implementation of the techniques disclosed herein, a device includes one or more processors configured to receive, via wireless transmission from a streaming device, compressed audio data corresponding to a first representation of a sound field. The first representation corresponds to a first viewport field of view associated with a first pose of the device. The one or more processors are also configured to decompress the compressed audio data and to output the decompressed audio data to two or more loudspeakers. The one or more processors are further configured to send, to the streaming device, data associated with a second pose of the device and to receive compressed updated audio data from the streaming device. The compressed updated audio data corresponds to a second representation of the sound field. The second representation corresponds to a second viewport field of view that partially overlaps the first viewport field of view and that is associated with the second pose. The one or more processors are also configured to decompress the compressed updated audio data and to output the decompressed updated audio data to the two or more loudspeakers According to another particular implementation of the techniques disclosed herein, a method includes receiving, at one or more processors of a device and via wireless transmission from a streaming device, compressed audio data corresponding to a first representation of a sound field. The first representation corresponds to a first viewport field of view associated with a first pose of the device. The method also includes decompressing the compressed audio data and outputting the decompressed audio data to two or more loudspeakers. The method further includes sending, to the streaming device, data associated with a second pose of the device and receiving compressed updated audio data from the streaming device. The compressed updated audio data corresponds to a second representation of the sound field. The second representation corresponds to a second viewport field of view that partially overlaps the first viewport field of view and that is associated with the second pose. The method also includes decompressing the compressed updated audio data and outputting the decompressed updated audio data to the two or more loudspeakers.

According to another particular implementation of the techniques disclosed herein, a non-transitory computer-readable medium includes instructions that, when executed by one or more processors, cause the one or more processors to receive, via wireless transmission from a streaming device, compressed audio data corresponding to a first representation of a sound field. The first representation corresponds to a first viewport field of view associated with a first pose of a device. The instructions, when executed by the one or more processors, also cause the one or more processors to decompress the compressed audio data and to output the decompressed audio data to two or more loudspeakers. The instructions, when executed by the one or more processors, further cause the one or more processors to send, to the streaming device, data associated with a second pose of the device and to receive compressed updated audio data from the streaming device. The compressed updated audio data corresponds to a second representation of the sound field. The second representation corresponds to a second viewport field of view that partially overlaps the first viewport field of view and that is associated with the second pose. The instructions, when executed by the one or more processors, also cause the one or more processors to decompress the compressed updated audio data and to output the decompressed updated audio data to the two or more loudspeakers.

According to another particular implementation of the techniques disclosed herein, an apparatus includes means for receiving, via wireless transmission from a streaming device, compressed audio data corresponding to a first representation of a sound field, the first representation corresponding to a first viewport field of view associated with a first pose of a device. The apparatus also includes means for decompressing the compressed audio data and means for outputting the decompressed audio data to two or more loudspeakers. The apparatus further includes means for sending, to the streaming device, data associated with a second pose of the device and means for receiving compressed updated audio data from the streaming device. The compressed updated audio data corresponds to a second representation of the sound field. The second representation corresponds to a second viewport field of view that partially overlaps the first viewport field of view and that is associated with the second pose. The apparatus also includes means for decompressing the compressed updated audio data and means for outputting the decompressed updated audio data to the two or more loudspeakers.

According to a particular implementation of the techniques disclosed herein, a device includes one or more processors configured to receive, via wireless transmission from a playback device, data associated with a pose of the playback device and to select, based on the data, a particular representation of a sound field from a plurality of representations of the sound field. Each respective representation of the sound field corresponds to a different viewport field of view of a set of multiple overlapping viewport fields of view. The one or more processors are also configured to generate compressed audio data corresponding to the selected representation of the sound field and to send, via wireless transmission, the compressed audio data as streaming data to the playback device.

According to another particular implementation of the techniques disclosed herein, a method includes receiving, at one or more processors of a streaming device and via wireless transmission from a playback device, data associated with a pose of the playback device. The method further includes selecting, based on the data, a particular representation of a sound field from a plurality of representations of the sound field. Each respective representation of the sound field corresponds to a different viewport field of view of a set of multiple overlapping viewport fields of view. The method also includes generating compressed audio data corresponding to the selected representation of the sound field and sending, via wireless transmission, the compressed audio data as streaming data to the playback device.

According to another particular implementation of the techniques disclosed herein, a non-transitory computer-readable medium includes instructions that, when executed by one or more processors, cause the one or more processors to receive, via wireless transmission from a playback device, data associated with a pose of the playback device. The instructions, when executed by the one or more processors, further cause the one or more processors to select, based on the data, a particular representation of a sound field from a plurality of representations of the sound field. Each respective representation of the sound field corresponds to a different viewport field of view of a set of multiple overlapping viewport fields of view. The instructions, when executed by the one or more processors, also cause the one or more processors to generate compressed audio data corresponding to the selected representation of the sound field and to send, via wireless transmission, the compressed audio data as streaming data to the playback device.

According to another particular implementation of the techniques disclosed herein, an apparatus includes means for receiving, via wireless transmission from a playback device, data associated with a pose of the playback device. The apparatus further includes means for selecting, based on the data, a particular representation of a sound field from a plurality of representations of the sound field. Each respective representation of the sound field corresponds to a different viewport field of view of a set of multiple overlapping viewport fields of view. The apparatus also includes means for generating compressed audio data corresponding to the selected representation of the sound field and means for sending, via wireless transmission, the compressed audio data as streaming data to the playback device.

According to a particular implementation of the techniques disclosed herein, a device includes one or more processors configured to receive, via wireless transmission from a streaming device, encoded ambisonics audio data representing a sound field. The one or more processors are further configured to perform decoding of the encoded ambisonics audio data to generate decoded ambisonics audio data. The decoding of the encoded ambisonics audio data includes base layer decoding of a base layer of the encoded ambisonics audio data and selectively includes enhancement layer decoding in response to detecting that the encoded ambisonics audio data includes at least one encoded enhancement layer. The one or more processors are also configured to adjust the decoded ambisonics audio data to alter the sound field based on data associated with at least one of a translation or an orientation associated with movement of the device and output the adjusted decoded ambisonics audio data to two or more loudspeakers for playback.

According to another particular implementation of the techniques disclosed herein, a method includes receiving, at one or more processors of a device and via wireless transmission from a streaming device, encoded ambisonics audio data representing a sound field. The method further includes performing decoding of the encoded ambisonics audio data to generate decoded ambisonics audio data. The decoding of the encoded ambisonics audio data includes performing base layer decoding of a base layer of the encoded ambisonics audio data and selectively performing enhancement layer decoding based on detecting that the encoded ambisonics audio data includes at least one encoded enhancement layer. The method also includes adjusting the decoded ambisonics audio data to alter the sound field based on data associated with at least one of a translation or an orientation associated with movement of the device and outputting the adjusted decoded ambisonics audio data to two or more loudspeakers for playback.

According to another particular implementation of the techniques disclosed herein, a non-transitory computer-readable medium includes instructions that, when executed by one or more processors, cause the one or more processors to receive, via wireless transmission from a streaming device, encoded ambisonics audio data representing a sound field. The instructions, when executed by the one or more processors, further cause the one or more processors to perform decoding of the encoded ambisonics audio data to generate decoded ambisonics audio data. The decoding of the encoded ambisonics audio data includes base layer decoding of a base layer of the encoded ambisonics audio data and selectively includes enhancement layer decoding based on detecting that the encoded ambisonics audio data includes at least one encoded enhancement layer. The instructions, when executed by the one or more processors, also cause the one or more processors to adjust the decoded ambisonics audio data to alter the sound field based on data associated with at least one of a translation or an orientation associated with movement of a device and to output the adjusted decoded ambisonics audio data to two or more loudspeakers for playback.

According to another particular implementation of the techniques disclosed herein, an apparatus includes means for receiving, via wireless transmission from a streaming device, encoded ambisonics audio data representing a sound field. The apparatus also includes means for performing base layer decoding of a base layer of the encoded ambisonics audio data and means for selectively performing enhancement layer decoding based on detecting that the encoded ambisonics audio data includes at least one encoded enhancement layer. The apparatus further includes means for adjusting decoded ambisonics audio data to alter the sound field based on data associated with at least one of a translation or an orientation associated with movement of a device. The apparatus also includes means for outputting the adjusted decoded ambisonics audio data to two or more loudspeakers for playback.

According to another particular implementation of the techniques disclosed herein a device includes one or more processors configured to receive, via wireless transmission from a playback device, first data associated with a first pose of the playback device, the first pose associated with a first number of sound sources in a sound scene, to generate a first frame of encoded ambisonics audio data that corresponds to a base layer encoding of the sound scene and to send the first frame to the playback device. The one or more processors are also configured to receive, via wireless transmission from the playback device, second data associated with a second pose of the playback device, the second pose associated with a second number of sound sources in the sound scene, the second number greater than the first number, to generate a second frame of encoded ambisonics audio data that corresponds to an enhancement layer encoding of the sound scene, and to send the second frame to the playback device.

According to another particular implementation of the techniques disclosed herein, a method includes receiving, via wireless transmission from a playback device, first data associated with a first pose of the playback device, the first pose associated with a first number of sound sources in a sound scene, generating a first frame of encoded ambisonics audio data that corresponds to a base layer encoding of the sound scene, and sending the first frame to the playback device. The method also includes receiving, via wireless transmission from the playback device, second data associated with a second pose of the playback device, the second pose associated with a second number of sound sources in the sound scene, the second number greater than the first number, generating a second frame of encoded ambisonics audio data that corresponds to an enhancement layer encoding of the sound scene, and sending the second frame to the playback device.

According to another particular implementation of the techniques disclosed herein, a non-transitory computer-readable medium includes instructions that, when executed by one or more processors, cause the one or more processors to receive, via wireless transmission from a playback device, first data associated with a first pose of the playback device, the first pose associated with a first number of sound sources in a sound scene, to generate a first frame of encoded ambisonics audio data that corresponds to a base layer encoding of the sound scene, and to send the first frame to the playback device. The instructions, when executed by one or more processors, also cause the one or more processors to receive, via wireless transmission from the playback device, second data associated with a second pose of the playback device, the second pose associated with a second number of sound sources in the sound scene, the second number greater than the first number, to generate a second frame of encoded ambisonics audio data that corresponds to an enhancement layer encoding of the sound scene, and to send the second frame to the playback device.

According to another particular implementation of the techniques disclosed herein, an apparatus includes means for receiving, via wireless transmission from a playback device, first data associated with a first pose of the playback device, the first pose associated with a first number of sound sources in a sound scene. The apparatus includes means for generating a first frame of encoded ambisonics audio data that corresponds to a base layer encoding of the sound scene and means for sending the first frame to the playback device. The apparatus includes means for receiving, via wireless transmission from the playback device, second data associated with a second pose of the playback device, the second pose associated with a second number of sound sources in the sound scene, the second number greater than the first number. The apparatus also includes means for generating a second frame of encoded ambisonics audio data that corresponds to an enhancement layer encoding of the sound scene and means for sending the second frame to the playback device.

Other implementations, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
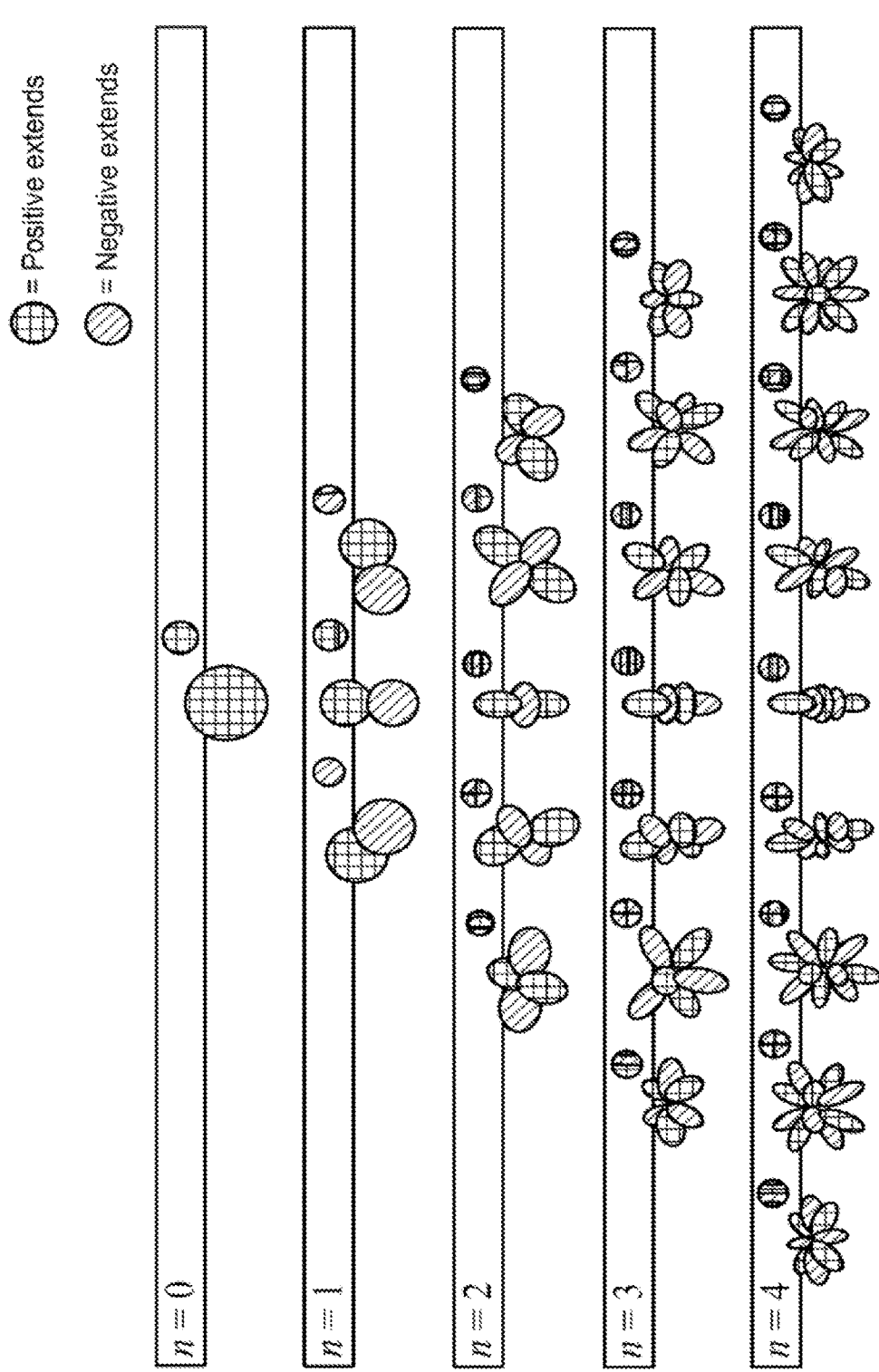
FIG. 1 is a diagram illustrating spherical harmonic basis functions of various orders and sub-orders.

Systems and methods for performing sound field adjustment are described in which at least a portion of the sound field adjustment is performed by a streaming client device operating on audio data from a streaming source device. In conventional systems, latencies associated with a headphone device transmitting head tracking information to a remote server, updating audio data based on the head tracking information at the remote server, and transmitting updated binaural audio data to the headphone device can result in an unnaturally high motion-to-sound latency and may diminish a user experience. By performing at least a portion of the sound field adjustment at a streaming client device (e.g., a headphone device), latency associated with transmitting head tracking data to a remote source device (e.g., a remote server) is reduced and a user experience is improved.

In some examples, a split audio rendering system reduces rendering latency via incorporating head rotation adjustment (e.g., three degrees of freedom (3DOF) rotation adjustment) of an audio scene at a wearable device (e.g., a streaming client device, such as a headphone device) rather than at the streaming source device. In some examples, in addition to 3DOF rotation adjustment, limited translation adjustment (e.g., 3DOF+) is also performed at the wearable device. The streaming source device converts audio content to a sound field, such as based on First Order Ambisonics (FOA), Higher-Order Ambisonics (HOA), or Mixed-Order Ambisonics (MOA). The streaming source device compresses the resulting audio data (e.g., ambisonics coefficients) and transmits the compressed audio data wirelessly to the wearable device.

The wearable device decodes the compressed audio data and also obtains head tracker information, such as measured by one or more sensors of the wearable device. The wearable device compensates for head rotation via sound field rotation based on the head tracker information, and in some examples, the wearable device also processes a low-latency 3DOF+ effect with limited translation to adjust the sound field. The wearable device binauralizes the adjusted sound field using head-related transfer functions (HRTFs) or binaural room impulse responses (BRIRs) with or without headphone compensation filters associated with the wearable device. The wearable device may combine one or more of the decoding, sound field adjusting, and binauralization operations to reduce overall processing resources used for audio adjustment and playback at the wearable device.

By performing 3DOF or 3DOF+ rendering post-transmission, the wireless device enables a wireless immersive audio system to operate with low rendering latency as compared to conventional systems.

In some examples, the wearable device may transmit location or motion information to the streaming audio source. The streaming audio source generates audio data by rendering the audio content to a sound field and uses the received location or motion information to adjust the audio data to account for the user's location change. The streaming audio source compresses and transmits the audio data adjusted for the user's location change to the wearable device, and the wearable device performs 3DOF or 3DOF+ based on the user's head rotation, binauralizes, and plays out the resulting audio.

In other examples, rather than sending the location or movement data to the streaming audio source, the wearable device compensates for head rotation via sound field rotation and also modifies the sound field based on the user's location changes (e.g., a 6DOF effect).

In some implementations, the streaming audio source selects between a compression mode, in which audio data (e.g., ambisonics coefficients) is compressed, and a bypass mode in which the audio data is not compressed, for transfer to a playback device. Selection between the compression mode and the bypass mode may be based on a latency criterion associated with playback of the audio data. For example, delay associated with performing compression of the audio data at the streaming audio source and decompression of the audio data at the playback device may exceed an allowable delay associated with low-latency audio applications, such as an extended reality application, a phone call, a teleconference, or a video telephone, as illustrative non-limiting examples. In some cases, such as for a low-latency audio application where a wireless link between the streaming audio source and the playback device has insufficient bandwidth to support transmission of the full set of raw ambisonics coefficients, the streaming audio source can truncate higher-resolution audio data (e.g., discard high-order ambisonics coefficients) to reduce an amount of audio data to transmit without performing compression.

Some examples incorporate pose prediction and interactive sound rendering. For example, in some implementations, the wearable device sends time-stamped location information to the streaming audio source, and the streaming audio source predicts a future location of the user and adjusts the sound field to account for the user's predicted location change. Prediction of future user movements reduces an effective latency associated with translating the sound field as perceived by a user of the wearable device.

In some implementations, the streaming audio source renders a head-locked two-channel headphone audio stream, such as background music or a narrator's voice during a video game, that is not rotated and translated with the sound field based on the user's movement.

In some implementations, sound effects such as user interaction sounds can be transmitted and pre-buffered in the wearable device. As a result, latency associated with playback of the sound effects responsive to a user action is reduced as compared to waiting for the sound effects to be transmitted from the streaming audio source. In some examples, memory usage on the wearable device is reduced by decoding and pre-buffering the initial audio frames of a sound effect, and postponing decoding the remaining frames of the sound effect until the effect sound is triggered.

In some implementations, a companion device, such as a smart watch or smart phone, is used to reduce latency by moving one or more operations from the remote streaming audio source to a location closer to the wearable device. In an example, the companion device receives the location information from the wearable device and the compressed audio data from the streaming audio source, performs a low-latency sound field translation operation based on the location information, and transmits the translated sound field wirelessly to the wearable device.

In some examples, different representations of the sound field may be used by a wearable device based on the pose of the wearable device. For example, different representations may correspond to overlapping viewport fields of view and may be encoded such that each representation provides higher resolution for audio sources within the viewport field of view corresponding to that representation. The viewport fields of view can correspond to translation as well as rotation and can be used to provide relatively large translations to different locations in the sound field, such as a jump in a video game to a distant sound source, or to provide augmented audio of a distant sound source (e.g., audio augmented reality).

In other implementations, such as audio-only implementations, different representations of the sound field may be used by a wearable device based on the pose of the wearable device and may correspond to overlapping sectors of a sound field. The sectors can correspond to translation as well as rotation and can be used to provide relatively large translations to different locations in the sound field, such as to provide augmented audio of a distant sound source (e.g., audio augmented reality). In some examples, the different representations can include different audio formats, such as ambisonics representations or prerendered stereo representations. Selection of particular audio formats can be based on an amount of movement of the playback device.

In some examples, scalable audio encoding is used to provide a base layer having coarse resolution audio (e.g., zeroth order ambisonics (ZOA), FOA, or both) and one or more enhancement layers having finer resolution audio (e.g., second order ambisonics, third order ambisonics, or higher orders). To illustrate, when a sound scene transitions from having a relatively small number of sound sources to a relatively large number of different types of sound, such as when an orchestra begins playing, encoding of the corresponding sound field may transition from base layer encoding to one or more enhancement layers. In such examples, the wearable device includes a base layer decoder and one or more enhancement layer decoders that are selectively applied based on the encoding level.

In some examples, an amount of movement (e.g., orientation, translation, or both) of the playback device may be used to determine an amount of audio resolution for playback, since large rates of movement can result in an audio "blur" in which high spatial audio resolution is unperceivable due to the motion. Audio resolution can be reduced at the playback device by not decompressing and/or decoding received higher-order ambisonics data during periods of large rates of motion. Alternatively, or in addition, reduction of audio resolution can be effected by the streaming audio source discarding higher-order ambisonics data prior to transmission to the playback device.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining", "calculating", "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating", "estimating", "using", "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

In general, techniques are described for coding of 3D sound data, such as ambisonics audio data. Ambisonics audio data may include different orders of ambisonic coefficients, e.g., first order or second order and more (which may be referred to as Higher-Order Ambisonics (HOA) coefficients corresponding to a spherical harmonic basis function having an order greater than one). Ambisonics audio data may also include Mixed Order Ambisonics (MOA). Thus, ambisonics audio data may include at least one ambisonic coefficient corresponding to a harmonic basis function.

The evolution of surround sound has made available many audio output formats for entertainment. Examples of such consumer surround sound formats are mostly 'channel' based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, and various formats that includes height speakers such as the 7.1.4 format and the 22.2 format (e.g., for use with the Ultra High Definition Television standard). Non-consumer formats can span any number of speakers (e.g., in symmetric and non-symmetric geometries) often termed 'surround arrays'. One example of such a sound array includes 32 loudspeakers positioned at coordinates on the corners of a truncated icosahedron.

The input to an encoder, such as a Moving Picture Experts Group (MPEG) encoder, may be optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); or (iii) scene-based audio, which involves representing the sound field using coefficients of spherical harmonic basis functions (also called "spherical harmonic coefficients" or SHC, "Higher-order Ambisonics" or HOA, and "HOA coefficients"). Such an encoder may be described in more detail in a document entitled "Call for Proposals for 3D Audio," by the International Organization for Standardization/International Electrotechnical Commission (ISO)/ (IEC) JTC1/SC29/WG11/N13411, released January 2013 in Geneva, Switzerland, and available at http://mpeg.chiariglione.org/sites/default/files/files/standards/parts/docs/w13411.zip.

There are various 'surround-sound' channel-based formats currently available. The formats range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce a soundtrack for a movie once, and not spend effort to remix it for each speaker configuration. Recently, Standards Developing Organizations have been considering ways in which to provide an encoding into a standardized bitstream and a subsequent decoding that is adaptable and agnostic to the speaker geometry (and number) and acoustic conditions at the location of the playback (involving a renderer).

To provide such flexibility for content creators, a hierarchical set of elements may be used to represent a sound field. The hierarchical set of elements may refer to a set of elements in which the elements are ordered such that a basic set of lower-ordered elements provides a full representation of the modeled sound field. As the set is extended to include higher-order elements, the representation becomes more detailed, increasing resolution.

One example of a hierarchical set of elements is a set of spherical harmonic coefficients (SHC). The following expression demonstrates a description or representation of a sound field using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the sound field, at time t, can be represented uniquely by the SHC, $A_n^m(k)$. Here, $$k = \frac{\omega}{c},$$

c is the speed or sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

FIG. 1 is a diagram 100 illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes. A number of spherical harmonic basis functions for a particular order may be determined as: # basis functions=$(n+1)^2$. For example, a tenth order (n=10) would correspond to 121 spherical harmonic basis functions (e.g., $(10+1)^2$).

The SHC $A_n^m(k)$ can either be physically acquired (e.g., recorded) by various microphone array configurations or, alternatively, they can be derived from channel-based or object-based descriptions of the sound field. The SHC represent scene-based audio, where the SHC may be input to an audio encoder to obtain encoded SHC that may promote more efficient transmission or storage. For example, a fourth-order representation involving $(4+1)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k) = g(\omega)(-4\pi i k) h_n^{(2)}(kr_s) Y_n^{m*}(\theta_s, \varphi_s),$$

where $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the PCM stream) enables conversion of each PCM object and the corresponding location into the SHC $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, the coefficients contain information about the sound field (the pressure as a function of 3D coordinates), and the above represents the transformation from individual objects to a representation of the overall sound field, in the vicinity of the observation point $\{r_r, \theta_r, \varphi_r\}$.

Figure 2:
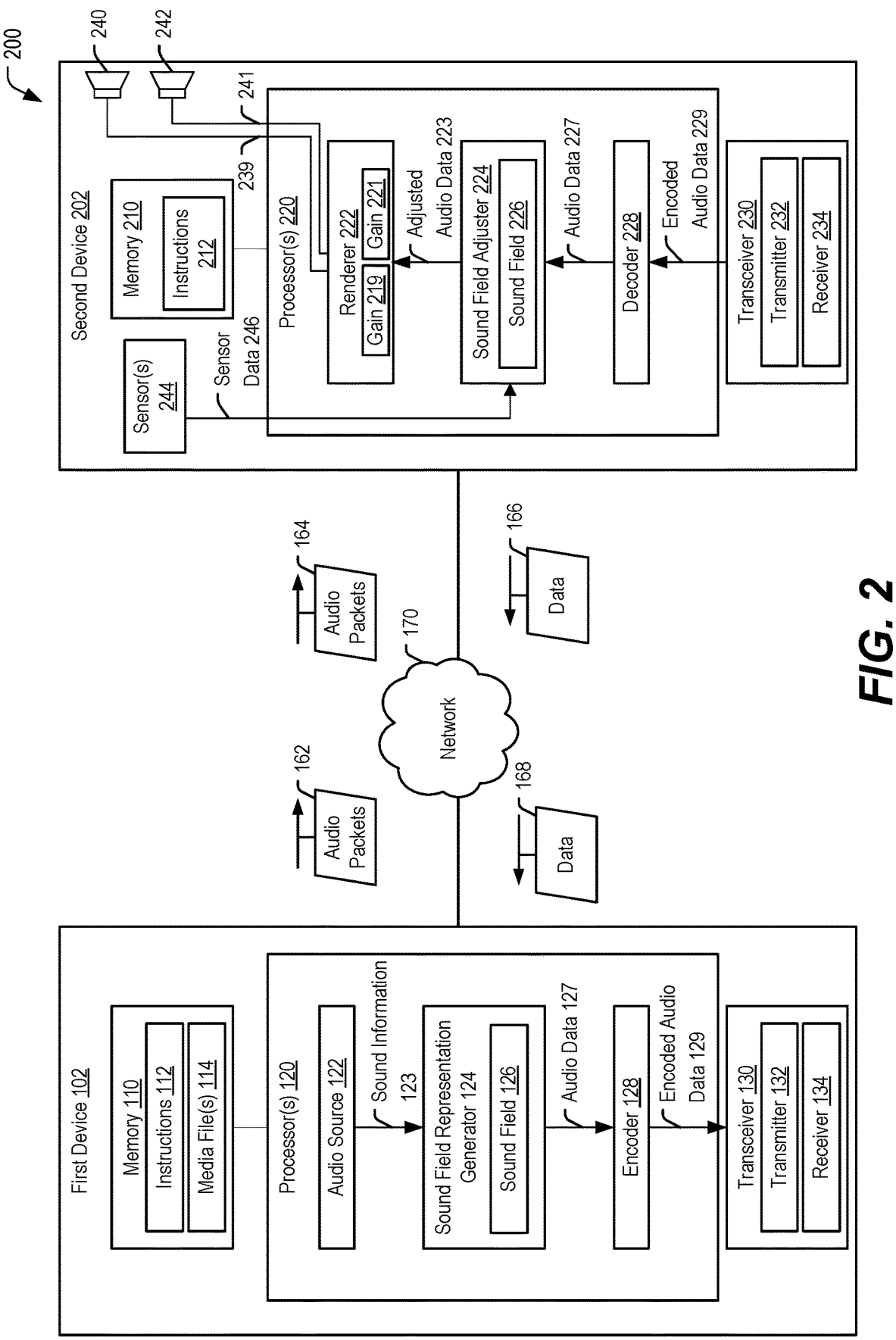
FIG. 2 is a block diagram illustrating an example of an implementation of a system for adjusting a sound field.

Referring to FIG. 2, a system 200 includes a first device 102 coupled to a second device 202 via a network 170. The network 170 may include one or more of a fifth generation (5G) cellular digital network, a Bluetooth® (a registered trademark of BLUETOOTH SIG, INC., Washington) network, an Institute of Electrical and Electronic Engineers (IEEE) 802.11-type network (e.g., WiFi), one or more other wireless networks, or any combination thereof. The first device 102 is configured to generate audio data representative of a sound field and transmit the audio data to the second device 202 via the network 170. The second device 202 is configured to perform one or more adjustments of the sound field based on movement of the second device 202 prior to playing out the resulting audio, reducing latency associated with transmitting movement information from the second device 202 to the first device 102 for adjustment of the sound field at the first device 102.

The first device 102 includes a memory 110, one or more processors 120, and a transceiver 130. The memory 110 includes instructions 112 that are executable by the one or more processors 120. The memory 110 also includes one or more media files 114. The one or more media files 114 are accessible to the processor 120 as a source of sound information, as described further below. In some examples, the one or more processors 120 are integrated in a portable electronic device, such as a smartphone, tablet computer, laptop computer, or other electronic device. In other examples, the one or more processors 120 are integrated in a server, such as an edge server.

The transceiver 130 is coupled to the one or more processors 120 and is configured to enable communication via the network 170 to the second device 202. The transceiver 130 includes a transmitter 132 and a receiver 134. Although the first device 102 is illustrated as including the transceiver 130, in other implementations the first device 102 does not include the transceiver 130 and instead includes the transmitter 132 and the receiver 134 as distinct components.

The one or more processors 120 are configured to execute the instructions 112 to perform operations associated with audio processing. To illustrate, the one or more processors 120 are configured to receive sound information 123 from an audio source 122. For example, the audio source 122 may correspond to a portion of one or more of the media files 114, a game engine, one or more other sources of sound information, or a combination thereof.

The one or more processors 120 are configured to adjust a sound field 126 associated with the sound information 123 via operation of a sound field representation generator 124. The sound field representation generator 124 is configured to output audio data 127 to an encoder 128. In an example, the audio data 127 includes ambisonics data and corresponds to at least one of two-dimensional (2D) audio data that represents a 2D sound field or three-dimensional (3D) audio data that represents a 3D sound field. In some implementations, the sound field representation generator 124 may obtain one or more representations of a sound field from a content creator or some other device or source external to the first device 102 (e.g., loaded from a webpage or stored in a file and loaded), and then processed and streamed to the second device 202.

The encoder 128 is configured to perform ambisonics encoding or transcoding (e.g., spatial encoding of the audio data 127 into ambisonics coefficients) to generate encoded audio data 129. In some implementations, the encoder 128 is configured to compress the encoded audio data 129 (e.g., psychoacoustic compression encoding), and in other implementations, the encoder 128 does not compress the encoded audio data 129, such as described in further detail with reference to FIG. 3. For example, the encoder 128 may be configurable by the one or more processors 120 to operate in a compression mode in which compression is performed to reduce the size of the encoded audio data 129, or to operate in a bypass mode in which the encoded audio data 129 is not compressed (e.g., raw ambisonics coefficients), such as based on a latency criterion associated with playback at the second device 202.

The encoded audio data 129 is output by the one or more processors 120 to the transceiver 130 for transmission to the second device 202. For example, the audio data 127 corresponding to the sound field 126 may be transmitted as streaming data via one or more first audio packets 162. In some implementations, the audio source 122 corresponds to a portion of a media file (e.g., a portion of the one or more media files 114), and the streaming data is associated with a virtual reality experience that is streamed to the second device 202 (e.g., a playback device) via at least one of a 5G cellular digital network or a Bluetooth® network.

In some implementations, the one or more processors 120 are also configured to receive translation data from a playback device, such as data 166 received from the second device 202. The translation data corresponds to a translation associated with the second device 202, such as a movement of the second device 202 (e.g., movement of the wearer of the second device 202 implemented as a headphone device). As used herein, "movement" includes rotation (e.g., a change in orientation without a change in location, such as a change in roll, tilt, or yaw), translation (e.g., non-rotation movement), or a combination thereof.

The one or more processors 120 are configured to convert the sound information 123 to audio data that represents a sound field based on the translation associated with the second device 202. To illustrate, the sound field representation generator 124 adjusts the sound field 126 to generate updated audio data 127 that represents the sound field after the translation. For example, in some implementations the sound field representation generator 124 performs the translation on objects prior to converting to ambisonics, and in some implementations the sound field representation generator 124 performs translation operations to apply the translation to ambisonics representing an existing sound field. The one or more processors 120 are configured to send the updated audio data as streaming data, via wireless transmission, to the second device 202, such as via second audio packets 164.

The first device 102 is configured to receive subsequent translation data, such as data 168 that is received after receiving the data 166, and may perform further adjustments to the sound field 126 to account for translation of the second device 202. Thus, the first device 102 can receive a stream of translation information indicating changes in the location of the second device 202 and update the streaming audio data transmitted to the second device 202 to represent an adjusted version of the sound field 126 that corresponds to the changing location of the second device 202. However, in some implementations, the first device 102 does not perform rotations of the sound field 126 responsive to changes in orientation of the second device 202, and instead rotations of the sound field are performed at the second device 202.

The second device 202 includes one or more processors 220 coupled to a memory 210, a transceiver 230, one or more sensors 244, a first loudspeaker 240, and a second loudspeaker 242. In an illustrative example, the second device 202 corresponds to a wearable device. To illustrate, the one or more processors 220, the memory 210, the transceiver 230, the one or more sensors 244, and the loudspeakers 240, 242 may be integrated in a headphone device in which the first loudspeaker 240 is configured to be positioned proximate to a first ear of a user while the headphone device is worn by the user, and the second loudspeaker 242 is configured to be positioned proximate to a second ear of the user while the headphone device is worn by the user.

The memory 210 is configured to store instructions 212 that are executable by the one or more processors 220. The one or more sensors 244 are configured to generate sensor data 246 indicative of a movement of the second device 202, a pose of the second device 202, or a combination thereof. As used herein, the "pose" of the second device 202 indicates a location and an orientation of the second device 202. The one or more sensors 244 include one or more inertial sensors such as accelerometers, gyroscopes, compasses, positioning sensors (e.g., a global positioning system (GPS) receiver), magnetometers, inclinometers, optical sensors, one or more other sensors to detect acceleration, location, velocity, acceleration, angular orientation, angular velocity, angular acceleration, or any combination thereof, of the second device 202. In one example, the one or more sensors 244 include GPS, electronic maps, and electronic compasses that use inertial and magnetic sensor technology to determine direction, such as a 3-axis magnetometer to measure the Earth's geomagnetic field and a 3-axis accelerometer to provide, based on a direction of gravitational pull, a horizontality reference to the Earth's magnetic field vector. In some examples, the one or more sensors 244 include one or more optical sensors (e.g., cameras) to track movement, individually or in conjunction with one or more other sensors (e.g., inertial sensors).

The transceiver 230 includes a wireless receiver 234 and a wireless transmitter 232. The wireless receiver 234 is configured to receive the encoded audio data 129 from the first device 102 via the wireless transmission and to output corresponding encoded audio data 229 to the one or more processors 220. In some implementations, the encoded audio data 229 matches the encoded audio data 129, while in other implementations the encoded audio data 229 may differ from the encoded audio data 129 due to one or more audio packets being lost during transmission, one or more bit errors occurring in a received audio packet, or one or more other causes of data loss. Any such data losses may be corrected (e.g., via forward error correction encoding or redundant information transmission) or may be compensated for (e.g., via interpolation between received packets to estimate audio data for a lost packet). Although the second device 202 is illustrated as including the transceiver 230, in other implementations the second device 202 may omit the transceiver 230 and may include the receiver 234 and the transmitter 232 as distinct components.

The one or more processors 220 are configured to receive, via wireless transmission, the encoded audio data 229 representing the sound field 126. In some implementations, the one or more processors 220 are configured to receive the encoded audio data 229 as streaming data from a streaming device (e.g., via the first audio packets 162 from the first device 102).

The one or more processors 220 are configured to decode the encoded audio data 229. For example, a decoder 228 is configured to process the encoded audio data 229 (e.g., decompressing if the encoded audio data 229 is compressed) to generate audio data 227 that corresponds to the audio data 127 at the first device 102 and is indicative of a sound field 226 that corresponds to the sound field 126 at the first device 102. In some implementations, the audio data 227 includes ambisonics data and corresponds to at least one of two-dimensional (2D) audio data or three-dimensional (3D) audio data.

The one or more processors 220 are configured to adjust the audio data 227 to alter the sound field 226 based on data associated with at least one of a translation or an orientation associated with movement of the second device 202, such as indicated by the sensor data 246. To illustrate, the sound field adjuster 224 is configured to adjust the audio data 227 to alter the sound field 226 based on the sensor data 246 indicating a change in orientation or translation of the second device 202. In one example, the one or more processors 220 are configured to adjust the audio data 227 to rotate the sound field 226 responsive to the sensor data 246 indicating a change of the orientation. In another example, the one or more processors 220 are configured to translate and rotate the sound field 226 responsive to the movement of the second device 202 and without sending translation data associated with the movement of the second device 202 to a streaming device (e.g., without sending the data 166, 168 to the first device 102). In one example, the one or more processors 120 are configured to perform one of a translation or a rotation of the sound field 126 based on translation data (e.g., the data 166, 168) received from the second device 202, and the processors 220 are configured to perform the other of the translation or the rotation of the sound field 226 based on the sensor data 246.

The one or more processors 220 are configured to render the adjusted decompressed audio data 223 into two or more loudspeaker gains to drive two or more loudspeakers. For example, a first loudspeaker gain 219 is generated to drive the first loudspeaker 240 and a second loudspeaker gain 221 is generated to drive the second loudspeaker 242. To illustrate, the one or more processors 220 are configured to perform binauralization of the adjusted decompressed audio data 223, such as using one or more HRTFs or BRIRs to generate the loudspeaker gains 219, 221, and output the adjusted decompressed audio data as pose-adjusted binaural audio signals 239, 241 to the loudspeakers 240, 242 for playback.

The first device 102 and the second device 202 may each perform operations that, when combined, correspond to a split audio rendering operation. The first device 102 processes the sound information 123 from the audio source 122 and generates audio data 127, such as 2D or 3D ambisonics data, representing the sound field 126. In some implementations, the first device 102 also performs translations to the sound field 126 prior to sending the encoded audio data 129 to the second device 202. In some implementations, the second device 202 adjusts the audio data 227 to alter the sound field 226 based on the orientation of the second device 202 and renders the resulting adjusted audio data 223 for playout. In some implementations, the second device 202 also performs translations to the sound field 226. Examples of various operations that may be performed by the first device 102 and the second device 202 are described in further detail with reference to FIGS. 3-13.

Thus, the first device 102 may operate as a streaming source device and the second device 202 may operate as a streaming client device. By performing operations to rotate the sound field 226 at the second device 202, latency associated with transmitting rotation tracking data from the second device 202 to the first device 102 is avoided and a user experience is improved.

Although the second device 202 is described as a headphone device for purpose of explanation, in other implementations the second device 202 is implemented as another type of device. For example, in some implementations the one or more processors 220 are integrated into a vehicle, and the data 166, 168 indicates a translation of the vehicle and an orientation of the vehicle, such as described further with reference to FIG. 18 and FIG. 19. In some implementations, the one or more processors 220 are integrated into a speaker array device and are further configured to perform a beam steering operation to steer binaural signals to a location associated with a user, such as described further with reference to FIG. 16. In some implementations, the one or more processors 220 are integrated in at least one of a mobile phone, a tablet computer device, a wearable electronic device, a camera device, or an extended reality headset, such as a virtual reality headset, a mixed reality headset, or an augmented reality headset.

Figure 3A:
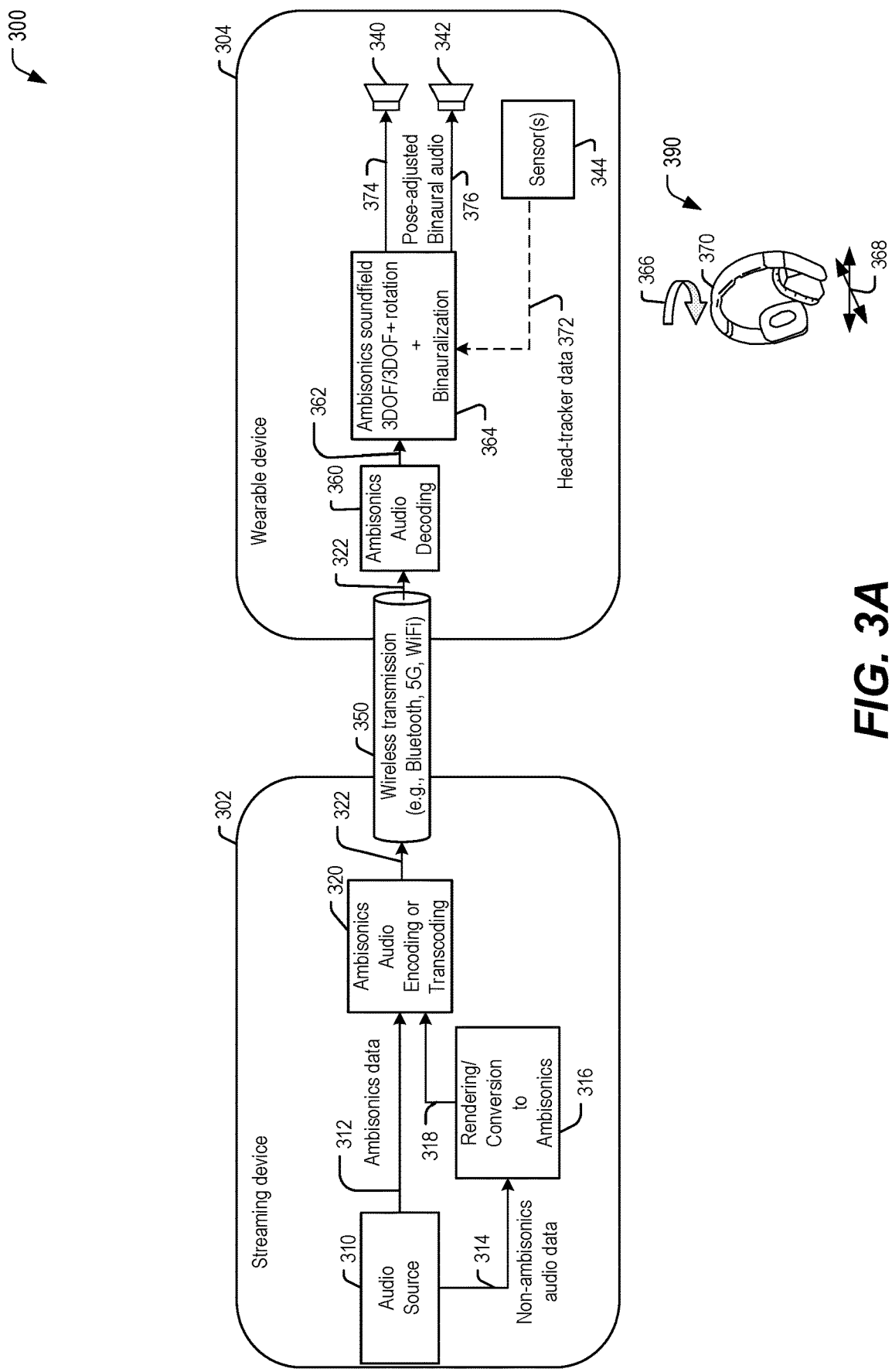
FIG. 3A is a block diagram illustrating a first implementation of components and operations of a system for adjusting a sound field.

FIG. 3A is a block diagram illustrating a first implementation of components and operations of a system for adjusting a sound field. A system 300 includes a streaming device 302 coupled to a wearable device 304.

The streaming device 302 includes an audio source 310 that is configured to provide ambisonics data 312 that represents first audio content, non-ambisonics audio data 314 that represents second audio content, or a combination thereof. The streaming device 302 is configured to perform a rendering/conversion to ambisonics operation 316 to convert the streamed non-ambisonics audio data 314 to an ambisonics sound field (e.g., FOA, HOA, mixed-order ambisonics) to generate ambisonics data 318. As used herein, "ambisonics data" includes a set of one or more ambisonics coefficients that represent a sound field.

The streaming device 302 is configured to perform an ambisonics audio encoding or transcoding operation 320 to compress ambisonics coefficients of the ambisonics data 312, the ambisonics data 318, or a combination thereof, to generate compressed coefficients 322 and to transmit the compressed coefficients 322 wirelessly to the wearable device 304 via a wireless transmission 350 (e.g., via Bluetooth®, 5G, or WiFi, as illustrative, non-limiting examples). In an example, the ambisonics audio encoding or transcoding operation 320 is performed using a low-delay codec, such as based on Audio Processing Technology-X (AptX), low-delay Advanced Audio Coding (AAC-LD), or Enhanced Voice Services (EVS), as illustrative, non-limiting examples.

In some implementations, the streaming device 302 corresponds to the first device 102 of FIG. 2, the audio source 310 corresponds to the audio source 122, the rendering/conversion to ambisonics operation 316 is performed at the sound field representation generator 124, the ambisonics audio encoding or transcoding operation 320 is performed at the encoder 128, and the compressed coefficients 322 correspond to the encoded audio data 129.

The wearable device 304 (e.g., a headphone device) is configured to receive the compressed coefficients 322 and to perform an ambisonics audio decoding operation 360 to generate ambisonics data 362. The wearable device 304 is also configured to generate head-tracker data 372 based on detection by one or more sensors 344 of a rotation 366 and a translation 368 of the wearable device 304. A diagram 390 illustrates an example representation of the wearable device 304 implemented as a headphone device 370 to demonstrate examples of the rotation 366 and the translation 368.

An ambisonics sound field 3DOF/3DOF+ rotation and binauralization operation 364 at the wearable device 304 performs compensation for head-rotation via sound field rotation based on the head-tracker data 372 measured on the wearable device 304 (and optionally also processing a low-latency 3DOF+ effect with limited translation). For example, the 3DOF+ effect may be limited to translations forward, back, left, and right (relative to a forward-facing direction of the headphone device 370). The ambisonics sound field 3DOF/3DOF+ rotation and binauralization operation 364 at the wearable device 304 also performs binauralization of the compensated ambisonics sound field using HRTFs or BRIRs with or without headphone compensation filters associated with the wearable device 304 to output pose-adjusted binaural audio via a first output signal 374 to a first loudspeaker 340 and a second output signal 376 to a second loudspeaker 342. In some implementations, the ambisonics audio decoding operation 360 and ambisonics sound field 3DOF/3DOF+ rotation and binauralization operation 364 can be combined into a single operation to reduce computation resource usage at the wearable device 304.

In some implementations, the wearable device 304 corresponds to the second device 202 of FIG. 2, the ambisonics audio decoding operation 360 is performed at the decoder 228, the ambisonics sound field 3DOF/3DOF+ rotation and binauralization operation 364 is performed at the sound field adjuster 224 and the renderer 222, the one or more sensors 344 correspond to the one or more sensors 244, and the head-tracker data 372 corresponds to the sensor data 246.

The system 300 therefore enables low rendering latency wireless immersive audio with 3DOF or 3DOF+ rendering post transmission.

Figure 3B:
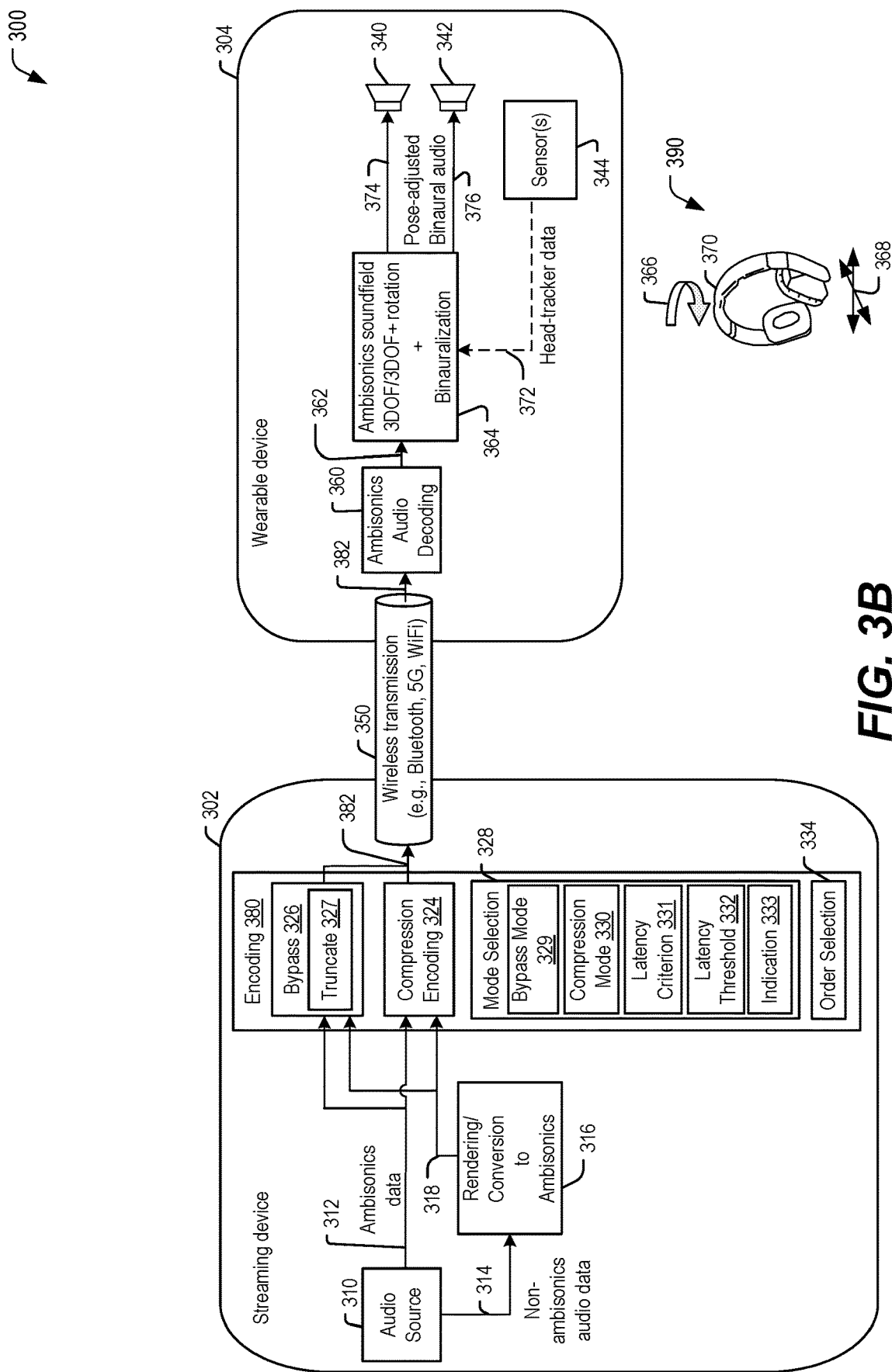
FIG. 3B is a block diagram illustrating a second implementation of components and operations of a system for adjusting a sound field.

FIG. 3B depicts an implementation of the system 300 in which the streaming device 302 is configured to selectively perform a bypass operation 326 to circumvent performing compression encoding 324 of the ambisonics data 312, the ambisonics data 318, or both. To illustrate, the streaming device 302 is configured to perform an encoding operation 380 that can include the compression encoding 324 (e.g., psychoacoustic compression encoding to compress ambisonics coefficients) or the bypass operation 326. In a particular implementation, audio data 382 output from the encoding operation 380 can include compressed ambisonics coefficients from the compression encoding 324 or non-compressed ambisonics coefficients from the bypass operation 326. The audio data 382 is wirelessly transmitted to the wearable device 304 (also referred to as playback device 304) via the wireless transmission 350.

In a particular implementation, the streaming device 302 can include one or more processors, such as the one or more processors 120 of FIG. 2, that are configured to obtain sound information from the audio source 310 and to perform a mode selection 328. The mode selection 328 includes selecting, based on a latency criterion 331 associated with the playback device 304, a compression mode 330 in which a representation of the sound information (e.g., a set of ambisonics coefficients) is compressed prior to transmission to the playback device 304, or a bypass mode 329 in which the representation of the sound information is not compressed prior to transmission to the playback device 304. The resulting audio data 382 includes, based on the selected one of the compression mode 330 or the bypass mode 329, a compressed representation of the sound information or an uncompressed representation of the sound information. To illustrate, in response to selection of the compression mode 330, one or more switches or other data flow control devices can be set to cause incoming ambisonics coefficients to be processed by the compression encoding 324 to generate compressed ambisonics coefficients as the audio data 382. If the bypass mode 329 is selected, the one or more switches or data flow control devices can be set to cause incoming ambisonics coefficients to be processed using the bypass operation 326, which may output at least a portion of the incoming (uncompressed) ambisonics coefficients as the output audio data 382. The ambisonics audio decoding 360 at the playback device 304 is configured to receive the audio data 382, determine if the audio data 382 includes compressed or uncompressed ambisonics coefficients, and selectively decompress compressed ambisonics coefficients to generate ambisonics data 362. In implementations in which some ambisonics coefficients have been discarded at the streaming device 302, such as via operation of a truncation operation 327 in the bypass mode 329 as explained further below, the ambisonics data 362 may contain fewer ambisonics coefficients than the ambisonics data 312 or 318.

In some implementations, the latency criterion 331 is based on whether a playback latency associated with the streaming data exceeds a latency threshold 332. For example, some applications, such as an extended reality application, a phone call, a teleconference, or a video telephone, may have one or more low-latency criteria for audio playback to provide a positive user experience. Delay associated with the compression encoding 324 at the streaming device 302 and delay associated with decompression of compressed audio data during the ambisonics audio decoding 360 at the playback device 304 may cause the latency associated with playback of the audio data 382 at the playback device 304 to exceed the latency threshold 332. In response to a determination that the playback latency exceeds the latency threshold 332, the bypass mode 329 is selected, causing the transmitted audio data 382 to include uncompressed ambisonics coefficients and reducing latency. In some cases, the streaming device 302 receives, from the playback device 304, an indication 333 that the playback latency associated with the streaming data exceeds the latency threshold 332, and the streaming device 302 selects the bypass mode 329 based on receiving the indication 333.

In some implementations the latency criterion 331 is at least partially based on a bandwidth of a wireless link from the streaming device 302 to the playback device 304. When an amount of the audio data 382 to be transmitted exceeds the available bandwidth for the wireless transmission 350, transmission delays can occur that interfere with timely playback of the audio data 382 at the playback device 304. In some implementations, the streaming device 302 determines whether a wireless link to the playback device 304 corresponds to a "higher-bandwidth" wireless link or to a "lower-bandwidth" wireless link and selects the bypass mode 329 based on the wireless link corresponding to the "higher-bandwidth" wireless link.

For example, in response to the wireless transmission occurring over a fifth generation (5G) cellular digital network or a WiFi-type network, the streaming device 302 may determine that the wireless transmission 350 uses a "higher-bandwidth" wireless link that provides sufficient bandwidth to transmit uncompressed ambisonics coefficients. As another example, in response to the wireless transmission occurring over a Bluetooth-type wireless network, the streaming device 302 may determine that the wireless transmission 350 uses a "lower-bandwidth" wireless link that does not provide sufficient bandwidth to transmit uncompressed ambisonics coefficients. The streaming device 302 may select the compression mode 330 based on the wireless link corresponding to the "lower-bandwidth" wireless link.

In the above examples, "higher-bandwidth" and "lower-bandwidth" are relative terms to categorize wireless links based on the type of wireless network. Although 5G, WiFi, and Bluetooth® are given as illustrative, non-limiting examples, it should be understood that categorization of 5G, WiFi, and Bluetooth® as "lower-bandwidth" or "higher-bandwidth" may be adjusted as capacities of such technologies evolve over time. In addition to categorizing wireless links based on network type, or alternatively, the streaming device 302 may estimate the ability of the wireless link to convey uncompressed ambisonics coefficients, such as based on measured link parameters (transmit power levels, received power levels, etc.), and select the compression mode 330 or the bypass mode 329 based on the estimated ability of the wireless link to convey the audio data 382 in an uncompressed format.

In some implementations, the streaming device 302 receives, from the playback device 304, a request for compressed audio data or for uncompressed audio data, and selects either the bypass mode 329 or the compression mode 330 based on the request. For example, the playback device 304 may request to receive uncompressed audio data to reduce delays associated with decompressing audio data, to reduce power consumption associated with decompressing audio data, for one or more other reasons, or any combination thereof. As another example, the playback device 304 may request to receive compressed audio data in response to network conditions causing delays or packet loss during transmission over the wireless transmission 350, to reduce an amount of memory used to store the audio data 382 locally at the playback device 304, for one or more other reasons, or any combination thereof.

In some cases, such as when the audio data 382 for a low-latency audio application is transferred over a wireless link that has insufficient bandwidth to support transmission of a full set of uncompressed ambisonics coefficients, but the latency criterion 331 prevents use of compressed ambisonics coefficients, the streaming device 302 can perform a truncation operation 327 in the bypass operation 326. The truncation operation 327 truncates higher-resolution audio data (e.g., discards some ambisonics coefficients corresponding to one or more upper ambisonics orders of the full order uncompressed representation for a frame of audio data) to reduce a size of the audio data 382 without performing compression. For example, in the bypass mode 329, the streaming device 302 may discard a high-resolution portion of the uncompressed ambisonics coefficients based on a bandwidth of a wireless link from the streaming device 302 to the playback device 304. To illustrate, the high-resolution portion of the uncompressed representation may correspond to a subset of the ambisonic coefficients. As an illustrative, non-limiting example, the streaming device 302 may select ambisonics coefficients to truncate by starting with a highest order of ambisonics coefficients of the full order uncompressed representation and selecting progressively lower orders of ambisonics coefficients to truncate until the combined size of the remaining ambisonics coefficients is sufficiently small to enable transmission to the playback device 304. In other non-limiting examples, the truncation operation 327 discards all ambisonics coefficients other than a zeroth order coefficient, discards all ambisonics coefficients other than zeroth order and first order coefficients, or discards all ambisonics coefficients other than zeroth order, first order, and second order coefficients.

In some implementations, an order selection 334 is used during the encoding operation 380 to determine which ambisonics orders (e.g., zeroth order, first order, second order, etc.) to transmit and which ambisonics orders (e.g., first order, second order, third order, etc.) to discard. For example, the order selection 334 may be generated by the streaming device 302 to determine which ambisonics coefficients to truncate to deliver the audio data 382 for a low-latency application over a lower-bandwidth wireless link, as described above. As another example, the order selection 334 can be determined by the streaming device 302, determined by the playback device 304, or both, to reduce or enhance the resolution of the audio data 382 based on an actual or predicted amount of motion of the wearable device 304, such as described further with reference to FIG. 10. The order selection 334 may be used to control the truncation operation 327 when operating in the bypass mode 329. Alternatively, or in addition, the order selection 334 may be used in conjunction with the compression encoding 324 when operating in the compression mode 330. For example, ambisonics coefficients associated with one or more unselected ambisonics orders may be discarded prior to performing the compression encoding 324, during performance of the compression encoding 324, or after the compression encoding 324 has been performed.

Figure 4A:
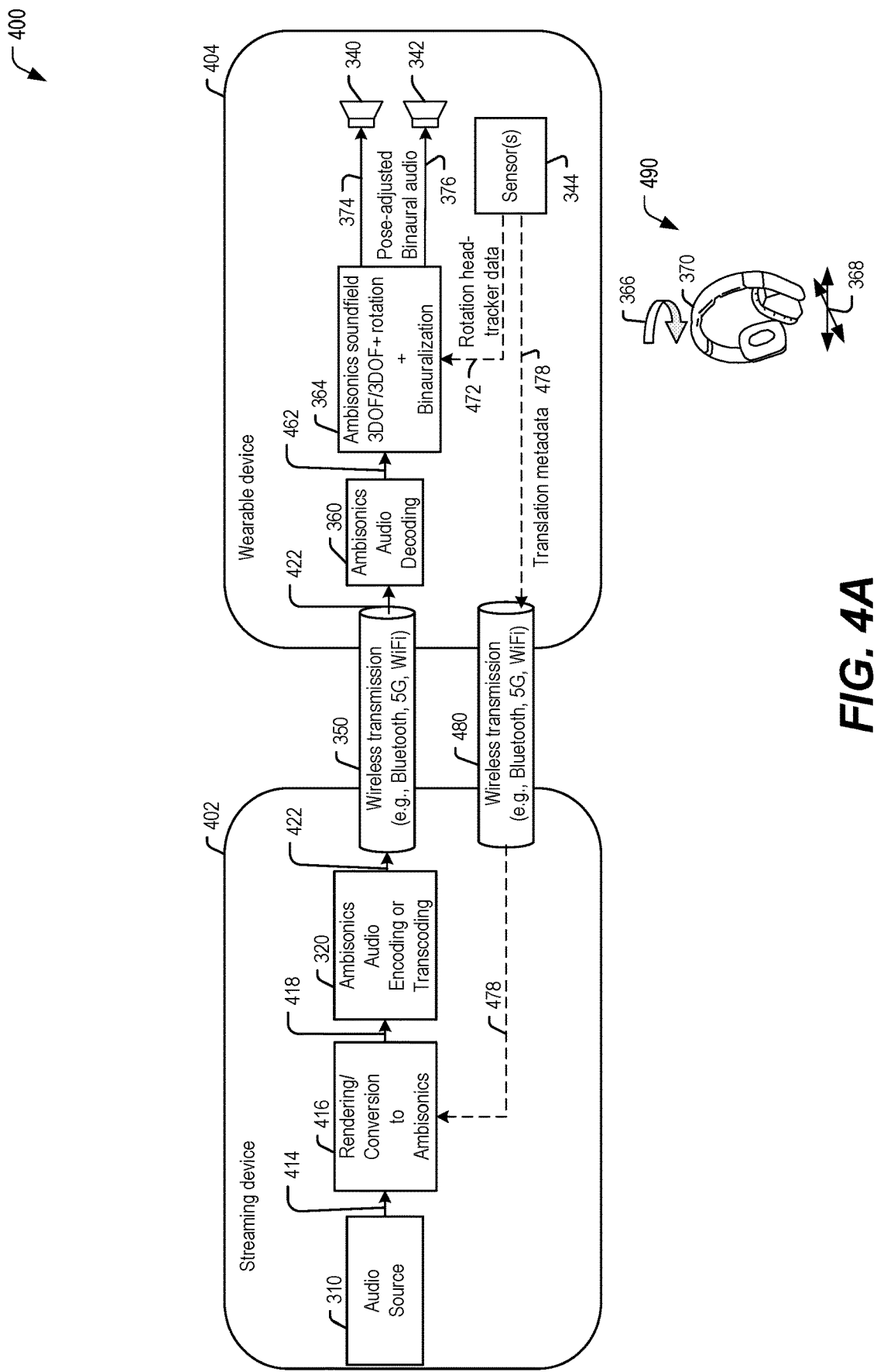
FIG. 4A is a block diagram illustrating a third implementation of components and operations of a system for adjusting a sound field.

FIG. 4A is a block diagram illustrating another implementation of components and operations of a system for adjusting a sound field. A system 400 includes a streaming device 402 coupled to a wearable device 404, also referred to as a playback device 404.

The streaming device 402 includes the audio source 310 and receives translation metadata 478, including location information, from the wearable device 404 via a wireless transmission 480 (e.g., via Bluetooth®, 5G, or WiFi, as illustrative, non-limiting examples). The streaming device 402 performs a rendering/conversion to ambisonics operation 416 of streamed audio content 414 to render the streamed audio content 414 to an ambisonics sound field (e.g., FOA, HOA, mixed-order ambisonics) and using the received motion information of the translation metadata 478 to account for a location change of a user of the wearable device 404.

The rendering/conversion to ambisonics operation 416 generates ambisonics data 418 that includes ambisonics coefficients. The streaming device 402 is configured to perform the ambisonics audio encoding or transcoding operation 320 to compress ambisonics coefficients of the ambisonics data 418 to generate compressed coefficients 422 and to transmit the compressed coefficients 422 wirelessly to the wearable device 404 via the wireless transmission 350.

In some implementations, the streaming device 402 corresponds to the first device 102 of FIG. 2, the audio source 310 corresponds to the audio source 122, the rendering/conversion to ambisonics operation 416 is performed at the sound field representation generator 124, the ambisonics audio encoding or transcoding operation 320 is performed at the encoder 128, and the translation metadata 478 corresponds to the data 166.

The wearable device 404 (e.g., a headphone device) is configured to receive the compressed coefficients 422 and to perform the ambisonics audio decoding operation 360 to generate ambisonics data 462. The wearable device 404 is also configured to generate rotation head-tracker data 472 based on a rotation 366 of the wearable device 404 and to generate the translation metadata 478 based on a translation 368 of the wearable device 404. A diagram 490 illustrates an example representation of the wearable device 404 implemented as a headphone device 370 to demonstrate examples of the rotation 366 and the translation 368.

The ambisonics sound field 3DOF/3DOF+ rotation and binauralization operation 364 at the wearable device 404 performs compensation for head-rotation via sound field rotation based on the rotation head-tracker data 472 measured on the wearable device 404 (and optionally also processing a low-latency 3DOF+ effect with limited translation based on the translation 368). For example, the 3DOF+ effect may be limited to translations forward, back, left, and right (relative to a forward-facing direction of the headphone device 370). The ambisonics sound field 3DOF/3DOF+ rotation and binauralization operation 364 at the wearable device 404 also performs binauralization of the compensated ambisonics sound field using HRTFs or BRIRs with or without headphone compensation filters associated with the wearable device 404 to output pose-adjusted binaural audio via a first output signal 374 to a first loudspeaker 340 and a second output signal 376 to a second loudspeaker 342. In some implementations, the ambisonics audio decoding operation 360 and the ambisonics sound field 3DOF/3DOF+ rotation and binauralization operation 364 can be combined into a single operation to reduce computation resource usage at the wearable device 404.

In some implementations, the wearable device 404 corresponds to the second device 202 of FIG. 2, the ambisonics audio decoding operation 360 is performed at the decoder 228, the ambisonics sound field 3DOF/3DOF+ rotation and binauralization operation 364 is performed at the sound field adjuster 224 and the renderer 222, the one or more sensors 344 correspond to the one or more sensors 244, and the rotation head-tracker data 472 and the translation metadata 478 collectively correspond to the sensor data 246.

The wearable device 404 is therefore configured to send translation data (e.g., the translation metadata 478) to the streaming device 402, the translation data associated with the movement of the wearable device 404. Responsive to sending the translation data, the wearable device 404 is also configured to receive, from the streaming device 402, compressed updated audio data (e.g., the compressed coefficients 422) representing the sound field translated based on the translation data. The wearable device 404 is configured to decompress the compressed updated audio data to generate updated audio data (e.g., the ambisonics data 462) and to adjust the updated audio data to rotate the sound field based on the orientation associated with the wearable device 404 (e.g., the rotation head-tracker data 472). In some implementations, the wearable device 404 is also configured to adjust the updated audio data to translate the sound field based on a change of the translation of the wearable device 404 (e.g., via 3DOF+ effects).

The system 400 thus enables low rendering latency wireless immersive audio with translation processing prior to transmission and with 3DOF or 3DOF+ rendering post transmission. To illustrate, a first latency associated with sending the translation metadata 478 to the streaming device 402 and receiving the compressed updated audio data (e.g., the compressed coefficients 422) from the streaming device 402 is larger than a second latency associated with adjusting the updated audio data at the ambisonics sound field 3DOF/3DOF+ rotation and binauralization operation 364 to rotate the sound field based on the orientation associated with movement of the wearable device 404. Thus, adjusting the sound field responsive to the user's head rotation is performed more quickly at the wearable device 404 after detecting the head rotation as compared to adjusting the sound field at the streaming device 402 after detecting the translation 368.

Figure 4B:
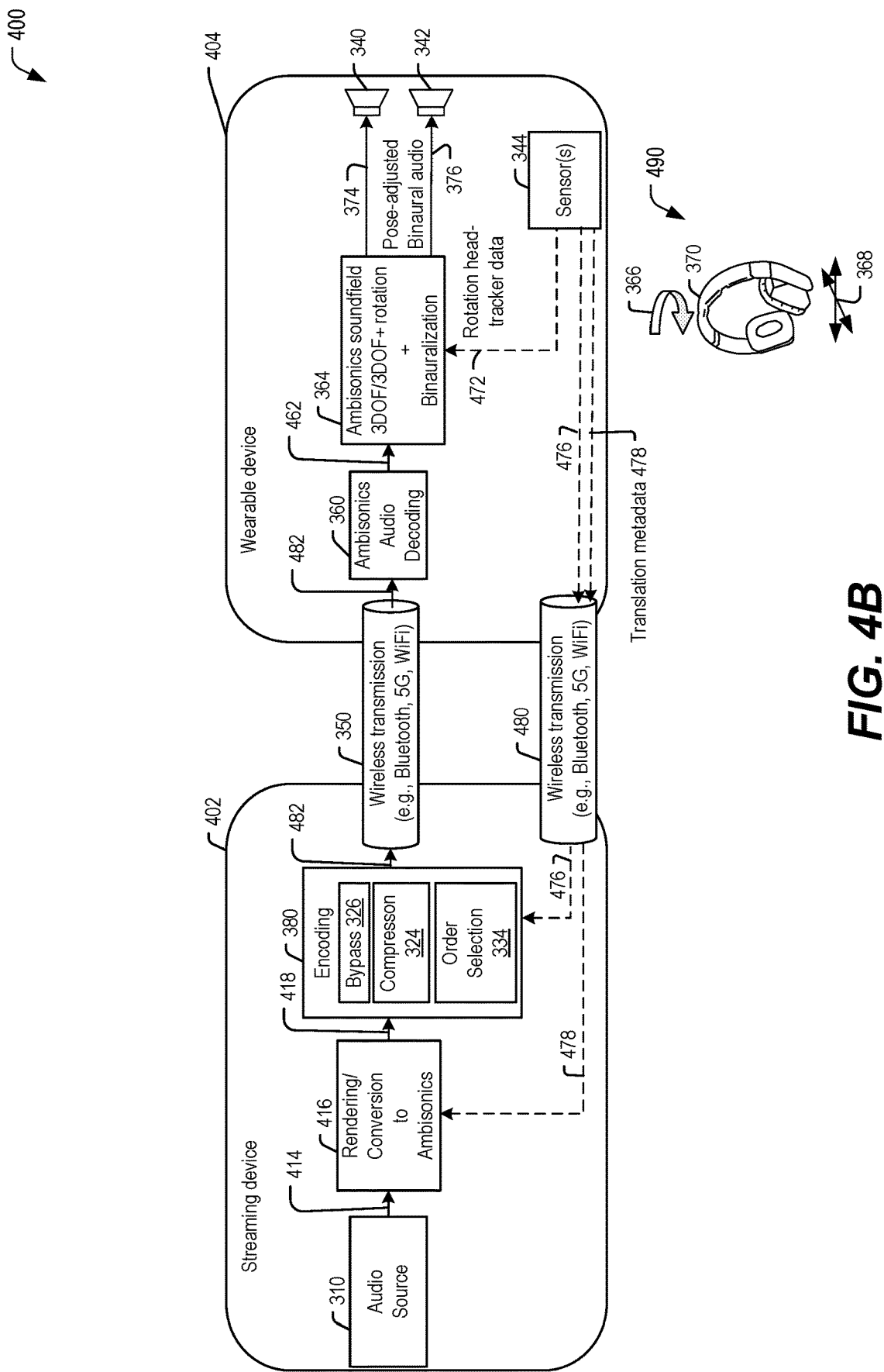
FIG. 4B is a block diagram illustrating a fourth implementation of components and operations of a system for adjusting a sound field.

FIG. 4B is a block diagram illustrating another implementation of the system 400 in which the ambisonics data 418 is processed by the encoding operation 380 of FIG. 3B (e.g., the bypass operation 326 or the compression encoding 324). Audio data 482 output from the encoding operation 380 can include compressed ambisonics coefficients from the compression encoding 324 or non-compressed ambisonics coefficients from the bypass operation 326. In addition, the audio data 482 can include a subset (e.g., fewer than all) of the ambisonics coefficients of the ambisonics data 418, such as due to operation of the order selection 334, the truncation operation 327, or a combination thereof.

In some implementations, the playback device 404 sends movement data 476 to the streaming device 402 via the wireless transmission 480. For example, the movement data 476 may include the rotation head-tracker data 472, the translation metadata 478, or a combination thereof. In some implementations, the movement data 476 is used in conjunction with the encoding operation 380 to determine an actual or predicted amount of motion of the playback device 404, which may be used to determine the order selection 334 at the playback device 404. In some implementations, the streaming device 402 processes the movement data 476 to determine an amount of motion of the playback device 404 or to predict an amount of motion of the playback device 404. Alternatively or in addition, the movement data 476 includes an indication of an amount of motion, or an indication of a predicted amount of motion, that is generated by the playback device 404 and transmitted to the streaming device 402. Alternatively or in addition, the movement data 476 can include an indication of the order selection 334 from the playback device 404.

The order selection 334 may be used to control the truncation operation 327 when operating in the bypass mode 329. Alternatively, or in addition, the order selection 334 may be used in conjunction with the compression encoding 324 when operating in the compression mode 330. For example, ambisonics coefficients associated with one or more unselected ambisonics orders may be discarded prior to performing the compression encoding 324, during performance of the compression encoding 324, or after the compression encoding 324 has been performed.

Figure 5A:
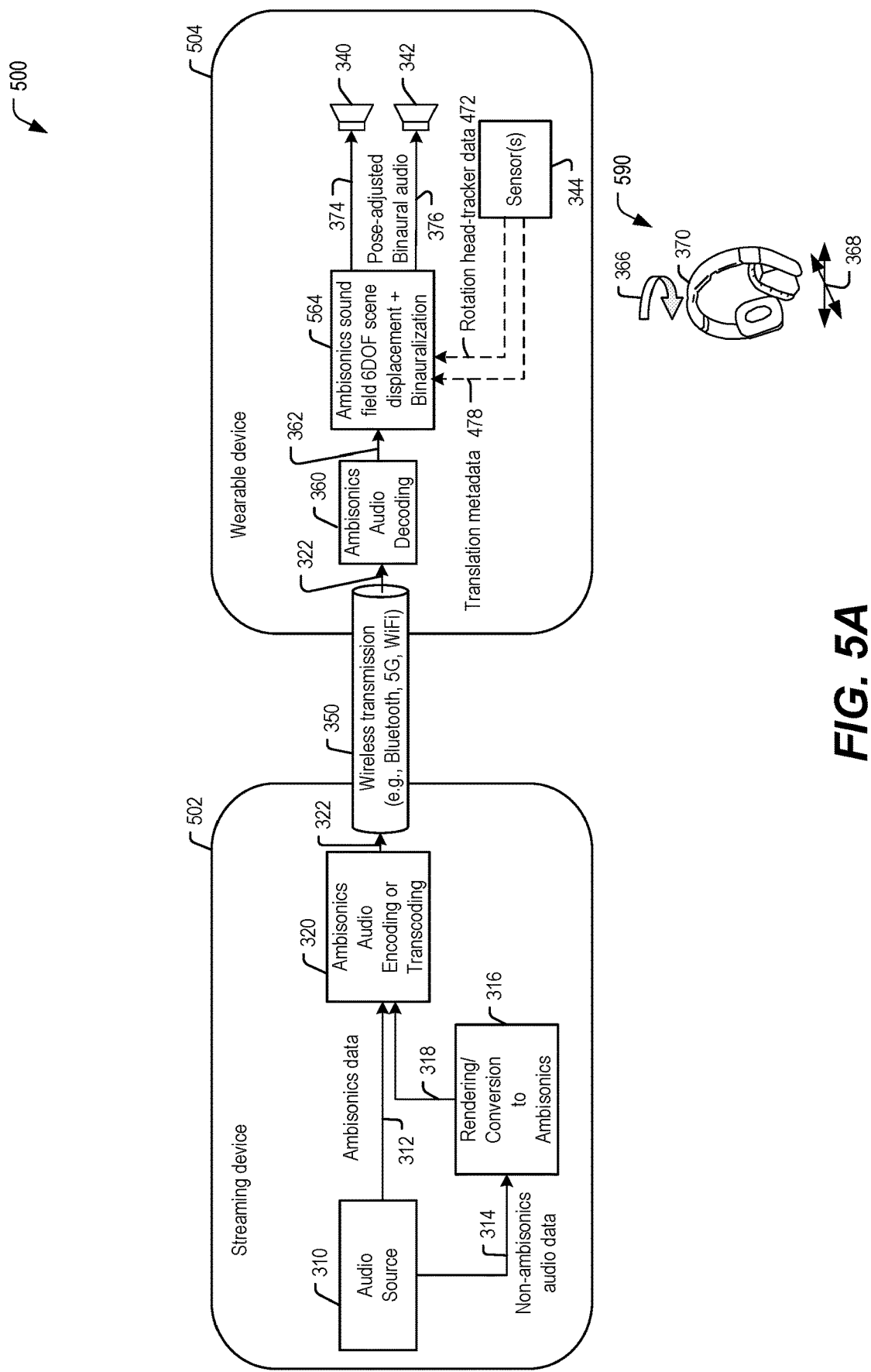
FIG. 5A is a block diagram illustrating a fifth implementation of components and operations of a system for adjusting a sound field.

FIG. 5A is a block diagram illustrating another implementation of components and operations of a system for adjusting a sound field. A system 500 includes a streaming device 502 coupled to a wearable device 504, also referred to as a playback device 504. The streaming device 502 includes the audio source 310 and performs one or more operations as described with reference to the streaming device 302 of FIG. 3A to provide the compressed coefficients 322 to the wearable device 504 via the wireless transmission 350.

The wearable device 504 (e.g., a headphone device) is configured to receive the compressed coefficients 322 and to perform the ambisonics audio decoding operation 360 to generate the ambisonics data 362. The wearable device 504 is also configured to generate the rotation head-tracker data 472 based on a rotation 366 of the wearable device 504 and to generate the translation metadata 478 based on a translation 368 of the wearable device 504, as described with reference to the wearable device 404 of FIG. 4A. A diagram 590 illustrates an example representation of the wearable device 504 implemented as a headphone device 370 to demonstrate examples of the rotation 366 and the translation 368.

An ambisonics sound field 6DOF scene displacement and binauralization operation 564 at the wearable device 504 performs compensation for head-rotation via sound field rotation based on the rotation head-tracker data 472 measured on the wearable device 504 and also modifies the sound field based on the user's location changes based on the translation metadata 478 (e.g., a 6DOF effect). In an illustrative example, audio processing for sound field rotation is relatively straightforward and can be performed with negligible latency (e.g., effectively instantaneously) in the time domain as compared to the update rate of the one or more sensors 344 (e.g., 100 updates per second); however, in some implementations updating of an ambisonics rotation matrix is performed with each new audio frame. Audio processing for translation for 6DOF at the wearable device 504 may include processing in a different domain, such as a short-time Fourier transform (STFT) domain, which may result in increased processing delay as compared to sound field rotation. However, the delay associated with translation processing at the wearable device 504 may be comparable to, or smaller than, the delay associated with transmitting translation data to the streaming device 502 and receiving updated audio data from the streaming device 502 based on the translation.

The ambisonics sound field 6DOF scene displacement and binauralization operation 564 at the wearable device 504 also performs binauralization of the compensated ambisonics sound field using HRTFs or BRIRs with or without headphone compensation filters associated with the wearable device 504 to output pose-adjusted binaural audio via a first output signal 3744 to a first loudspeaker 340 and a second output signal 376 to a second loudspeaker 342. In some implementations, the ambisonics audio decoding operation 360 and the ambisonics sound field 6DOF scene displacement and binauralization operation 564 can be combined into a single operation to reduce computation resource usage at the wearable device 504.

In some implementations, the wearable device 504 corresponds to the second device 202 of FIG. 2, the ambisonics audio decoding operation 360 is performed at the decoder 228, the ambisonics sound field 6DOF scene displacement and binauralization operation 564 is performed at the sound field adjuster 224 and the renderer 222, and the rotation head-tracker data 472 and the translation metadata 478 collectively correspond to the sensor data 246.

The system 500 therefore enables low rendering latency wireless immersive audio with rotation and translation processing post transmission.

Figure 5B:
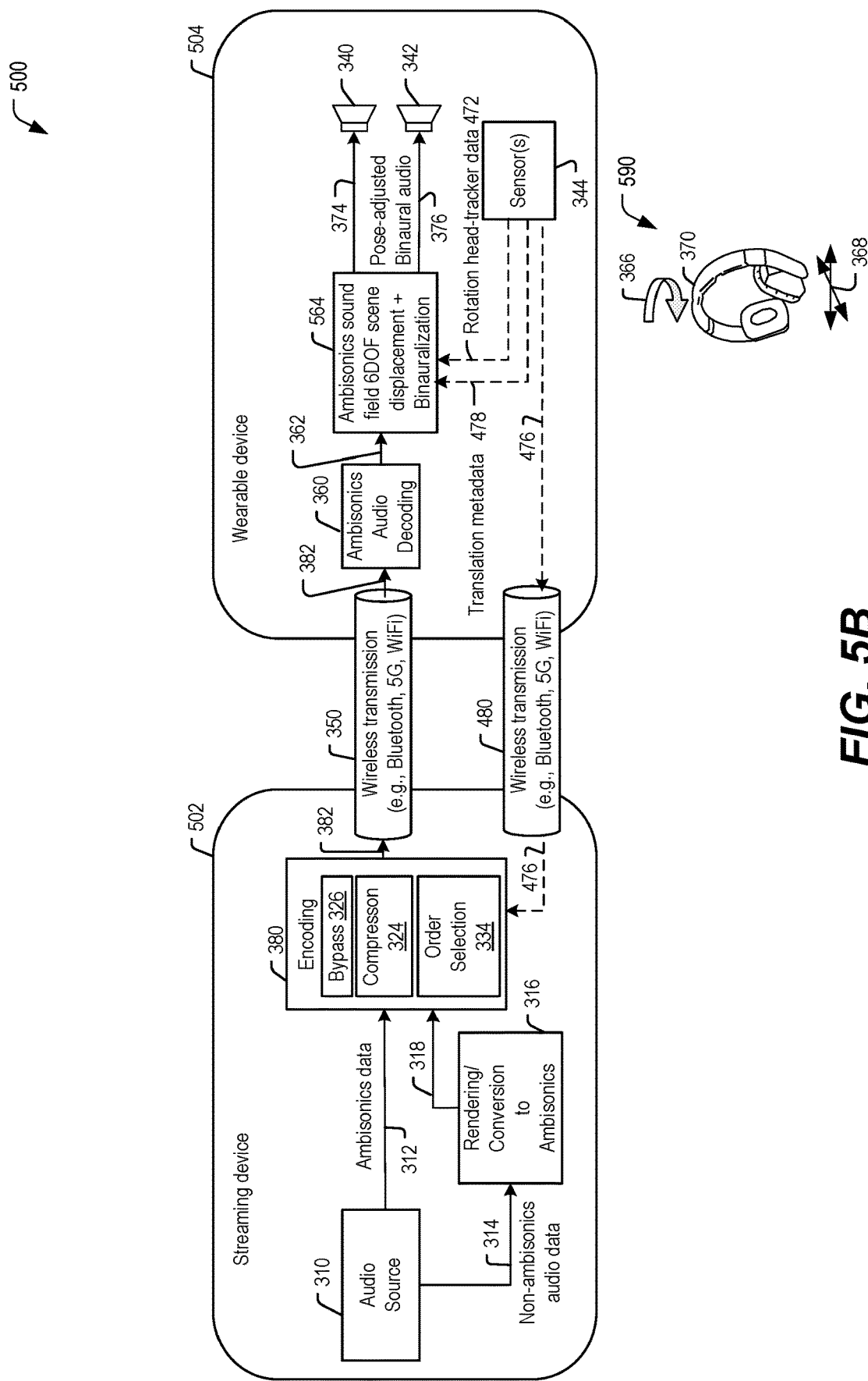
FIG. 5B is a block diagram illustrating a sixth implementation of components and operations of a system for adjusting a sound field.

FIG. 5B is a block diagram illustrating another implementation of the system 500 in which the ambisonics data 312 or 318 is processed by the encoding operation 380 of FIG. 3B (e.g., the bypass operation 326 or the compression encoding 324). The audio data 382 output from the encoding operation 380 can include compressed ambisonics coefficients from the compression encoding 324 or non-compressed ambisonics coefficients from the bypass operation 326. In addition, the audio data 382 can include a subset (e.g., fewer than all) of the ambisonics coefficients of the ambisonics data 312 or 318, such as due to operation of the order selection 334, the truncation operation 327, or a combination thereof.

In some implementations, the playback device 504 sends the movement data 476 to the streaming device 502 via the wireless transmission 480 described with reference to FIG. 4B. In some implementations, the movement data 476 is used in conjunction with the encoding operation 380 to obtain the order selection 334 and to reduce the number of ambisonics coefficients (either uncompressed or compressed) to send to the playback device 504.

Figure 6:
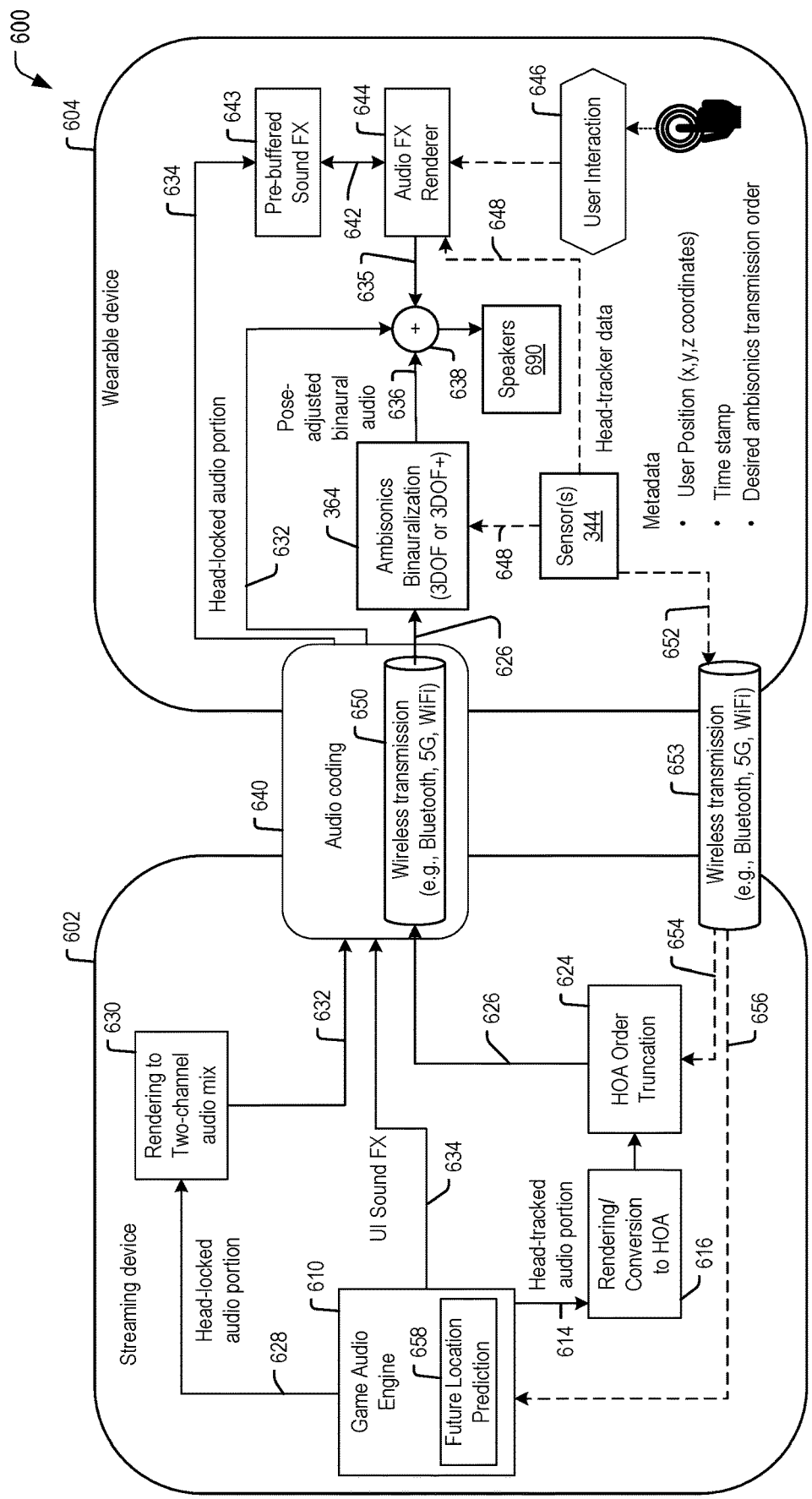
FIG. 6 is a block diagram illustrating a seventh implementation of components and operations of a system for adjusting a sound field.

FIG. 6 is a block diagram illustrating another implementation of components and operations of a system 600 for adjusting a sound field. The system 600 includes a streaming device 602 and a wearable device 604.

The streaming device 602 includes a game audio engine 610 that may correspond to the audio source 122. The game audio engine 610 outputs audio data including a head-tracked audio portion 614, a head-locked audio portion 628, and user interaction (UI) sound effects (FX) 634 (also referred to as "user interaction sound data 634"). To illustrate, the head-tracked audio portion 614 is updated to react to which way a person's head is turned when hearing sounds coming from the audio scene, while the head-locked audio portion 628 is not updated to react to which way the person's head is turned.

The streaming device 602 is configured to receive time-stamped location information 656 from the wearable device 604 via a wireless transmission 653. The streaming device 602 is configured to render the streamed audio content (e.g., the head-tracked audio portion 614) to an ambisonics sound field (e.g., FOA, HOA, or mixed-order ambisonics) and to use the received time-stamped location information 656 to account for a location change of a user of the wearable device 604. The time stamps enable prediction of future user movements, illustrated as a future location prediction 658, that allows the system 600 to reduce the latency of the translation processing as perceived at the wearable device 604.

The streaming device 602 is also configured to selectively reduce an ambisonic order of output ambisonic data via a HOA order truncation operation 624 that is based on a request for a particular ambisonics order 654 received from the wearable device 604. For example, the request for a particular ambisonics order 654 may request to receive FOA data (e.g., to reduce a processing load at the wearable device 604 or to accommodate reduced available network bandwidth for a wireless transmission 650), and the HOA order truncation operation 624 may remove second order and higher order ambisonics data generated by a rendering/conversion to HOA operation 616 (e.g., may remove the data corresponding to n>1 in FIG. 1) to generate output ambisonics data 626. In another example, the HOA order truncation operation 624 is based on an actual or predicted amount of motion of the wearable device 604, such as described with reference to FIG. 4B.

The streaming device 602 is also configured to render a head-locked two-channel headphone audio stream 632 based on the head-locked audio portion 628 via a rendering to two-channel audio mix operation 630. The streaming device 602 is further configured to send the user interaction sound data 634 to the wearable device 604 to enable the wearable device 604 to pre-buffer the user interaction sound data 634 to reduce latency in playing out the user interaction sound data 634, as described further below.

The streaming device 602 performs an encoding portion of an audio coding operation 640. In some implementations, the audio coding operation 640 includes compressing the ambisonics coefficients (e.g., the output ambisonics data 626) and the head-locked two-channel headphone audio stream 632, such as with a low-delay codec (e.g., based on AptX, AAC-LD, or EVS), and the streaming device 602 transmits the compressed audio data wirelessly to the wearable device 604 along with the user interaction sound data 634 within a configuration payload. In other implementations, the audio coding operation 640 does not include compressing the ambisonics coefficients, such as described with reference to the bypass operation 326 of FIG. 3B.

In some implementations, the streaming device 602 corresponds to the first device 102 of FIG. 2, the game audio engine 610 corresponds to the audio source 122, the rendering/conversion to HOA operation 616 is performed at the sound field representation generator 124, the HOA order truncation operation 624 and the rendering to two-channel audio mix operation 630 are performed by the one or more processors 120, and an encoding portion of the audio coding operation 640 is performed at the encoder 128.

The wearable device 604 decodes the ambisonics coefficients (e.g., the output ambisonics data 626) and the head-locked audio (e.g., the head-locked two-channel headphone audio stream 632) via a decoding portion of the audio coding operation 640. The wearable device 604 also decodes the user interaction sound data 634 and buffers the decoded user interaction sound data 634 in memory as pre-buffered user interaction sound data 643.

The wearable device 604 compensates for head-rotation via sound field rotation based on head-tracker data 648 measured via the one or more sensors 344 on the wearable device 604 (and optionally also processes a low-latency 3DOF+ effect with limited translation), via operation of the ambisonics sound field 3DOF/3DOF+ rotation and binauralization operation 364, to generate pose-adjusted binaural audio data 636. The wearable device 604 also generates metadata 652 for transmission to the streaming device 602. The metadata 652 includes the request for a particular ambisonics order 654 and the time-stamped location information 656 (e.g., indicating user positions (e.g., using (x,y,z) coordinates) and time stamps associated with the user positions).

The pose-adjusted binaural audio 636 and the head-locked audio portion 632 are combined at a combiner 638 (e.g., a mixer) and output to speakers 690 (e.g., the loudspeakers 340, 342) of the wearable device 604. In addition, a user interaction sound 635 may be triggered by a user interaction 646 detected at the wearable device 604 and the user interaction sound 635 may be provided to the combiner 638 to be played out at the loudspeakers. For example, in response to detecting the user interaction 646 (e.g., by detecting that the translation data 368 indicates that the user of the wearable device 604 is at a location of a virtual object within the game environment, is oriented to face the virtual object, or a combination thereof), audio data 642 corresponding to a particular user interaction is retrieved from the pre-buffered user interaction sound data 643 stored in the memory on the wearable device 604. The audio data 642 is rendered at an audio effects renderer 644, which may also take the head-tracker data 648 into account, to generate the user interaction sound 635. The pre-buffered user interaction sounds are thus triggered and rendered in low latency at the wearable device 604.

To reduce memory usage on the wearable device 604, in some implementations one or more initial audio frames of each of the user interaction sounds represented in the user interaction sound data 634 are decoded and the decoded frames are pre-buffered at the wearable device 604 and the remaining encoded frames are stored at the memory on the wearable device 604. Once the sound effect is triggered, the previously decoded and pre-buffered initial one or more frames are played out with low latency while the remaining frames are decoded so that the remaining frames are available for playout following the playout of the initial one or more frames.

In some implementations, the wearable device 604 corresponds to the second device 202 of FIG. 2, the decoding portion of the audio coding operation 640 is performed at the decoder 228, the ambisonics sound field 3DOF/3DOF+ rotation and binauralization operation 364 is performed at the sound field adjuster 224 and the renderer 222, and the head-tracker data 648 corresponds to the sensor data 246.

Although the system 600 illustrates processing head-locked audio, pre-buffering user interaction sounds, and HOA order truncation, in other implementations the functionality associated with the head-locked audio processing, the user interaction sounds, the HOA order reduction, or any combination thereof, may be omitted.

The system 600 therefore enables low rendering latency wireless immersive audio by further incorporating pose prediction and interactive sound rendering.

Figure 7:
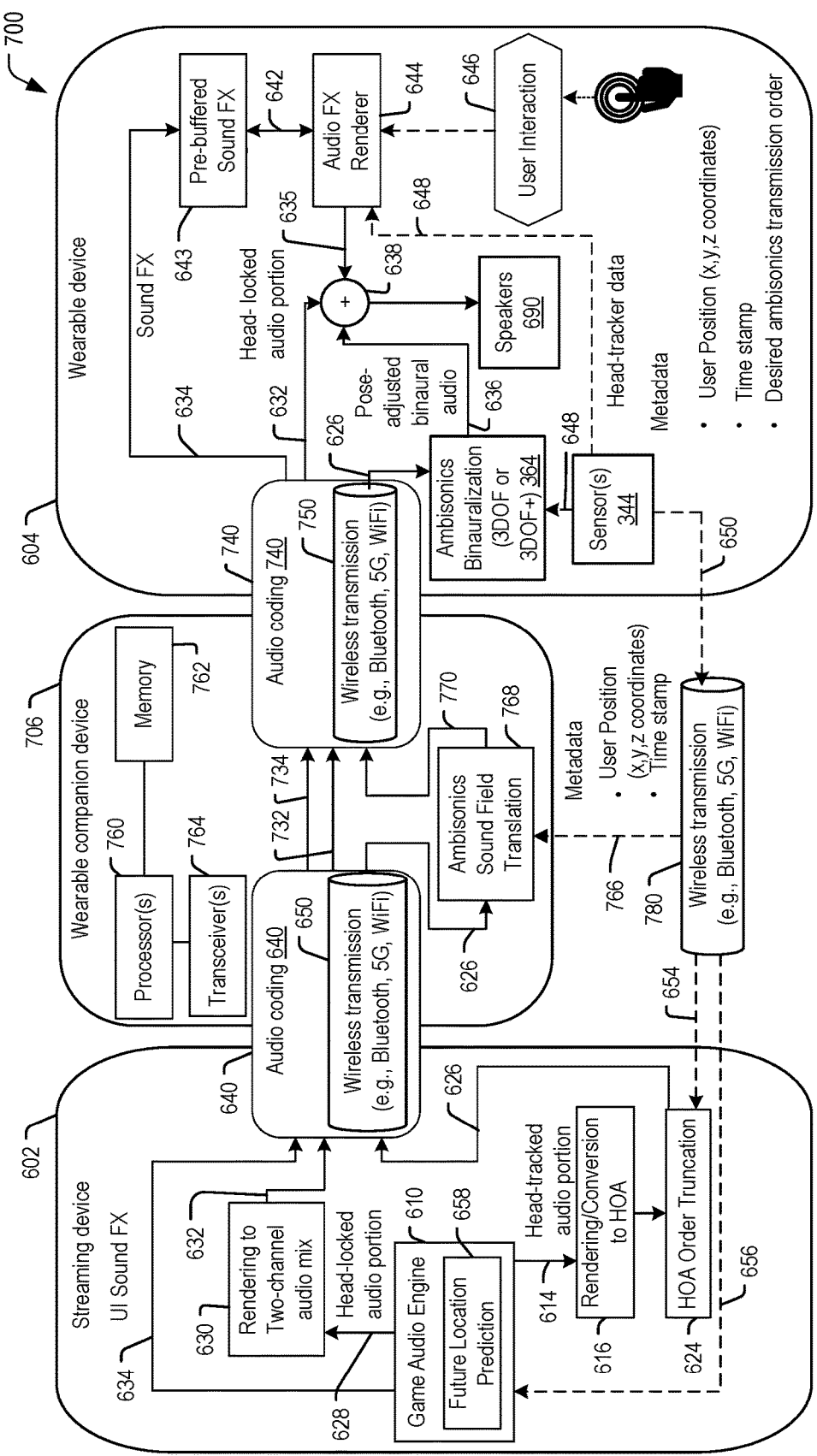
FIG. 7 is a block diagram illustrating an eighth implementation of components and operations of a system for adjusting a sound field.

FIG. 7 is a block diagram illustrating another implementation of components and operations of a system 700 for adjusting a sound field. The system 700 includes a wearable companion device 706 coupled to the streaming device 602 and to the wearable device 604. The streaming device 602 and the wearable device 604 operate in a similar manner as described with reference to FIG. 6.

The wearable companion device 706 is associated with the wearable device 604 and receives the ambisonics coefficients (e.g., the output ambisonics data 626) from the streaming device 602, performs a low-latency ambisonics sound field translation operation 768 based on location information (e.g., user position and time stamp data 766) received from the wearable device 604 via a wireless transmission 780, and transmits the translated sound field wirelessly to the wearable device 604. For example, the ambisonics sound field translation operation 768 outputs adjusted audio data 770 to be encoded via an encoding portion of an audio coding operation 740 and transmitted to the wearable device 604 via a wireless transmission 750. The user interaction sound data 634 may remain encoded at the wearable companion device 706 (as encoded sound data 734) and may be re-transmitted to the wearable device 604 via the wireless transmission 750. The head-locked two-channel headphone audio stream 632 may remain encoded at the wearable companion device 706 (as encoded head-locked two-channel headphone audio stream 732) and may be re-transmitted to the wearable device 604 via the wireless transmission 750.

The ambisonics sound field translation operation 768 may adjust the sound field based on the actual detected user position or based on a future location prediction of the wearable device 604 for the time at which the currently-adjusted audio will be played out at the wearable device 604. For example, future location prediction can be performed by estimating a direction and speed of movement of the wearable device 604 as indicated by changes between two or more most recent locations of the wearable device 604 and extrapolating, based on the direction and speed, a location that the wearable device 604 will be at a specific future time. The future time can be at least partially based on a transmission latency associated with a transmission path to the wearable device 604, so that the longer it takes for the audio data to reach the wearable device 604, the farther into the future the future location prediction is made. In some implementations, future location prediction is performed at the streaming device 602, at the wearable companion device 706, or at both. In some implementations, a latency associated with generating the adjusted audio data 770 at the wearable companion device 706 and transmitting the adjusted audio data 770 to the wearable device 604 is sufficiently small to enable use of the actual user position (i.e., not future prediction) to shift the sound field without causing a user-perceptible delay between the user's movement and a corresponding shift in the sound field during playback.

The wearable companion device 706 includes one or more processors 760 coupled to one or more transceivers 764 and to a memory 762. The memory 762 stores instructions that are executable by the one or more processors 760. The one or more processors 760 are configured to receive, from the streaming device 602, compressed audio data (e.g., a compressed version of the output ambisonics data 626 generated during an encoding portion of the audio coding operation 640) that represents a sound field. The one or more processors 760 are configured to receive, from a playback device (e.g., the wearable device 604), data corresponding to locations associated with the playback device at a plurality of time instances (e.g., the user position and time stamp data 766). In some implementations, the one or more processors 760 are configured to generate a predicted location of the device based on the data corresponding to the locations associated with the playback device. The predicted location indicates a prediction of where the playback device will be when the audio data is played out at the playback device.

The one or more processors 760 are configured to decompress the compressed audio data, such as via a decoding portion of the audio coding operation 640, and to adjust the decompressed audio data to translate the sound field based on the predicted location, such as via the ambisonics sound field translation operation 768. The one or more processors 760 are configured to compress the adjusted audio data 770 (e.g., at an encoding portion of the audio coding operation 740) and send the compressed adjusted audio data as streaming data, via wireless transmission, to the playback device.

The wearable companion device 706 enables offloading of computationally expensive operations, such as sound field translation, to a device that is closer to the wearable device 604 than the streaming device 602 and that can have increased computation and power resources as compared to the wearable device 604, such as a smart phone, smart watch, or one or more other electronic devices. Sound field translation (either based on actual or predicted user location) performed at the wearable companion device 706 can be more accurate as compared to sound field translation (either based on actual or predicted user location) performed by the streaming device 602 due to the reduced distance, and therefore reduced transmission latency, to and from the wearable device 604. As a result, a user experience may be improved.

The systems illustrated in FIGS. 6 and 7 thus illustrate several operations that may be performed by the streaming device 602, the wearable device 604, and optionally the wearable companion device 706. In some implementations, the streaming device 602 includes one or more processors (e.g., the one or more processors 120) configured to receive sound information from an audio source (e.g., the game audio engine 610). The one or more processors of the streaming device 602 are also configured to receive, from a playback device (e.g., the wearable device 604), data corresponding to locations associated with the playback device at a plurality of time instances (e.g., the time stamped user position data 656).

The one or more processors of the streaming device 602 are also configured to convert the sound information to audio data that represents a sound field based on the data corresponding to the locations associated with the playback device (e.g., via the rendering/conversion to HOA operation 616). The one or more processors of the streaming device 602 are also configured to send the audio data as streaming data, via wireless transmission, to one or both of the playback device (e.g., the wearable device 604) or a second device (e.g., the wearable companion device 706) that is coupled to the playback device.

In some implementations, the one or more processors of the streaming device 602 are configured to generate a predicted location (e.g., the predicted future location 658) of the playback device based on the data corresponding to the locations associated with the playback device. The predicted location indicates a prediction of where the playback device (e.g., the wearable device 604) will be when the audio data is played out at the playback device. The one or more processors of the streaming device 602 are configured to convert the sound information to the audio data (e.g., the head-tracked audio portion 614) that represents the sound field based on the predicted location.

In some implementations, the one or more processors of the streaming device 602 are configured to send, to one or both of the playback device (e.g., the wearable device 604) or the second device (e.g., the wearable companion device 706), sound effects data (e.g., the user interaction sound data 634) from the audio source to be buffered and accessible to the playback device for future playout, and at least a portion of the sound effects data is sent independently of any scheduled playout of the portion of the sound effects data.

In some implementations, the one or more processors of the streaming device 602 are configured to receive, from the audio source, a head-locked audio portion (e.g., the head-locked audio portion 628), and generate, based on the head-locked audio portion, head-locked audio data corresponding to pose-independent binaural audio (e.g., the head-locked two-channel headphone audio stream 632).

In some implementations, the one or more processors of the streaming device 602 are configured to send the head-locked audio data, via wireless transmission, to one or both of the playback device or the second device to be played out at the playback device.

In some implementations, the audio data corresponds to ambisonics data, and the one or more processors of the streaming device 602 are further configured to receive an indication of an ambisonics order from the playback device (e.g., the request for a particular ambisonics order 654) and to adjust the audio data to have the ambisonic order (e.g., via the HOA order truncation operation 624).

In some implementations, the one or more processors of the streaming device 602 are configured to, after receiving the data corresponding to the locations associated with the playback device, receive additional data corresponding to locations associated with the playback device, generate updated audio data based on the additional data, and send the updated audio data to the playback device.

The wearable device 604 of FIGS. 6 and 7, in some implementations, includes one or more processors (e.g., the one or more processors 220) configured to receive sound information from an audio source (e.g., the game audio engine 610).

The one or more processors of the wearable device 604 are configured to obtain data, at a plurality of time instances, associated with tracking location and an orientation associated with movement of the wearable device 604, such as the head-tracker data 648, the metadata 652, the time stamped user position data 656, the user position and time stamp data 766, or any combination thereof. The one or more processors of the wearable device 604 are also configured to send the data to a remote device (e.g., the streaming device 602 or the wearable companion device 706) via wireless transmission.

The one or more processors of the wearable device 604 are also configured to receive, via wireless transmission from the remote device, compressed (or uncompressed) audio data representing a sound field, to decompress the compressed audio data representing the sound field, to adjust the decompressed audio data (e.g., the output ambisonics data 626) to alter the sound field based on the orientation associated with the wearable device 604, and to output the adjusted decompressed audio data (e.g., the pose-adjusted binaural audio data 636, to two or more loudspeakers (e.g., via the combiner 638).

In some implementations, the wearable device 604 includes a memory configured to store the decompressed audio data, such as the memory 210 of FIG. 2. The one or more processors of the wearable device 604 may be configured to adjust the decompressed audio data based on applying the data associated with tracking the location and the orientation associated with the movement of the wearable device 604, such as via the ambisonics sound field 3DOF/3DOF+ rotation and binauralization operation 364. The decompressed audio data can include ambisonic data that corresponds to at least one of two-dimensional (2D) data that represents a 2D sound field or three-dimensional (3D) data that represents a 3D sound field.

In some implementations, the one or more processors of the wearable device 604 are configured to further adjust the decompressed audio data to translate the sound field based on a difference between a location of the wearable device 604 and a location associated with the sound field, where adjustment of the decompressed audio data based on the difference is restricted to translation of the sound field forward, backward, left, or right. For example, the adjustment of the decompressed audio data based on the difference can be performed as a 3DOF+ effect during performance of the ambisonics sound field 3DOF/3DOF+ rotation and binauralization operation 364.

In some implementations, the one or more processors of the wearable device 604 are also configured to receive head-locked audio data via wireless transmission, such as the head-locked two-channel headphone audio stream 632, and to combine the head-locked audio data with the adjusted decompressed audio data, such as at the combiner 638, for output to the two or more loudspeakers. In an example, the adjusted decompressed audio data (e.g., the pose-adjusted binaural audio data 636) corresponds to pose-adjusted binaural audio, and the head-locked audio data (e.g., the head-locked two-channel headphone audio stream 632) corresponds to pose-independent binaural audio.

In some implementations, the wearable device 604 includes a buffer accessible to the one or more processors, such as the memory 210, a dedicated portion of the memory 210, one or more other storage devices or buffers, or a combination thereof. The one or more processors of the wearable device 604 may be further configured to receive sound effect data ahead of time via wireless transmission and to pre-buffer the sound effect data in the buffer, such as the pre-buffered user interaction sound data 643.

In some implementations, the one or more processors of the wearable device 604 are also configured to, responsive to receiving an indication of user interaction with a virtual object associated with the sound effect data, retrieve, from the buffer, a portion of the pre-buffered sound effect data corresponding to the virtual object and combine the portion of the pre-buffered sound effect data (e.g., rendered as the user interaction sound 635) with the adjusted decompressed audio data (e.g., the pose-adjusted binaural audio data 636) for output to the two or more loudspeakers.

In some implementations, the one or more processors of the wearable device 604 are configured to send an indication of an ambisonic order to the remote device, such as the request for a particular ambisonics order 654, and responsive to sending the indication, receive updated audio data having the ambisonic order via wireless transmission.

Figure 8A:
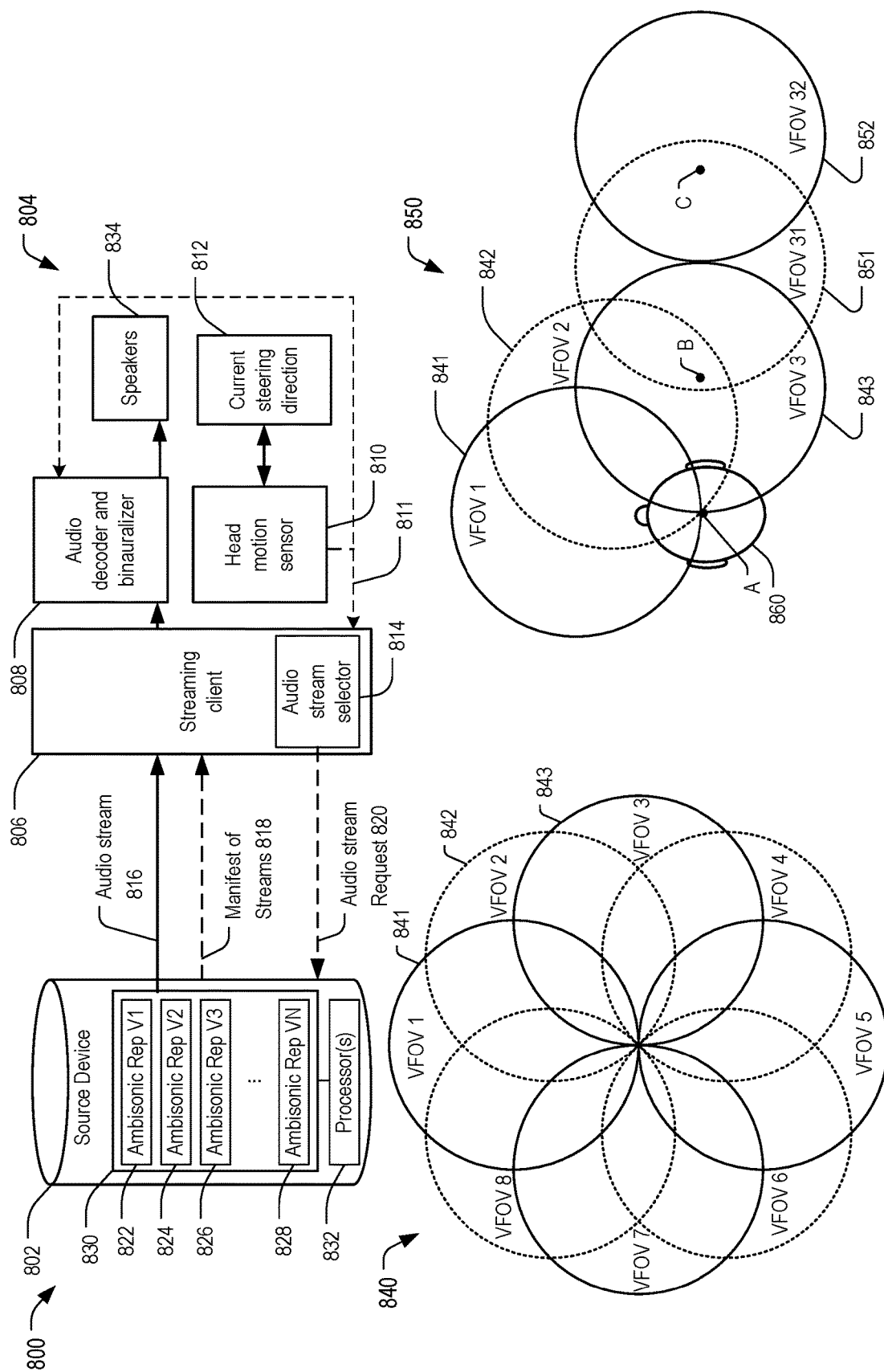
FIG. 8A is a block diagram illustrating a ninth implementation of components and operations of a system for adjusting a sound field.

FIG. 8A is a block diagram illustrating another implementation of components and operations of a system 800 for adjusting a sound field. The system 800 includes a source device 802 coupled to a device 804, also referred to as a playback device 804. The source device 802 is configured to provide, to the device 804, an audio stream 816 based on an ambisonics representation that is selected from multiple ambisonics representations of a sound scene. The source device 802 may correspond to a portable electronic device (e.g., a phone), a vehicle (e.g., a car), or a server (e.g., a cloud server), as illustrative, non-limiting examples.

The source device 802 includes one or more processors 832 and a memory 830. The memory 830 is coupled to the one or more processors 832 and is configured to store a plurality of representations of the sound field. As illustrated, the memory 830 includes multiple ambisonics representations 822-828 of the sound field corresponding to different viewport fields of view of the device 804. In some implementations, the Nth ambisonics representation VN 828 (where N is a positive integer) corresponds to an ambisonics representation of the sound field that is not specific to any particular viewport field of view. In some implementations, the source device 802 corresponds to the first device 102, the one or more processors 832 correspond to the one or more processors 120, and the memory 830 corresponds to the memory 110. In some implementations, the source device 802 corresponds to one or more of the streaming devices of FIGS. 3A-7.

The one or more processors 832 are configured to provide, to the device 804, a manifest of streams 818 that indicates the ambisonics representations 822-828 available at the memory 830. The one or more processors 832 are also configured to receive an audio stream request 820 from the device 804 indicating a selected one of the ambisonics representations 822-828 and, in response to the audio stream request, update the audio stream 816 based on the selected ambisonics representation.

The device 804 includes a streaming client 806, an audio decoder and binauralizer 808, a head motion sensor 810, and multiple speakers 834. The streaming client 806 and the audio decoder and binauralizer 808 may be implemented at the device 804 via one or more processors executing instructions from a memory, such as the one or more processors 220 of the second device 202 of FIG. 2 executing the instructions 212 stored at the memory 210. In some implementations, the device 804 corresponds to the second device 202, the audio decoder and binauralizer 808 corresponds to the decoder 228, the sound field adjuster 224, and the renderer 222, the head motion sensor 810 corresponds to the one or more sensors 244, and the speakers 834 correspond to the speakers 240, 242. In some implementations, the device 804 corresponds to one or more of the wearable devices of FIGS. 3A-7.

The streaming client 806 is configured to receive the audio stream 816 and provide the audio stream 816 to the audio decoder and binauralizer 808, which outputs pose-adjusted binaural audio signals to the speakers 834. The head motion sensor 810 determines a pose of the device 804 via detection of a location and orientation of the device 804. To illustrate, the head motion sensor 810 detects a current steering direction 812 of the device 804, which may correspond to a viewport field of view of the device 804, and outputs head tracker data 811 (e.g., the sensor data 246). The head tracker data 811 is provided to the audio decoder and binauralizer 808 for sound field rotation (e.g., 3DOF), rotation and limited translation (e.g., 3DOF+), or rotation and translation (e.g., 6DOF). The head tracker data 811 is also provided to an audio stream selector 814 of the streaming client 806.

The audio stream selector 814 selects one of the ambisonics representations 822-828 based on the location of the device 804, the current steering direction 812 or other rotation information, or a combination thereof. The audio stream selector 814 issues the audio stream request 820 upon determining that the selected ambisonics representation is different than the previously selected ambisonics representation corresponding to the audio stream 816.

A diagram 840 illustrates eight overlapping viewport fields of view VFOV 1-VFOV 8, in which the viewport fields of view are shown using alternating dashed lines and solid lines for clarity of illustration. Each of the viewport fields of view corresponds to a 45-degree rotation of the head of a wearer of the device 804 when the wearer is located at the center of the diagram 840. In an example, the diagram 840 may correspond to eight possible viewports in a VR device in a 2D plane. Alternatively, the diagram 840 may correspond to a 2D cross-section of eight overlapping spherical viewports in a VR device in a 3D space.

Each of the overlapping viewport fields of view corresponds to a respective ambisonics representation in the memory 830. For example, a first viewport field of view 841 corresponds to a first ambisonics representation 822, a second viewport field of view 842 corresponds to a second ambisonics representation 824, a third viewport field of view 843 corresponds to a third ambisonics representation 826. Although eight viewport fields of view are illustrated in a rotationally symmetric arrangement, in other implementations fewer than eight or more than eight viewport fields of view may be used, may be arranged in different arrangements, or a combination thereof.

During operation, the wearer of the device 804 (e.g., a headphone device) may face toward the first viewport field of view 841 (e.g., a first pose of the device 804). The device 804 transmits data associated with the first pose of the device 804, such as an audio stream request 820 for the first ambisonics representation 822, or orientation information, translation information, or both in implementations in which the source device 802 is configured to select the ambisonics representation for the device 804 based on the pose of the device 804.

The source device 802 receives, via wireless transmission from the device 804 (e.g., a playback device), the data associated with the first pose of the playback device 804. The source device 802 selects, based on the data, a particular representation of the sound field (e.g., the first ambisonics representation 822) from the plurality of representations 822-828 of the sound field stored at the memory 830. The source device 802 generates audio data corresponding to the selected first ambisonics representation 822 and sends, via wireless transmission, the audio data as streaming data (e.g., the audio stream 816) to the device 804. The audio data may be sent as compressed ambisonics coefficients or as uncompressed ambisonics coefficients, such as based on a latency criterion, an available bandwidth, or both, as described with reference to FIG. 3B.

The device 804 receives, via wireless transmission from the source device 802, the audio data corresponding to the first ambisonics representation 822 of the sound field corresponding to the first viewport field of view 841 associated with the first pose of the device 804. If the audio data is compressed, the device 804 decompresses the compressed audio data, and the device 804 outputs the resulting audio to the speakers 834 (e.g., two or more loudspeakers).

In response to the wearer of the device 804 rotating the user's head toward the second viewport field of view 842 (e.g., a second pose of the device 804), the device 804 sends, to the source device 802, data associated with the second pose (e.g., an audio stream request 820 for the second ambisonics representation 824, or orientation information, translation information, or both).

The source device 802 receives the second data associated with the second pose and selects, based on the second data, the second ambisonics representation 824 of the sound field from the plurality of representations of the sound field as corresponding to the second viewport field. The source device 802 generates second audio data corresponding to the second representation of the sound field and sends, via wireless transmission, the second audio data as streaming data (e.g., the audio stream 816) to the device 804.

The device 804 receives the updated audio data from the source device 802 that corresponds to the second ambisonics representation 824 of the sound field, which corresponds to the second viewport field of view 842 that partially overlaps the first viewport field of view 841 and that is associated with the second pose. The device 804 outputs the updated audio data to the speakers 834.

In some implementations, such as when the ambisonics representations 822-828 correspond to using mixed order ambisonics, the first ambisonics representation 822 provides higher resolution for audio sources in the first viewport field of view 841 than for audio sources outside the first viewport field of view 841, and the second ambisonics representation 824 provides higher resolution for audio sources in the second viewport field of view 842 than for audio sources outside the second viewport field of view 842. By changing sound fields as the steering direction of the device 804 changes, higher resolution may be provided for sounds of interest to the wearer, while bandwidth and processing resources may be conserved by reducing resolution for sounds that are likely of lesser interest to the wearer.

Although in some implementations the ambisonics representations 822-828 correspond to using mixed order ambisonics, in other implementations the ambisonics representations 822-828 correspond to using the full ambisonics order. In other examples, the source device 802 may provide one or more of object-based representations of the sound field, higher order ambisonics representations of the sound field, mixed order ambisonics representations of the sound field, a combination of object-based representations of the sound field with higher order ambisonics representations of the sound field, a combination of object-based representations of the sound field with mixed order ambisonics representations of the sound field, or a combination of mixed order representations of the sound field with higher order ambisonics representations of the sound field. By changing between representations corresponding to overlapping viewport fields of view, abrupt transitions in the immersive audio due to switching between non-overlapping representations may be reduced or avoided, improving the user experience.

In addition to changing ambisonics representations of the audio field based on rotation, in some implementations the ambisonics representations of the audio field are selected based on translation of the device 804, such as due to a wearer of the device 804 walking from the wearer's position at the center of the diagram 840.

A second diagram 850 illustrates a portion of a set of viewport fields of view that may include, in addition to VFOV 1-8 of the first diagram 840, a fourth viewport field of view 851 (VFOV 31) and a fifth viewport field of view 852 (VFOV 32). A wearer 860 of the device 804 is illustrated having a first pose at a location "A" and facing the first viewport field of view 841. The wearer 860 may move to a second pose in which the device 804 is translated to a location "B" within the third field of view 843 and rotated to face the fourth viewport field of view 851. During the transition between the first pose and the second pose, the device 804 may receive streaming audio that transitions from being encoded based on the first ambisonics representation 822 (corresponding to VFOV 1) to being encoded based on the second ambisonics representation 824 (corresponding to VFOV 2) to being encoded based on the third ambisonics representation 826 (corresponding to VFOV 3). Upon attaining the second pose at location B, the device 804 receives streaming audio based on a representation of the sound field corresponding to the fourth viewport field of view 851.

Further movement of the device 804 from the second pose at location B to a third pose, in which the wearer of the device 804 is at location "C" and faces toward the fifth viewport field of view 852, results in the device 804 receiving streaming audio based on a representation of the sound field corresponding to the fifth viewport field of view 852. Thus, the representations of the sound field selected from the memory 830 can be selected based on rotation (e.g., as described for the diagram 840), based on translation (e.g., moving from the second pose at location B to the third pose at location C), or based on both the rotation and translation (e.g., moving from the first pose at location A to the second pose at location C).

In some implementations, the device 804, the source device 802, or both, are configured to select a representation of the sound field corresponding to a translation of the sound field, and the translation of the sound field exceeds a translation of the device 804 between a first pose and a second pose. For example, the device 804 can select the representation of the sound field associated with the fifth viewport field of view 852 even though the wearer 860 has not moved from location A. For example, the wearer 860 may be in a game that allows the wearer 860 to "jump" to a distant location (e.g., to location C), or the device 804 may include a camera that is able to associate audio with a distant source, the device 804 can transition directly from one representation of the sound field (e.g., corresponding to third viewport field of view 843) to a second representation of the sound field (e.g., corresponding to fifth viewport field of view 852) without transitioning through representations of the sound field corresponding to intervening viewport fields of view (e.g., without using the representation of the sound field corresponding to fourth viewport field of view 851).

Thus, the ambisonics representations may be streamed based on rotation, translation, or both and the appropriate ambisonics representation of a sound field may be sent to the device 804.

Figure 8B:
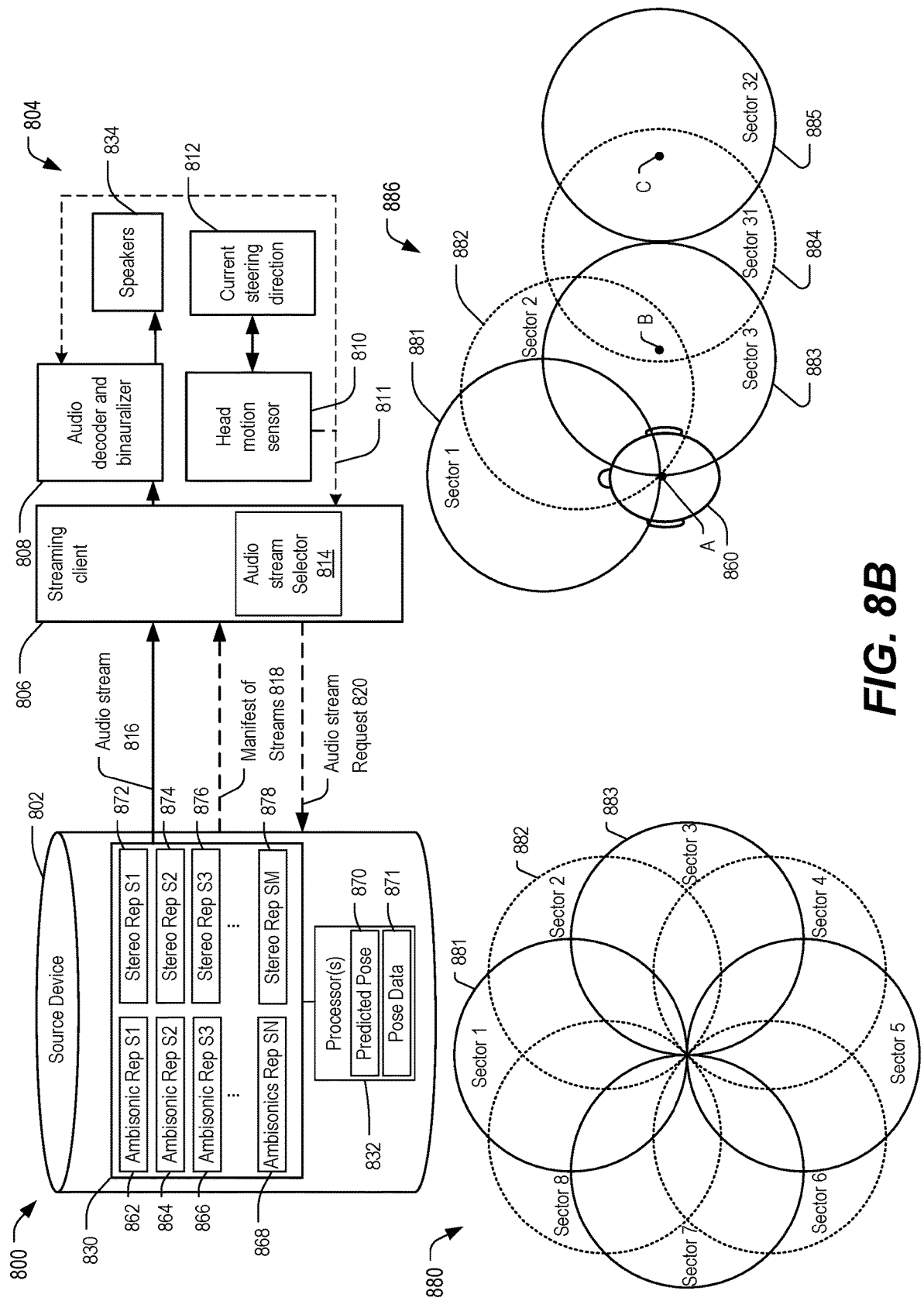
FIG. 8B is a block diagram illustrating a tenth implementation of components and operations of a system for adjusting a sound field.

FIG. 8B includes a block diagram of another implementation of the system 800 in which the source device 802 stores representations of multiple sectors of a sound scene.

The representations of the sectors of the sound scene are stored in multiple formats, illustrated as ambisonics representations 862-868 of a sound field corresponding to sectors 1-N respectively and pre-rendered stereo representations 872-878 corresponding to sectors 1-M, respectively, where M is a positive integer. Although in some implementations the sectors of the sound scene may be analogous to, and/or may coincide with, the viewport fields of view illustrated in FIG. 8A, the system 800 of FIG. 8B can be used independently of any visual references, such as in audio-only implementations, extended reality (XR) implementations, or augmented reality (AR) implementations that are devoid of any viewport fields of view, as illustrative, non-limiting examples.

In some implementations, each respective ambisonics representation 862-868 of the sound field corresponds to a different sector of a set of sectors, such as a first sector 881, a second sector 882, and a third sector 883 illustrated in a diagram 880. Each of the sectors represents a range of values associated with movement of the playback device 804. Each of the ambisonics representations 862-868 includes ambisonics data (e.g., ambisonics coefficients corresponding to zeroth order ambisonics, first order ambisonics, higher order ambisonics, mixed order ambisonics, or a combination thereof). In some implementations, the ambisonics representations 862-868 include or correspond to pre-rotated sound fields. To illustrate, the ambisonics representations 862-868 may correspond to regular increments of rotation around an axis, such as one-degree increments, and the memory 830 may store at least 360 ambisonics representations (e.g., N=360). As other examples, the ambisonics representations 862-868 may correspond to pre-rotated sound fields at five-degree increments (e.g., N=72), or any other increment size. Similarly, in some implementations, each respective stereo representation also includes pre-rendered stereo data corresponding to pre-rotated sound fields, such as at 45-degree increments (e.g., M=8), or at any other increment size. Although in some implementations uniform increments are used (e.g., 45-degree increments), in other implementations non-uniform increment sizes may be used.

The one or more processors 832 of the source device 802 are configured to receive, via wireless transmission from a playback device 804, pose data 871 associated with a pose of the playback device 804. For example, the pose data 871 may be included in the audio stream request 820 and may include orientation information, translation information, or both. The orientation information may indicate a detected orientation, a detected rotation (e.g., a change in orientation), or both, of the playback device 804. The translation information may indicate a detected location, a detected translation (e.g., a change in location), or both, of the playback device 804.

The one or more processors 832 are configured to select, based on the pose data 871, a particular representation of a sound field from a plurality of representations of the sound field, such as from the ambisonics representations 862-868 or from the stereo representations 872-878. The one or more processors 832 are configured to generate audio data corresponding to the selected representation of the sound field and to send, via wireless transmission, the audio data as streaming data (e.g., the audio stream 816) to the playback device 804.

In some implementations, the source device 802 selects the particular representation based on a predicted pose 870 of the playback device 804. In an example, the one or more processors 832 are configured to determine the predicted pose 870 based on a time series of the pose data 871 received from the playback device 804, such as via a Kalman filter or another prediction technique, and select a representation based on a prediction of what the pose of the playback device 804 will be when the audio data corresponding to the selected representation is played out. In another example, the source device 802 receives the predicted pose 870 from the playback device 804.

In some implementations, the source device 802 is configured to select a particular representation of the sound field further based on a reference pose of the playback device 804. For example, the playback device 804 may correspond to a headset device, and upon initialization of the headset, an orientation and location of the headset may be used as the reference pose (e.g., may be used by the source device 802 as a coordinate origin from which changes in orientation or translation are calculated). The source device 802 may be operable to update the reference pose based on the pose of the playback device and responsive to one or more events, such as receipt of a user instruction to update the reference pose. In an illustrative example, the source device 802 may update the reference pose based on receiving a reference reset instruction, such as via a wireless transmission from the playback device 804 responsive to user input received at a user interface of the playback device 804.

In some implementations, the source device 802 is configured to select a particular representation of the sound field to have a different audio format than an audio format of a prior representation of the sound field based on a change of an orientation of the playback device 804 exceeding a threshold. To illustrate, when an amount of movement of the playback device 804 (e.g., a speed at which the user's head turns) exceeds, or is predicted to exceed, the threshold, the movement may impair the user's ability to perceive fine resolution of the sound field, and the source device 802 may transition from streaming audio data in an ambisonics format to streaming the audio data in a pre-rendered stereo format. When the amount of movement falls below (or is predicted to fall below) the threshold, the source device 802 may resume transmitting the audio data using the ambisonics format.

Examples of sectors corresponding to a range of values associated with rotation, and both rotation and translation, of the playback device 804 are graphically depicted in diagrams 880 and 886, respectively. In such examples, the source device 802 may select an appropriate representation of the sound field based on movement of the playback device 804 in an analogous manner as described with reference to diagrams 840 and 850, respectively, of FIG. 8A.

Although two audio formats are illustrated (ambisonics and stereo), it should be understood that in other implementations the source device 802 can operate using a single audio format or more than two audio formats to provide the audio stream 816 to the device 804. Although ambisonics and stereo formats are illustrated, in other implementations one or more other audio formats can be used in place of, or in addition to, the ambisonics format, the stereo format, or both.

Figure 8C:
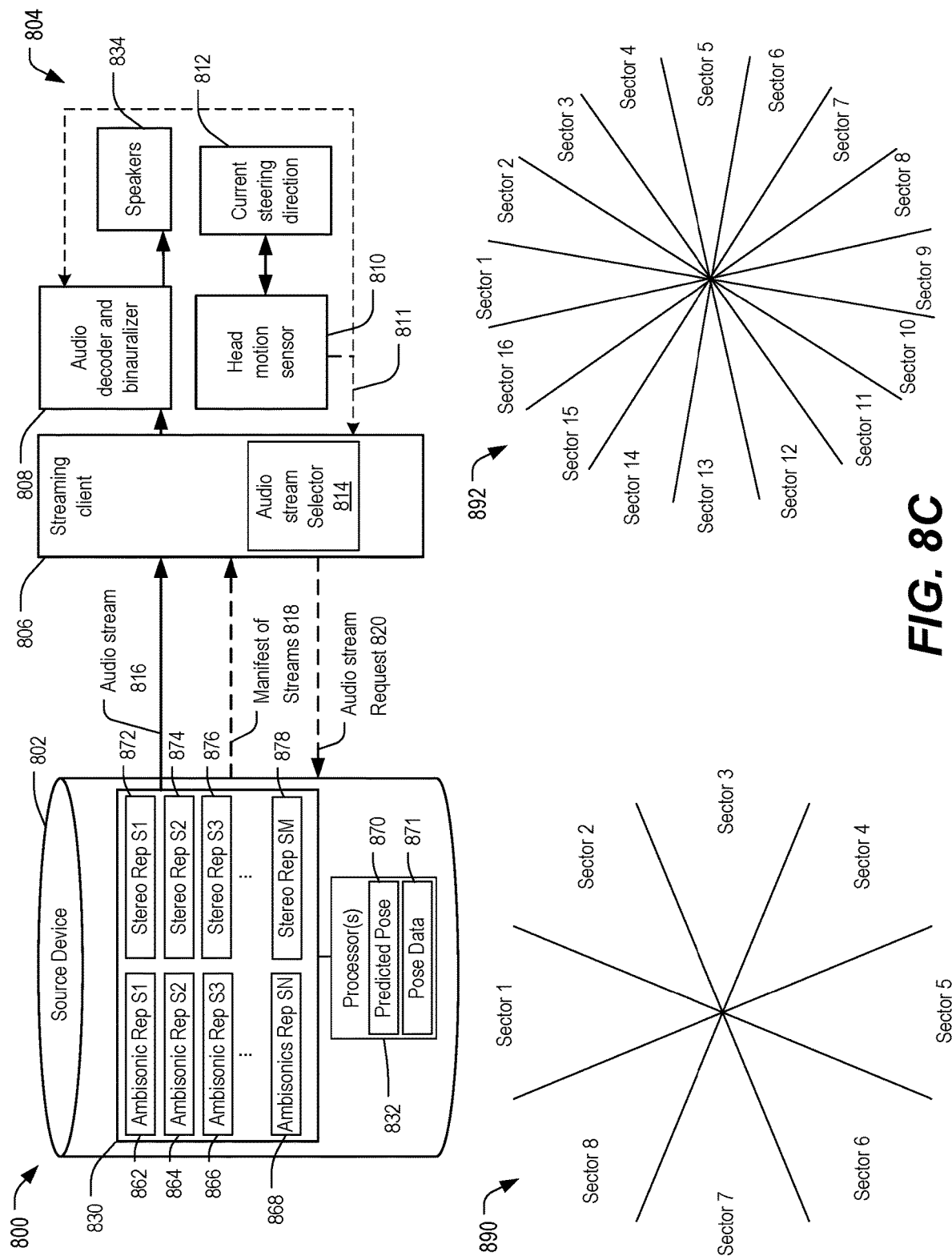
FIG. 8C is a block diagram illustrating an eleventh implementation of components and operations of a system for adjusting a sound field.

Although FIG. 8B depicts examples in which the sectors are overlapping, in other implementations the source device 802 selects representations of the sound field based on non-overlapping sectors that represent ranges of values associated with movement of the playback device 804. To illustrate, FIG. 8C depicts an example of the system 800 in which the source device 802 selects a representation of the sound field based on non-overlapping sectors associated with movement of the playback device 804. In FIG. 8C, a diagram 890 illustrates eight non-overlapping sectors that may be used to select a stereo representation of the sound field based on a coarser estimate of the pose of the playback device 804 (e.g., based on 45 degree increments of rotation), and a diagram 892 illustrates sixteen non-overlapping sectors that may be used to select an ambisonics representations of the sound field based on a finer estimate of the pose of the playback device 804 (e.g., based on 22.5 degree increments of rotation). Although the diagrams 890 and 892 illustrate eight and sixteen sectors, respectively, for simplicity of illustration, it should be understood that any other numbers of sectors may be used, and the sectors may be uniformly sized or non-uniformly sized.

Figure 9:
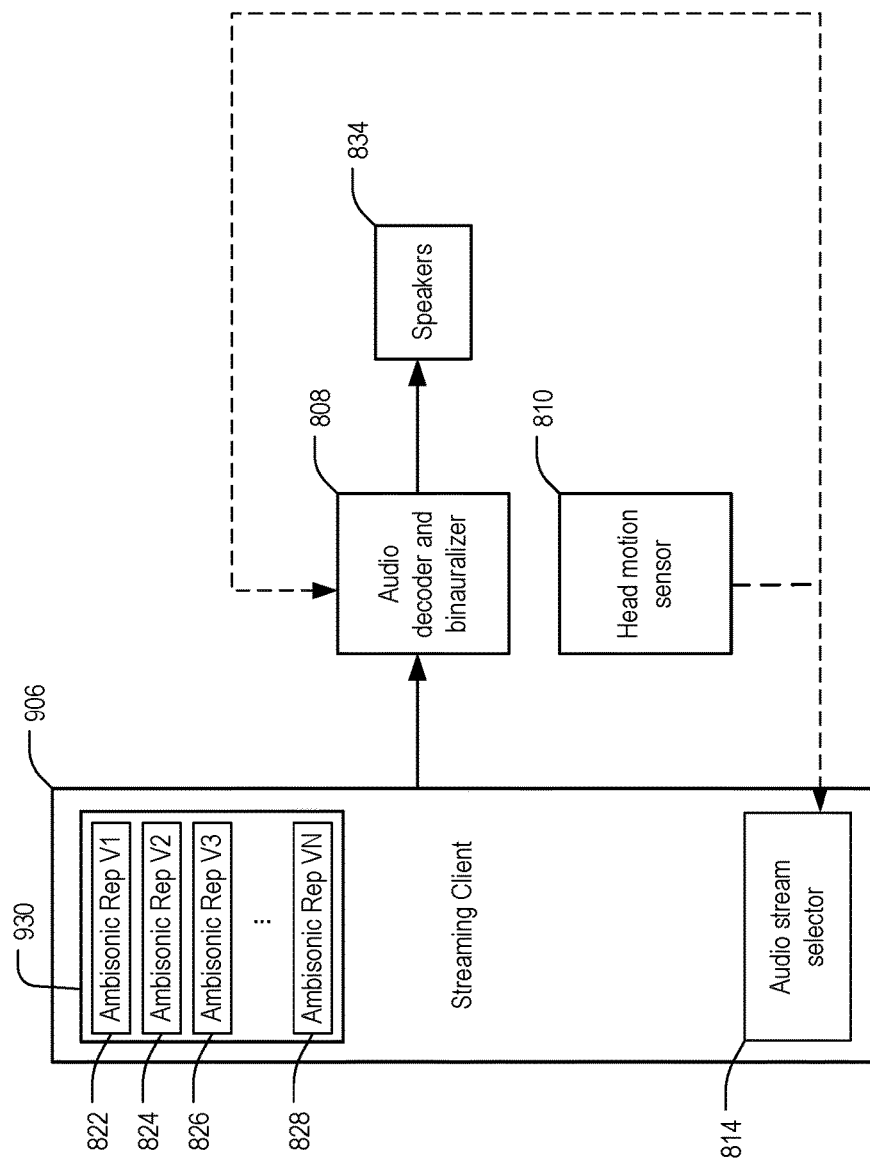
FIG. 9 is a block diagram illustrating a twelfth implementation of components and operations of a system for adjusting a sound field.

FIG. 9 is a block diagram illustrating an implementation of a system 900 that corresponds to the device 804 in which one or more of the ambisonics representations 822-828 are stored in a memory 930 at a streaming client 906 (e.g., a local streaming client). In one example, the streaming client 906 may use a manifest of the locally-available audio representations to determine the viability of one or more of the locally-available representations 822-828, and then select the appropriate sound field representation using the information provided in the manifest.

As a result, the streaming client 906 may transition between the ambisonics representations 822-828 based on changes in orientation, translation, or both, that are detected by the head motion sensor 810 and with reduced latency as compared to requesting the ambisonics representations 822-828 from a remote streaming server. Although the streaming client 906 is illustrated as including the ambisonics representations 822-828, in other implementations the streaming client may use any other set of representations of the sound field in place of, or in addition to, the ambisonics representations 822-828. For example, in some implementations, the streaming client 906 stores the ambisonics representations 822-828 (or the ambisonics representations 862-868) in addition to one or more, or all, of the stereo representations 872-878 of FIG. 8B.

Figure 10A:
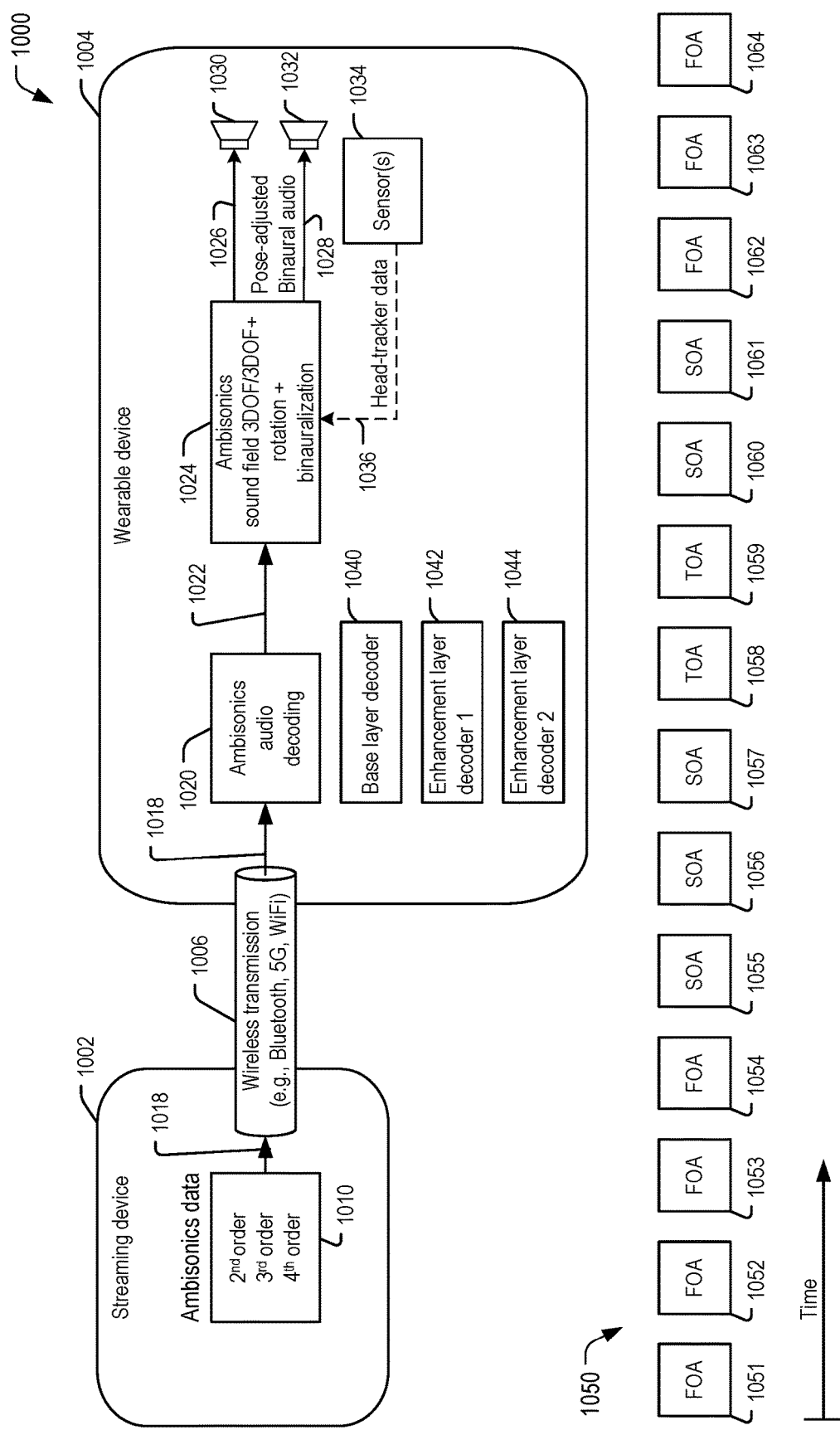
FIG. 10A is a block diagram illustrating a thirteenth implementation of components and operations of a system for adjusting a sound field.

FIG. 10A is a block diagram illustrating another implementation of components and operations of a system for adjusting a sound field. The system 1000 includes a streaming device 1002 configured to send at least a portion of ambisonics data 1010 to a wearable device 1004 using scalable audio coding to generate encoded ambisonics audio data 1018 (e.g., compressed ambisonics coefficients or uncompressed ambisonics coefficients, such as described with reference to the encoding operation 380 of FIG. 3B) representing a sound field. The wearable device 1004 includes a scalable audio decoder configured to decode the encoded ambisonics audio data 1018.

The encoded ambisonics audio data 1018 is illustrated in a diagram 1050 as being transmitted by the streaming device 1002 to the wearable device 1004 as a sequence of frames 1051-1064 using scalable audio encoding. The scalable audio encoding includes a base layer of audio data that provides coarse audio information and one or more higher layers of audio data, referred to as "enhancement layers," that provide finer resolution audio information. As illustrated, the first four frames 1051-1054 are encoded using first order ambisonics (FOA), the next three frames 1055-1057 are encoded using second order ambisonics (SOA) which provides higher resolution than FOA. The next two frames 1058, 1059 are encoded using third order ambisonics (TOA) which provides higher resolution than SOA. Frames 1060 and 1061 are encoded using SOA, and frames 1062-1064 are encoded using FOA.

In an illustrative example, the frames 1051-1064 correspond to an orchestral performance of a song that begins with a relatively small number of instruments (e.g., a single instrument) playing, which is encoded using FOA. As more instruments begin playing, providing more different types of sounds in the sound scene, the encoding transitions to SOA and then to TOA to provide increasingly enhanced resolution of the sound scene. As the number of instruments playing begins to reduce, the encoding reverts from TOA to SOA, and from SOA back to FOA. In this example, each frame encodes approximately one second of the sound scene, although in other implementations each frame may correspond to a longer time span or a shorter time span.

In another illustrative example, one or more of the transitions between the encoding types of the frames 1051-1064 are based on movement of the wearable device 1004. For example, the wearable device 1004 can obtain the head-tracker data 1036 data, at a plurality of time instances, associated with tracking location and an orientation associated with the movement of the wearable device 1004 and send at least a portion of the head-tracker data 1036 to the streaming device 1002 via wireless transmission, such as the data 166, 168 of FIG. 2. The streaming device 1002 can include one or more processors (e.g., the processor(s) 120 of FIG. 1) configured to receive, via wireless transmission from a playback device, the head-tracker data as first data associated with a first pose of the wearable device 1004 (e.g., a playback device). The first pose may be associated with a first number of sound sources in a sound scene, as described farther below. The streaming device 1002 can generate a first frame (e.g., frame 1054) of encoded ambisonics audio data that corresponds to a base layer encoding of the sound scene and send the first frame to the wearable device 1004.

A transition, in the ambisonics audio data, from a frame encoded according to the base layer (e.g., frame 1054) to a subsequent frame encoded according to the enhancement layer (e.g., frame 1055) corresponds to the movement of the wearable device 1004. For example, the transition from the base layer encoding of frame 1054 to the enhancement layer encoding of frame 1055 corresponds to a transition from a first orientation of the wearable device 1004 associated with a first number of sound sources to a second orientation of the wearable device 1004 associated with a second number of sound sources, the second number larger than the first number. To illustrate, the frames 1051-1054 can correspond to the wearable device 1004 on a user's head and oriented toward the first viewport field of view 841 of FIG. 8A or the first sector 881 of FIG. 8B having a relatively small number of sound sources.

In response to the user's head movement changing the orientation of the wearable device 1004 to another viewport field of view (e.g., the second viewport field of view 842), or toward another sector, that includes a greater number of audio sources than the first viewport field of view 841 or the first sector 881, the subsequent frame 1055 is encoded using the enhancement layer for higher resolution to accommodate the larger number of sound sources. For example, the wearable device 1004 sends updated head-tracker data indicating the user's head movement, which is received at the streaming device 1002 as second data associated with a second pose of the wearable device 1004 that is associated with the second number of sound sources. The streaming device 102 is configured to generate a second frame (e.g., the frame 1055) of encoded ambisonics audio data that corresponds to an enhancement layer encoding of the sound scene and send the second frame to the wearable device 1004.

The wearable device 1004 is configured to perform an ambisonics audio decoding operation 1020 to generate decoded ambisonics audio data 1022. The decoded ambisonics data 1022 is processed via an ambisonics sound field 3DOF/DOF+ rotation and binauralization operation 1024 to provide pose-adjusted binaural audio signals 1026, 1028 to loudspeakers 1030, 1032 based on head-tracker data 1036 from one or more sensors 1034. In an illustrative implementation, the wearable device 1004 corresponds to the second device 202, the ambisonics audio decoding operation 1020 is performed at the decoder 228, the ambisonics sound field 3DOF/DOF+ rotation and binauralization operation 1024 is performed at the sound field adjuster 224 and the renderer 222, the one or more sensors 1034 correspond to the one or more sensors 244, and the loudspeakers 1030, 1032 correspond to the loudspeakers 240, 242.

The wearable device 1004 performs the ambisonics audio decoding operation 1020 using a scalable decoder that includes a base layer decoder 1040, a first enhancement layer decoder 1042, and a second enhancement layer decoder 1044. Although two enhancement layer decoders 1042, 1044 are depicted, in other implementations the wearable device 1004 includes a single enhancement layer decoder or three or more enhancement layer decoders.

The base layer decoder 1040 is configured to decode FOA encoded frames, the first enhancement layer decoder 1042 is configured to decode SOA encoded frames, and the second enhancement layer decoder 1044 is configured to decode TOA encoded frames. The ambisonics audio decoding operation 1020 can adjust, on a frame-by-frame basis, which of the decoders 1040, 1042, 1044 are used to decode each of the frames 1051-1064. In an illustrative example, the base layer decoder 1040 is activated to decode the FOA frames 1051-1054, the first enhancement layer decoder 1042 is activated to decode the SOA frames 1055-1057, and the second enhancement layer decoder 1044 is activated to decode the TOA frames 1058, 1059. The second enhancement layer decoder 1044 is deactivated after decoding the TOA frame 1059, and the first enhancement layer decoder 1042 is deactivated after decoding the SOA frame 1061.

Although FIG. 10A depicts that each of the base layer decoder 1040 and the enhancement layer decoders 1042, 1044 corresponds to a single respective ambisonics order, in other implementations each of the layers (and associated decoders) can correspond to multiple ambisonics orders or resolutions, as depicted in the illustrative examples of FIGS. 11A, 11B, 12, and 13.

Figures 10B, 10C:
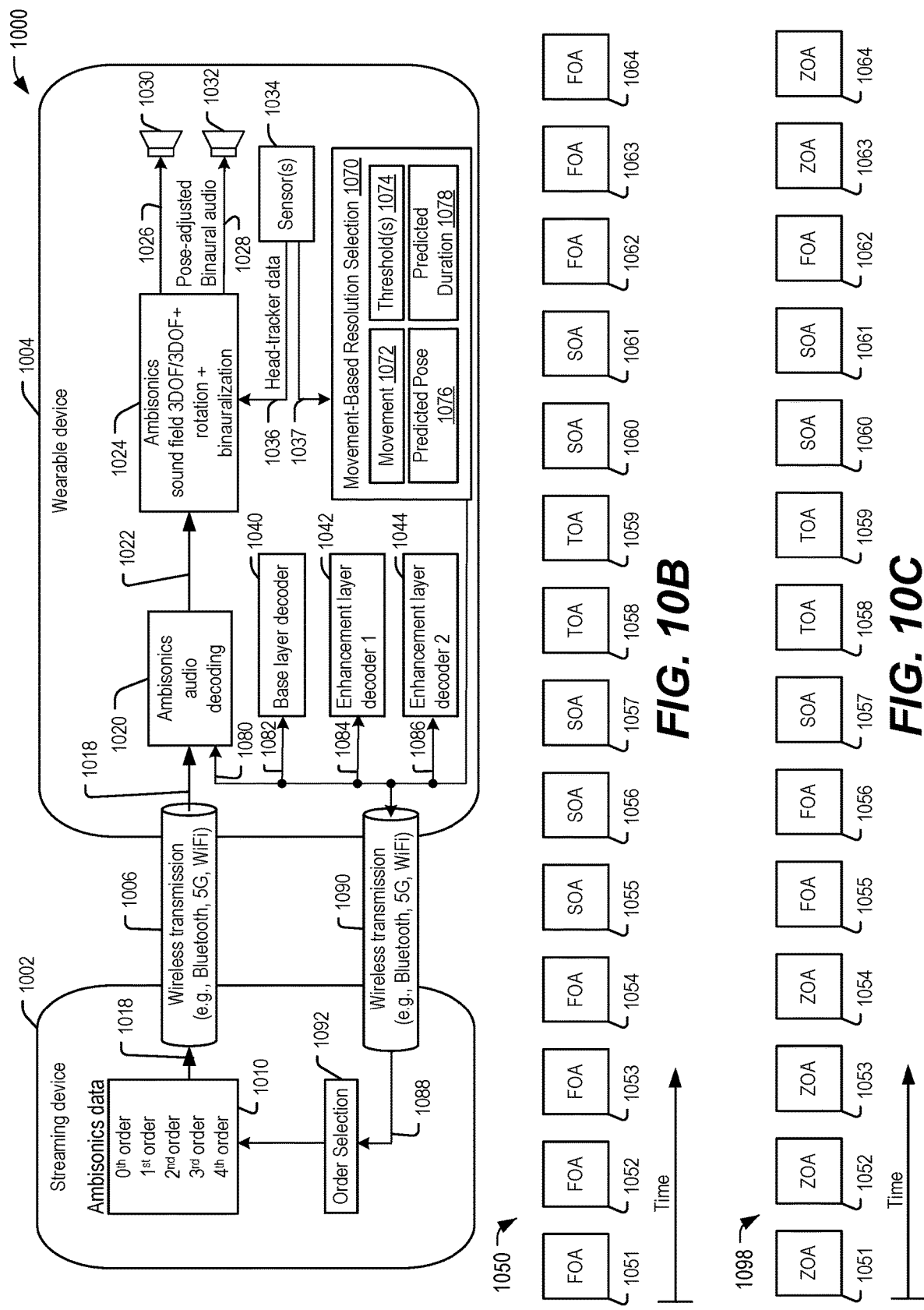
FIG. 10B is a block diagram illustrating a fourteenth implementation of components and operations of a system for adjusting a sound field.
FIG. 10C is a diagram illustrating an example of frames of audio data that may be generated by the system of FIG. 10A or FIG. 10B.

FIG. 10B depicts an implementation of the system 1000 in which the order of the ambisonics data 1018 that is transmitted to the device 1004, decoded by the device 1004, or both, is based on an amount of movement of the device 1004. For example, when the device 1004 corresponds to a head-mounted wearable device and the wearer's head moves (e.g., translation, change in orientation, or both) with an amount of movement that exceeds a certain threshold, the wearer may not be able to perceptually distinguish the resulting audio at the level of resolution provided by the full order ambisonics data 1010 representing the sound field. However, when the amount of movement of the device 1004 is equal to or less than the threshold, a higher-resolution or full-resolution representation of the audio scene can be provided. Thus, an amount of latency, computational resource usage, power consumption, or any combination thereof, can be controlled based on the amount of movement, or predicted movement, of the device 1004.

As illustrated, the device 1004 is configured to perform a movement-based resolution selection 1070 based on data 1037 from the one or more sensors 1034 that indicates an amount of movement 1072 of the device 1004. In some implementations, the device 1004 compares the movement 1072 to one or more threshold(s) 1074 to determine an amount of audio resolution to be provided for playback at the loudspeakers 1030, 1032. For example, the threshold(s) 1074 may indicate threshold amounts of movement associated with encoding layers, such as a first threshold amount of movement above which only base layer decoding is to be performed and a second threshold amount of movement above which only base layer and first enhancement layer decoding are to be performed. As another example, the threshold(s) may indicate threshold amounts of movement associated with individual ambisonics orders, such as a first threshold amount of movement above which only zeroth order ambisonics coefficient decoding is to be performed, a second threshold amount of movement above which only zeroth order and first order ambisonics coefficient decoding is to be performed, etc.

The movement-based resolution selection 1070 generates a set of one or more signals to control decoding of the received ambisonics data 1018. For example, a first signal 1080 may indicate to the ambisonics audio decoding operation 1020 which orders of the ambisonics data 1018 are to be decoded, a second signal 1082 may control operation of the base layer decoder 1040, a third signal 1084 may control operation of the first enhancement layer decoder 1042, and a fourth signal 1086 may control operation of the second enhancement layer decoder 1044.

To illustrate, the second signal 1082 may configure the base layer decoder 1040 to decode only ambisonics coefficients corresponding to zeroth order ambisonics (e.g., to generate a non-directional audio signal), to decode ambisonics coefficients corresponding to first order ambisonics, or both. The third signal 1084 may configure the first enhancement layer decoder 1042 to not decode any ambisonics coefficients, to decode only second order ambisonics coefficients, or to decode second and third order ambisonics coefficients. The fourth signal 1086 may configure the second enhancement layer decoder 1044 to not decode any ambisonics coefficients, to decode only fourth order ambisonics coefficients, or to decode fourth order ambisonics coefficients and ambisonics coefficients corresponding to ambisonics orders higher than fourth order (not illustrated).

The movement 1072 may represent measured movement of the device 1004 based on the data 1037, predicted movement of the device 1004 (e.g., using a Kalman filter or another prediction technique), or a combination thereof. To illustrate, the movement-based resolution selection 1070 may include determining a future predicted pose 1076 of the device 1004, a predicted amount of movement of the device 1004, or both. In some implementations, the movement-based resolution selection 1070 includes determining a predicted duration 1078 during which the amount of movement of the device 1004 will exceed one or more threshold 1074 (and therefore an amount of ambisonics data decoding can be reduced), a predicted duration 1078 during which the amount of movement of the device 1004 will remain less than or equal to the one or more threshold 1074 (and therefore an amount of ambisonics data decoding can be increased), or a combination thereof.

During operation, the device 1004 may receive, via the wireless transmission 1006 from the streaming device 1002, the encoded ambisonics audio data 1018 representing a sound field. The device 1004 may perform decoding of the ambisonics audio data 1018 to the generate decoded ambisonics audio data 1022. The decoding of the ambisonics audio data 1022 can include base layer decoding of a base layer of the encoded ambisonics audio data 1022 and can selectively include enhancement layer decoding in response to an amount of the movement 1072 of the device 1004. In some implementations, the device 1004 adjusts the decoded ambisonics audio data 1022 to alter the sound field based on the head-tracker data 1036 associated with at least one of a translation or an orientation associated with the movement 1072 of the device 1004 and outputs the adjusted decoded ambisonics audio data to two or more loudspeakers for playback.

In some implementations, the device 1004 is configured to perform the enhancement layer decoding based on the amount of the movement 1072 being less than a threshold amount (e.g., not exceeding one or more threshold 1074) and to refrain from performing the enhancement layer decoding based on the amount of movement not being less than the threshold amount. The device 1004 may select whether to perform enhancement layer decoding in response to the amount of movement of the device 1004 by determining a threshold ambisonics order based on the amount of movement, such as selecting second order in response to a relatively large amount of movement or selecting a higher order (e.g., fourth order) in response to a relatively small amount of movement. The device 1004 may decode enhancement layers that correspond to an ambisonics order less than the selected threshold ambisonics order and may refrain from decoding enhancement layer that corresponds to an ambisonics order greater than or equal to the selected threshold ambisonics order.

In some implementations, the device 1004 is configured to send, to the streaming device 1002 and based on the amount of the movement 1072, a message to refrain from sending enhancement layer audio data. For example, the movement-based resolution selection 1070 may generate a signal 1088 that is sent to the streaming device 1002 via a wireless transmission 1090. The signal 1088 may include an indication of a highest order of ambisonics data to send, an indication of one or more orders of the ambisonics data 1010 to send, an indication of one or more enhancement layers to send, or a combination thereof. In an illustrative example, the signal 1088 indicates an order selection 1092 that may be used to adjust an order of the encoded ambisonics audio data 1018 during encoding at the streaming device 1002, such as described with reference to encoding based on the order selection 334 of FIG. 3B, 4B, or 5B, the request for a particular ambisonics order 654 as described with reference to FIGS. 6-7, or a combination thereof.

In some implementations, the signal 1088 includes a message for the streaming device 1002 to refrain from sending enhancement layer audio data for a particular duration. For example, the movement-based resolution selection 1070 may determine that the amount of the movement 1072 exceeds a threshold amount (e.g., exceeds one or more threshold 1074) and determine the predicted duration 1078 based on a prediction of when the amount of movement of the device 1004 will be less than the threshold amount. The device 1004 may send the signal 1088 to the streaming device 1002 to refrain to sending enhancement layer audio data (e.g., only send ambisonics coefficients corresponding to the base layer, such as zeroth order coefficients and first order coefficients) until a future time that is based on (e.g., coincides with) when the amount of the movement 1072 of the device 1004 is predicted to be sufficiently reduced for perception of a higher-resolution representation of the audio scene.

In some implementations, the streaming device 1002 computes the actual or predicted amount of movement 1072 of the device 1004 and determines the amount of enhancement layer audio data to transmit to the wearable device 1004 based on the computed amount of movement 1072. For example, the device 1004 may obtain the data 1037, at a plurality of time instances, associated with a tracking location and an orientation associated with the movement 1072 of the device 1004 and may send the data 1037 to the streaming device 1002 via the wireless transmission 1090. To illustrate, the data 1037 may correspond to or be included in the signal 1088. In such implementations, functionality described for the movement-based resolution selection 1070 may be performed at the streaming device 1002 instead of, or in addition to, being performed at the device 1004. In such implementations, an amount of enhancement layer audio data received by the device 1004 in the encoded ambisonics audio data 1018 from the streaming device 1002 is based on the amount of movement of the device 1004, such as in a similar manner as described for the encoding operation 380 performed in conjunction with the movement data 476 of FIG. 4B.

FIG. 10C illustrates a diagram 1098 corresponding to an implementation in which the encoded ambisonics audio data 1018 is transmitted by the streaming device 1002 to the device 1004 as the sequence of frames 1051-1064 in which the base layer includes zeroth order ambisonics (ZOA) data and is devoid of any ambisonics data of higher order than zeroth order, the first enhancement layer includes FOA data and SOA data, and the second enhancement layer includes TOA data. As illustrated, the first four frames 1051-1054 correspond to the base layer and include ZOA data, and the next three frames 1055-1057 correspond to the first enhancement layer and include FOA data (frames 1055, 1056) and SOA data (frame 1057). The next two frames 1058, 1059 correspond to the second enhancement layer and include TOA data. Frames 1060-1062 correspond to the first enhancement layer and include SOA data (frame 1060) and FOA data (frames 1061, 1062), and frames 1063-1064 correspond to the base layer and include ZOA data. For example, the varying orders of ambisonics data in the sequence of frames 1051-1064 may be transmitted, decoded, or both, based on determining or predicting that the device 1004 undergoes a relatively large motion (e.g., ZOA data in frames 1051-1054) that gradually reduces to the device 1004 becoming stationary (e.g., TOA data in frames 1059-1059), followed by an increase to a relatively large motion of the device 1004 (e.g., ZOA data in frames 1063-1064).

Figure 11A:
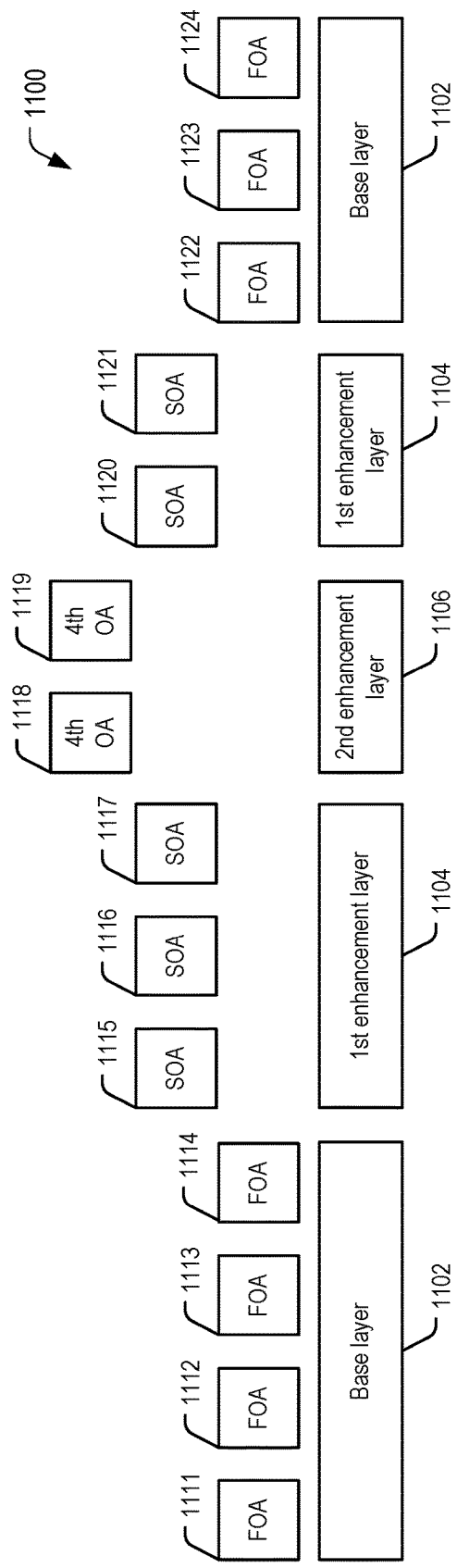
FIG. 11A is a diagram illustrating a first implementation of streaming audio data and decoder layers for decoding the streaming audio.
Figure 11B:
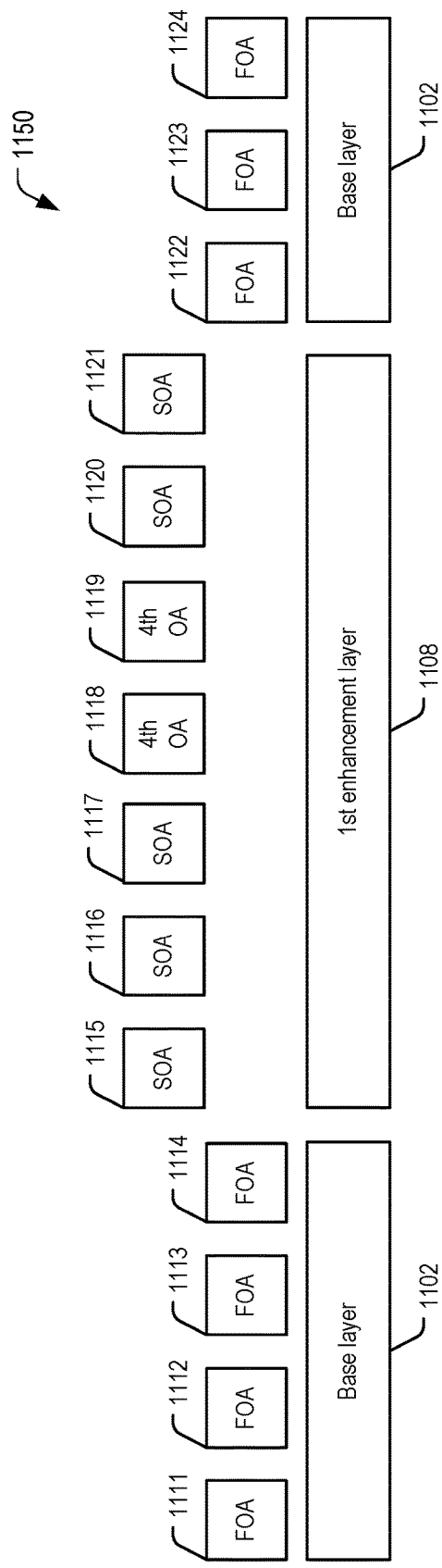
FIG. 11B is a diagram illustrating a second implementation of streaming audio data and decoder layers for decoding the streaming audio.

In FIGS. 11A and 11B, a sequence of ambisonics audio frames 1111-1124 is illustrated and includes frames 1111-1114 corresponding to FOA, frames 1115-1117 corresponding to SOA, frames 1118, 1119 corresponding to fourth order ambisonics (4th OA), frames 1120, 1121 corresponding to SOA, and frames 1122-1124 corresponding to FOA.

In FIG. 11A, a base layer 1102 corresponds to FOA, a first enhancement layer 1104 corresponds to SOA and TOA, and a second enhancement layer 1106 corresponds to 4th OA and higher order ambisonics. Thus, the FOA frames 1111-1114 and 1122-1124 correspond to the base layer 1102 and may be decoded by the base layer decoder 1040. The SOA frames 1115-1117, 1120, and 1121 correspond to the first enhancement layer 1104 and may be decoded using the first enhancement layer decoder 1042. The 4th OA frames 1118, 1119 correspond to the second enhancement layer 1106 and may be decoded using the second enhancement layer decoder 1044.

In FIG. 11B, a base layer 1102 corresponds to FOA, and a first enhancement layer 1108 corresponds to SOA, TOA, and 4th OA. Thus, the FOA frames 1111-1114 and 1122-1124 correspond to the base layer 1102 and may be decoded by the base layer decoder 1040. The SOA frames 1115-1117, 1120, and 1121 and the 4th OA frames 1118, 1119 correspond to the first enhancement layer 1108 and may be decoded using the first enhancement layer decoder 1042.

Figure 12:
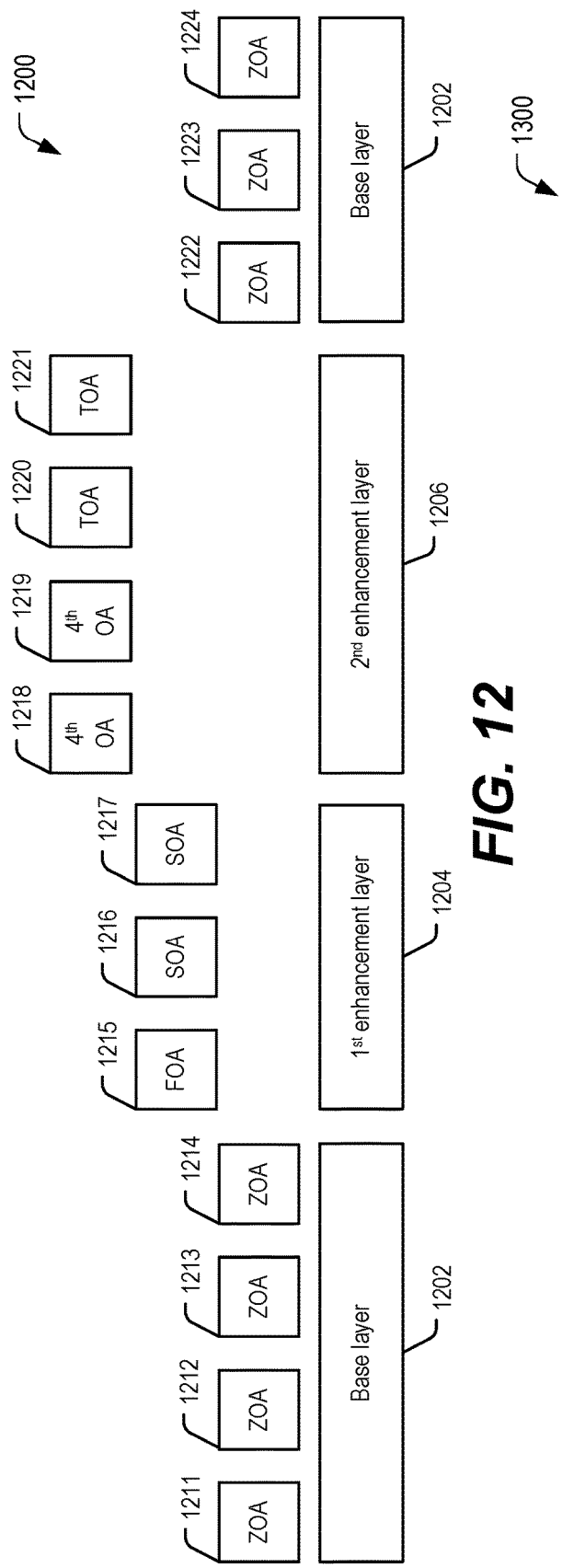
FIG. 12 is a diagram illustrating a third implementation of streaming audio data and decoder layers for decoding the streaming audio.

In FIG. 12, a sequence of ambisonics audio frames 1211-1224 is illustrated and includes frames 1211-1214 corresponding to ZOA, frame 1215 corresponding to FOA, frames 1216-1217 corresponding to SOA, frames 1218, 1219 corresponding to 4th OA, frames 1220, 1221 corresponding to TOA, and frames 1222-1224 corresponding to ZOA. A base layer 1202 corresponds to ZOA, a first enhancement layer 1204 corresponds to FOA and SOA, and a second enhancement layer 1206 corresponds to TOA, 4th OA, and higher order ambisonics. Thus, the ZOA frames 1211-1214 and 1222-1224 correspond to the base layer 1202 and may be decoded by the base layer decoder 1040. The FOA and SOA frames 1215-1217 correspond to the first enhancement layer 1204 and may be decoded using the first enhancement layer decoder 1042. The 4th OA frames 1218, 1219 and the TOA frames 1220, 1221 correspond to the second enhancement layer 1206 and may be decoded using the second enhancement layer decoder 1044.

Figure 13:
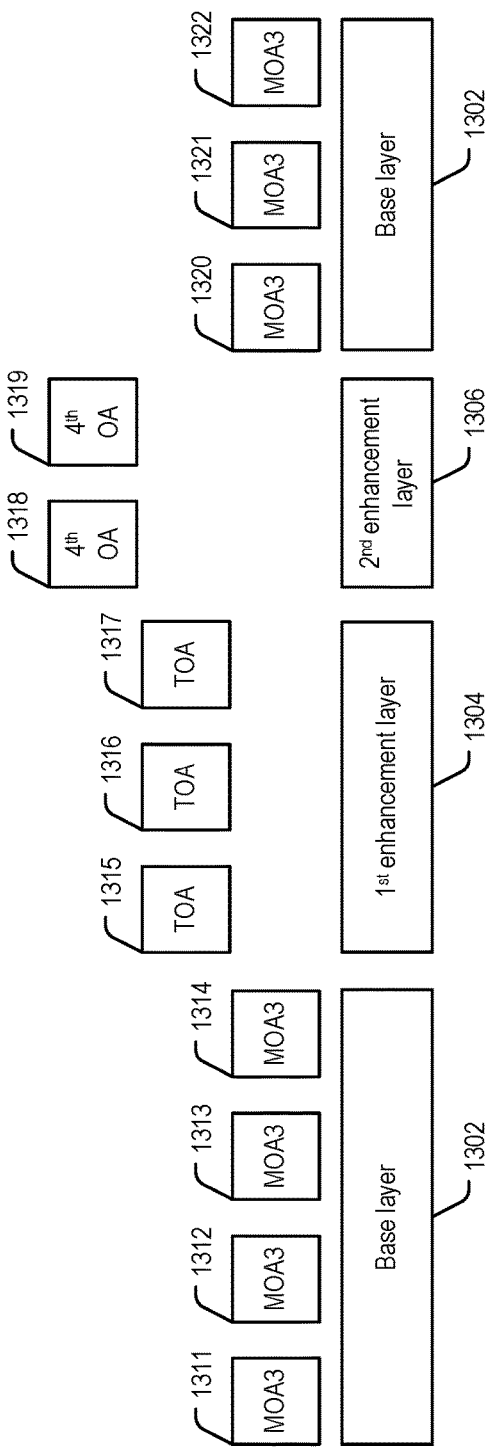
FIG. 13 is a block diagram illustrating a fourth implementation of streaming audio data and decoder layers for decoding the streaming audio.

In FIG. 13, a sequence of ambisonics audio frames 1311-1322 is illustrated and includes frames 1311-1314 corresponding to mixed order ambisonics MOA, frames 1315-1317 corresponding to TOA, frames 1318, 1319 corresponding to 4th OA, and frames 1320-1322 corresponding to MOA. For example, the MOA representation may provide precision with respect to some areas of the sound field, but less precision in other areas. In one example, the MOA representation of the sound field may include eight coefficients (e.g., 1 coefficient for n=0, 3 coefficients for n=1, 2 coefficients for n=2 (the outermost two depicted in FIG. 1), and 2 coefficients for n=3 (the outermost two depicted in FIG. 1). In contrast, the TOA representation of the same sound field may include sixteen coefficients. As such, the MOA representation of the sound field may be less storage-intensive and less bandwidth-intensive, and may provide a lower resolution representation of the sound field, than the corresponding TOA representation of the same sound field.

A base layer 1302 corresponds to MOA, a first enhancement layer 1304 corresponds to TOA, and a second enhancement layer 1306 corresponds to 4th OA and higher order ambisonics. Thus, the MOA frames 1311-1314 and 1320-1322 correspond to the base layer 1302 and may be decoded by the base layer decoder 1040. The TOA frames 1315-1317 correspond to the first enhancement layer 1304 and may be decoded using the first enhancement layer decoder 1042. The 4th OA frames 1318, 1319 correspond to the second enhancement layer 1306 and may be decoded using the second enhancement layer decoder 1044.

Thus, wearable device 1004 may be implemented including one or more processors, such as the one or more processors 220, that are configured to receive, via wireless transmission from the streaming device 1002, the encoded ambisonics audio data 1018 representing a sound field. For example, the wearable device 1004 receives the encoded ambisonics audio data 1018 via a wireless transmission 1006 from the streaming device 1002.

The one or more processors of the wearable device 1004 may be configured to perform decoding of the encoded ambisonics audio data 1018 to generate the decoded ambisonics audio data 1022. The decoding of the encoded ambisonics audio data 1018 includes base layer decoding of a base layer of the encoded ambisonics audio data 1018 (e.g., FOA) and selectively includes enhancement layer decoding in response to detecting that the encoded ambisonics audio data 1018 includes at least one encoded enhancement layer (e.g., SOA). As an example, the base layer decoding is performed using the base layer decoder 1040 and the enhancement layer decoding using at least the first enhancement layer decoder 1042 corresponding to a first enhancement layer of the encoded ambisonics audio data 1018.

The one or more processors of the wearable device 1004 may be configured to adjust the decoded ambisonics audio data to alter the sound field based on data associated with at least one of a translation or an orientation associated with movement of the device, such as via the ambisonics sound field 3DOF/3DOF+ rotation and binauralization operation 1024.

The one or more processors of the wearable device 1004 may be configured to output the adjusted decoded ambisonics audio data to two or more loudspeakers for playback, such as the pose-adjusted binaural audio signals 1026, 1028 provided to the speakers 1030, 1032, respectively.

In some implementations, the encoded ambisonics audio data 1018 includes first order ambisonics data in the base layer and higher order ambisonics data in the first enhancement layer, such as depicted in FIGS. 11A and 11B, and the first enhancement layer decoder 1042 is configured to decode the higher order ambisonics data.

In some implementations, the encoded ambisonics audio data 1018 includes first order ambisonics data in the base layer, higher order ambisonics data of one or more higher orders in the first enhancement layer, and additional higher order ambisonics data of one or more additional higher orders in a second enhancement layer, such as depicted in FIG. 11A. In such implementations, the one or more processors of the wearable device 1004 are further configured to perform enhancement layer decoding using the second enhancement layer decoder 1044 configured to decode the additional higher order ambisonics data.

In some implementations, the encoded ambisonics audio data 1018 includes mixed order ambisonics data including a partial set of coefficients of an ambisonics order in the base layer and includes additional ambisonics data in the enhancement layer, the additional ambisonics data including one or more coefficients of the ambisonics order that are omitted from the base layer, such as depicted in FIG. 13. In such implementations, the mixed order ambisonics may be decoded by the base layer decoder 1040, additional ambisonics data (e.g., TOA) may be decoded using the first enhancement layer decoder 1042, and additional higher order ambisonics data (e.g., 4th OA) may be decoded using the second enhancement layer decoder 1044.

In conjunction with the above-described devices and systems, streaming audio data may be adjusted based on one or more criteria, such a latency requirement, bandwidth, or motion of the playback device, as non-limiting examples. Although examples in which audio formats are switched between ambisonics and pre-rendered stereo are described with reference to FIGS. 8B and 8C, in other implementations one or more other formats may be used in addition to, or in place of, ambisonics or pre-rendered stereo, such as pulse-code modulation (PCM) audio or object audio formats.

In one example, if a playback device is stationary or has relatively little motion, a streaming source (e.g., the source device 802 or the streaming device 1002) may generate pre-rendered stereo that is binauralized from full-order ambisonics and may transmit the pre-rendered stereo to the playback device. However, in response to detecting or predicting motion of the playback device, the streaming source may transition from sending pre-rendered stereo to sending low order ambisonics data (e.g. FOA or SOA) to be locally rotated at the playback device. In response to detecting or predicting that the playback device stops moving, the streaming source may transition back to sending pre-rendered stereo.

In some implementations, the streaming source may switch between formats in conjunction with transitioning between enhancement layers. For example, the streaming device 1002 may transition between sending a representation of the audio scene using base layer ambisonics encoding and sending a stream of pre-rendered base layer and enhancement layer encoding, which may provide enhanced resolution for the audio scene with reduced bandwidth as compared to sending enhancement layer ambisonics coefficients.

In some implementations, a source device can transition between formats and/or layers of encoding (e.g., mono, stereo, base layer, base layer and enhancement layer, etc.) based on one or more other circumstances. For example, streamed audio can be adjusted in response to detecting or predicting an event in which either a richer audio experience or a reduced audio resolution would be appropriate. For example, in an application in which a user wearing a playback device is moving in a virtual reality or mixed reality setting or immersive audio scene, and an event such as a voice call or initiation of local or streamed audio playback that is separate from the immersive audio scene is detected or predicted, the source device may mix the audio down to mono or stereo PCM, based on which sound source the user is predicted to focus on. Using a voice call as an example, the scene's audio resolution can be reduced to mono at a reduced level to better enable the user to focus on the voice call. Similarly with concurrent stereo audio playback, the immersive audio scene can be reduced to a base layer rendered in stereo, as an illustrative, non-limiting example.

In some implementations, the split rendering may be via Virtual Assistant (e.g. running on a handset, a cloud server, other electronic device, or a combination thereof), and the wearer of a headset may operate the headset in a passthrough mode in which audio received via one or more external microphones of the headset is played out to the wearer via an earpiece of the headset. To illustrate, in an example in which a wearer of the headset is in a coffee shop listening to music transmitted to the headset as audio data encoded using a base layer and optionally one or more enhancement layers, sounds captured by an external microphone of the headset, such as the voice of a barista, may be mixed with the base layer of the music to be played out to the wearer.

Figure 14:
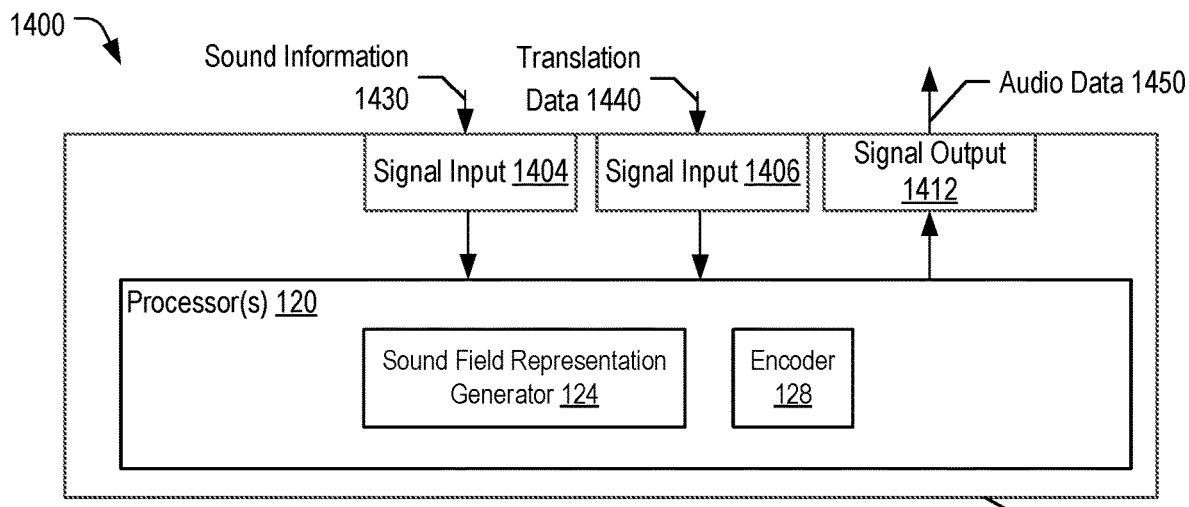
FIG. 14 is a block diagram illustrating a first implementation of an integrated circuit for adjusting a sound field.

FIG. 14 is a block diagram illustrating an implementation 1400 of the first device 102 as an integrated circuit 1402 for adjusting a sound field. The integrated circuit 1402 includes the one or more processors 120. The one or more processors 120 include the sound field representation generator 124, the encoder 128, or both. The integrated circuit 1402 also includes a signal input 1404 and a signal input 1406, such as bus interfaces, to enable sound information 1430 from an audio source (e.g., the sound information 123) and translation data 1440 from a playback device (e.g., the data 166) to be received. The integrated circuit 1402 also includes a signal output 1412, such as a bus interface, to enable sending of audio data 1450 (e.g., the encoded audio data 129) after adjusting the sound field based on the translation data 1440. The integrated circuit 1402 enables implementation of sound field adjustment as a component in a system that includes an audio source and a wireless transceiver, such as a streaming device as depicted in FIGS. 3A-8C or 10A-10B.

Figure 15:
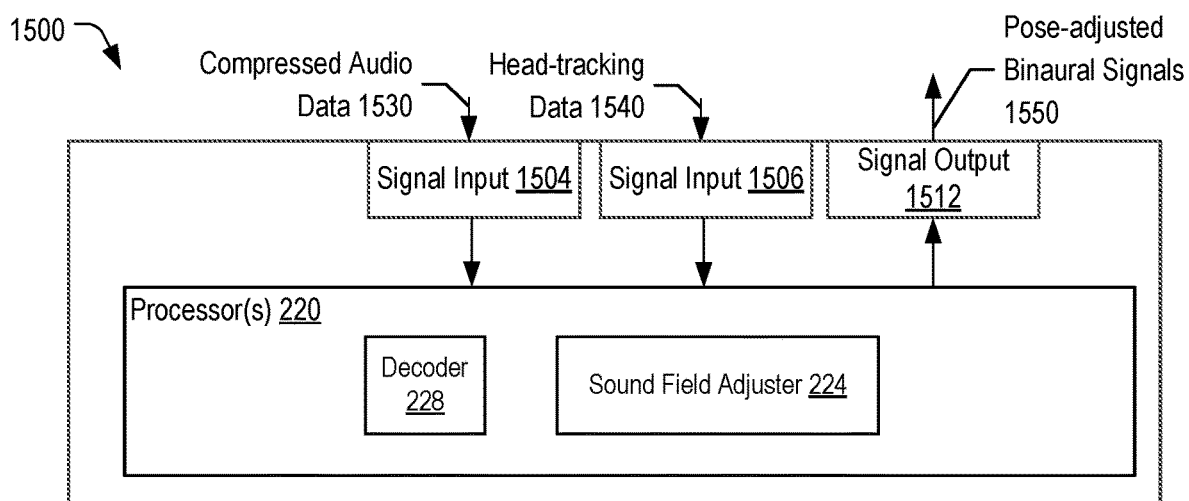
FIG. 15 is a block diagram illustrating a second implementation of an integrated circuit for adjusting a sound field.
Figure 18:
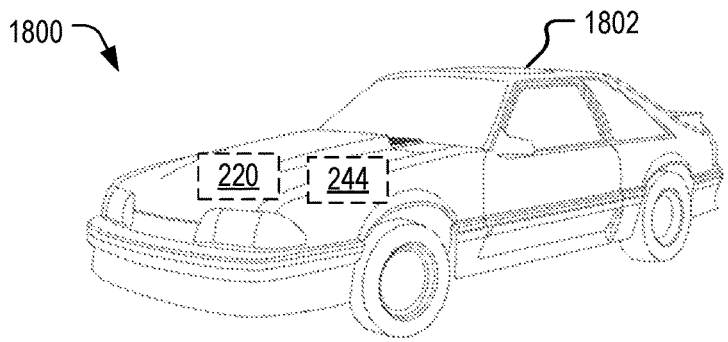
FIG. 18 is a diagram of a first implementation of a vehicle configured to adjust a sound field.
Figure 19:
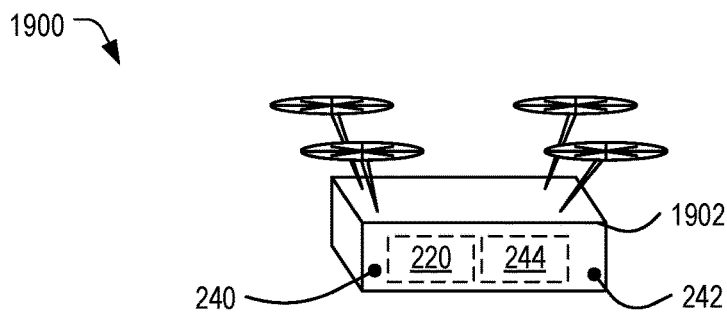
FIG. 19 is a diagram of a second implementation of a vehicle configured to adjust a sound field.
Figure 32:
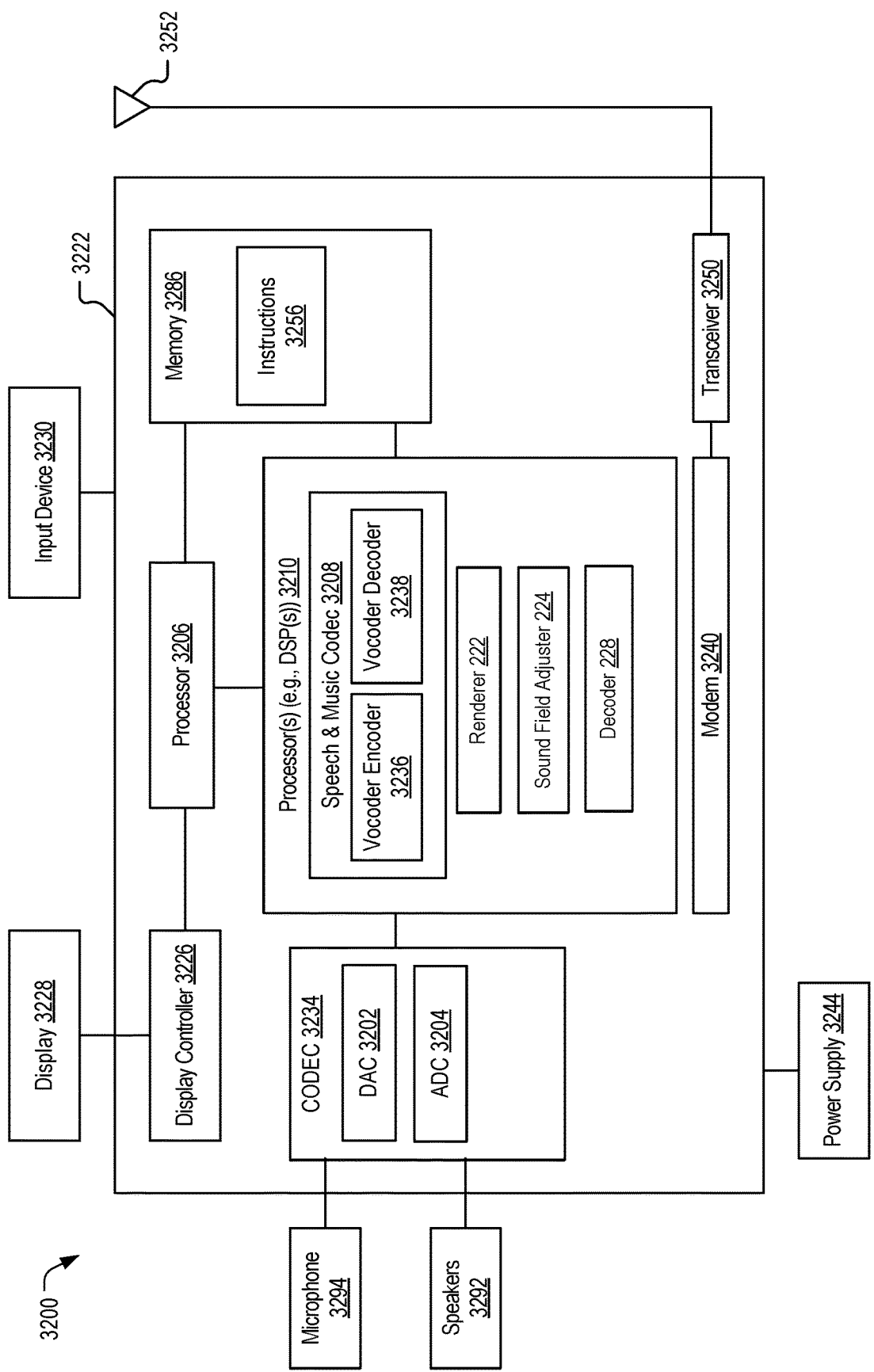
FIG. 32 is a block diagram of a particular illustrative example of a computing device that is operable to perform the techniques described with reference to FIGS. 1-31.

FIG. 15 is a block diagram illustrating an implementation 1500 of the second device 202 as an integrated circuit 1502 for adjusting a sound field. The integrated circuit 1502 includes the one or more processors 220. The one or more processors 220 include the decoder 228, the sound field adjuster 224, or both. The integrated circuit 1502 also includes a signal input 1504 and a signal input 1506, such as bus interfaces, to enable compressed audio data 1530 (e.g., the encoded audio data 229) and head-tracking data 1540 from one or more sensors (e.g., the sensor data 246) to be received. The integrated circuit 1502 also includes a signal output 1512, such as one or more bus interfaces, to enable sending of pose-adjusted binaural signals 1550 (e.g., the signals 239, 241) after adjusting the sound field based on the head-tracking data 1540. The integrated circuit 1502 enables implementation of sound field adjustment as a component in a system that includes a wireless receiver and two or more speakers, such as a wearable device (e.g., a headphone device), as depicted in FIGS. 3A-10B, a speaker array as depicted in FIG. 16, a virtual reality, mixed reality, or augmented reality headset as depicted in FIG. 17, a vehicle as depicted in FIG. 18 or 19, or a wireless communication device as depicted in FIG. 32.

Figure 16:
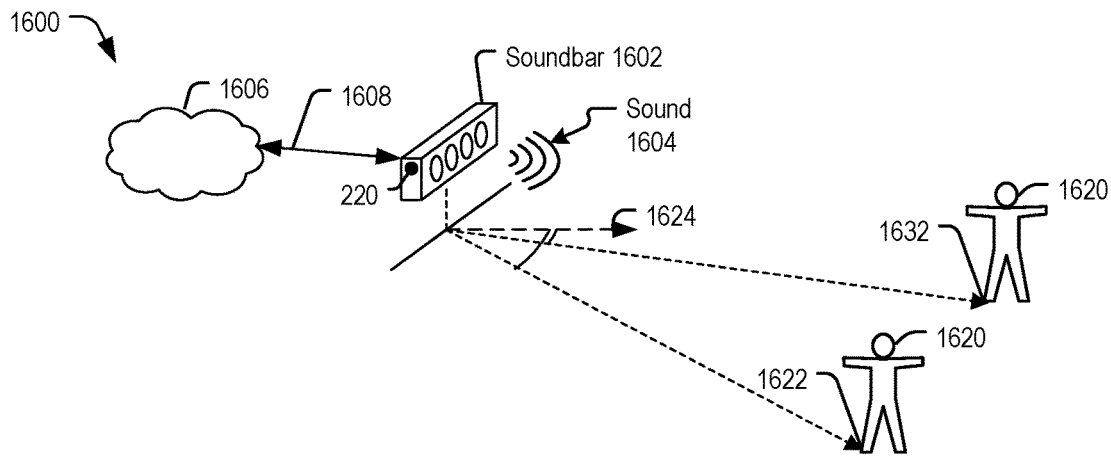
FIG. 16 is a block diagram illustrating an illustrative implementation of a system for adjusting a sound field and including external speakers.

FIG. 16 is a block diagram illustrating an implementation of a system 1600 for adjusting a sound field and in which the second device 202 corresponds to, or is integrated within, a speaker array, such as a soundbar device 1602. The soundbar device 1602 is configured to perform a beam steering operation to steer binaural signals to a location associated with a user. The soundbar device 1602 may receive ambisonic audio data 1608 from a remote streaming server via a wireless network 1606. The soundbar device 1602 may include the one or more processors 220 (e.g., including the decoder 228, the sound field adjuster 224, or both) configured to adjust the sound field represented by the ambisonic audio data 1608, and perform the beam steering operation to steer binaural signals to a location associated with a listener 1620.

The soundbar device 1602 includes or is coupled to one or more sensors (e.g., cameras, structured light sensors, ultrasound, lidar, etc.) to enable detection of a pose of the listener 1620 and generation of head-tracker data of the listener 1620. For example, the soundbar device 1602 may detect a pose of the listener 1620 at a first location 1622 (e.g., at a first angle from a reference 1624), adjust the sound field based on the pose of the listener 1620, and perform a beam steering operation to cause emitted sound 1604 to be perceived by the listener 1620 as a pose-adjusted binaural signal. In an example, the beam steering operation is based on the first location 1622 and a first orientation of the listener 1620 (e.g., facing the soundbar 1602). In response to a change in the pose of the listener 1620, such as movement of the listener 1620 to a second location 1632, the soundbar 1602 adjusts the sound field (e.g., according to a 3DOF/ 3DOF+ or a 6DOF operation) and performs a beam steering operation to cause the resulting emitted sound 1604 to be perceived by the listener 1620 as a pose-adjusted binaural signal at the second location 1632.

Figure 17:
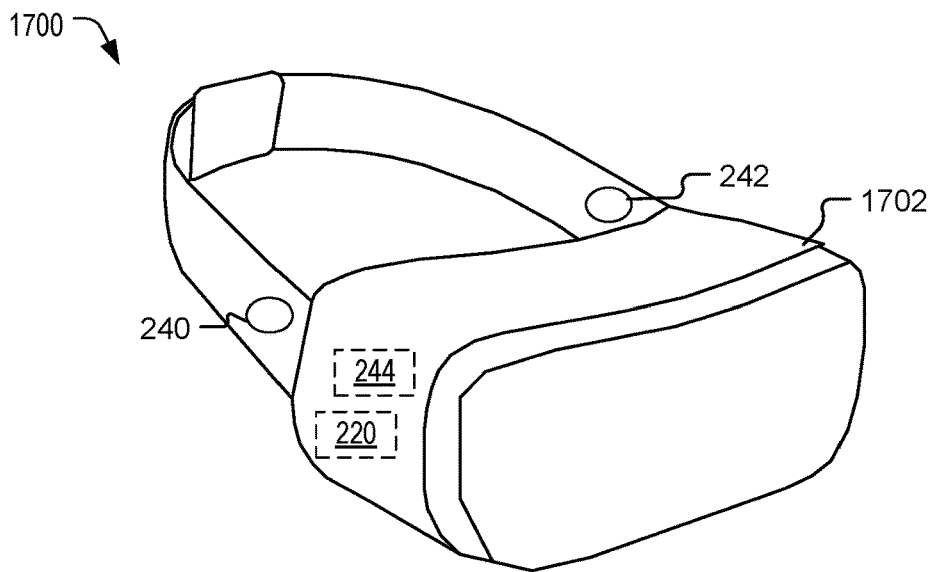
FIG. 17 is a diagram of an implementation of a portable electronic device for adjusting a sound field.

FIG. 17 depicts an implementation 1700 in which the second device 202 is a portable electronic device that corresponds to a virtual reality, augmented reality, or mixed reality headset 1702. The one or more processors 220 (e.g., including the decoder 228, the sound field adjuster 224, or both), the loudspeakers 240, 242, the memory 210, the one or more sensors 244, the transceiver 230, or a combination thereof, are integrated into the headset 1702. Adjustment of a sound field corresponding to audio data received from a remote streaming server can be performed based on head-tracker data generated by the one or more sensors 244, such as described with reference to FIGS. 2-13.

FIG. 18 depicts an implementation 1800 in which the first device 102 corresponds to, or is integrated within, a vehicle 1802, illustrated as a car. In some implementations, the one or more processors 220 (e.g., including the decoder 228, the sound field adjuster 224, or both) are integrated into the vehicle 1802, and the data from the one or more sensors 244 indicates a translation of the vehicle 1802 and an orientation of the vehicle 1802. In some implementations, data indicating the translation of the vehicle 1802 and the orientation of the vehicle 1802 is sent to a remote server, such as the first device 102. Audio data from the remote server (e.g., navigation data) may be received at the vehicle 1802 and a sound field associated with the received audio data may be adjusted based on the translation, the orientation, or both, prior to playout at one or more loudspeakers of the vehicle 1802. For example, playout of navigation data (e.g., spoken driving directions to a destination) may be adjusted to appear to the occupants of the vehicle 1802 that the spoken directions originate from the location or direction of the navigation destination and may thus provide additional information, encoded into the perception of distance and direction of the source of the spoken navigation directions, to a driver of the vehicle 1802.

FIG. 19 depicts another implementation 1900 in which the second device 202 corresponds to or is integrated within a vehicle 1902, illustrated as a manned or unmanned aerial device (e.g., a package delivery drone). In some implementations, the one or more processors 220 (e.g., including the decoder 228, the sound field adjuster 224, or both) are integrated into the vehicle 1902, and the data from the one or more sensors 244 indicates a translation of the vehicle 1902 and an orientation of the vehicle 1902. In some implementations, the vehicle 1902 is manned (e.g., carries a pilot, one or more passengers, or both) and may adjust a sound field of received audio data in a similar manner as described with reference to the vehicle 1802. In another implementation in which the vehicle 1902 is unmanned and the loudspeakers 240, 242 are on an external surface of the vehicle 1902, the vehicle may function in a similar manner as described with reference to the speaker array of FIG. 16 to adapt beamforming during playing out audio to one or more listeners based on change in pose of the listener(s) (e.g., to function as a hovering speaker array). Alternatively, or in addition, the vehicle 1902 may move (e.g., circle an outdoor audience during a concert) while playing out audio, and the one or more processors 220 (e.g., including the decoder 228, the sound field adjuster 224, or both) may perform operations to adjust the sound field based on translation and rotation of the vehicle 1902.

Figure 20:
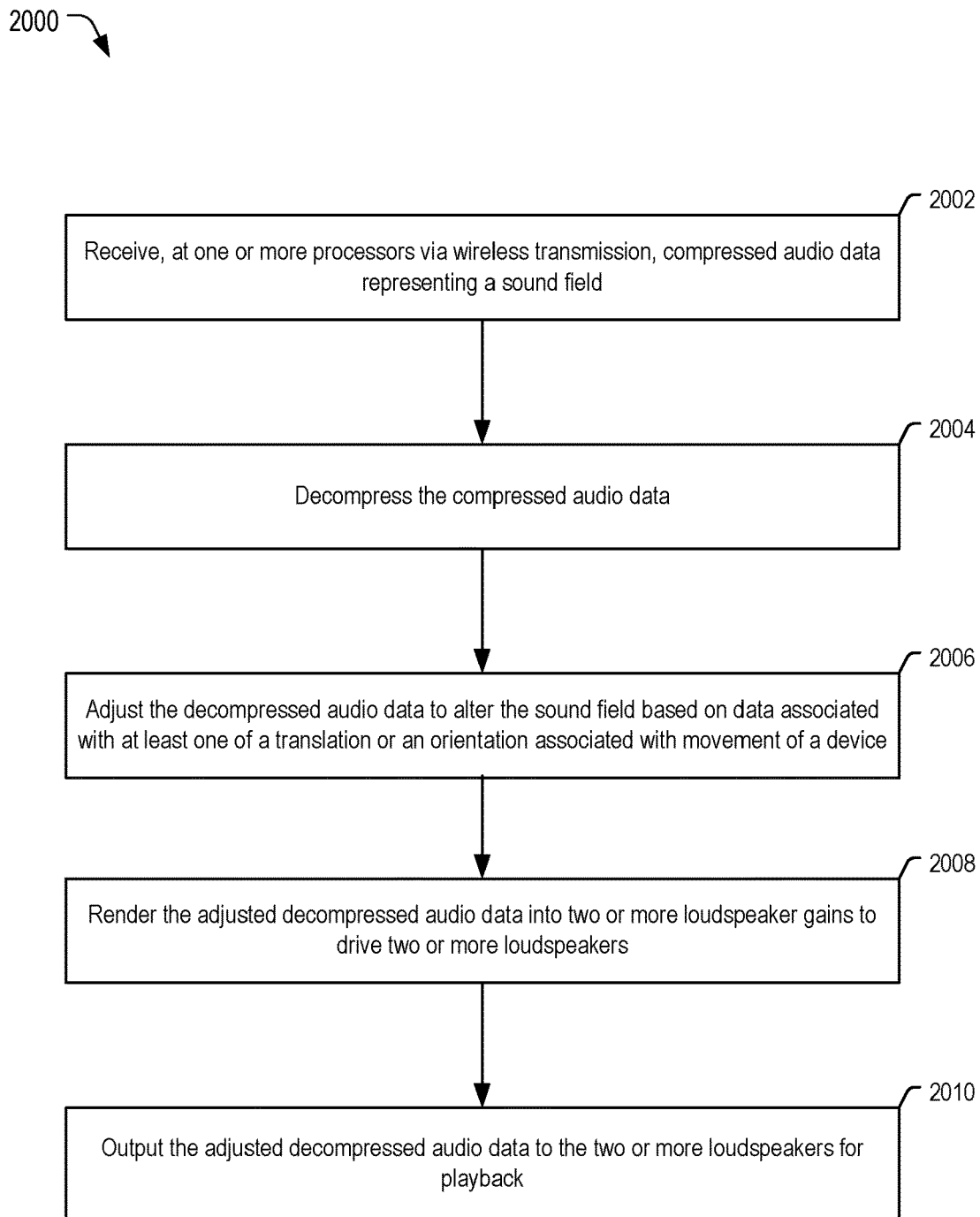
FIG. 20 illustrates a first example of a method for adjusting a sound field.

FIG. 20 illustrates a first example of a method 2000 for adjusting a sound field. The method 2000 may be performed by an electronic device, such as the second device 202, the wearable device 304, the wearable device 404, or the wearable device 504, as illustrative, non-limiting examples.

The method 2000 includes receiving, at one or more processors via wireless transmission, compressed audio data representing a sound field, at 2002. For example, in FIG. 2, the one or more processors 220 of the second device 202 receive the encoded audio data 229 representing the sound field 126. The encoded audio data 229 may be compressed and received as streaming data from a streaming device (e.g., the first device 102), and the streaming device may correspond to at least one of a portable electronic device or a server.

The method 2000 includes decompressing the compressed audio data, at 2004. For example, the decoder 228 of FIG. 2 may decompress the encoded audio data 229 to generate the audio data 227 (e.g., decompressed audio data). In some examples, the decompressed audio data (e.g., the audio data 227) includes ambisonics data.

The method 2000 includes adjusting the decompressed audio data to alter the sound field based on data associated with at least one of a translation or an orientation associated with movement of a device, at 2006. For example, the sound field adjuster 224 of FIG. 2 adjusts the sound field 226 based on the sensor data 246.

The method 2000 includes rendering the adjusted decompressed audio data into two or more loudspeaker gains to drive two or more loudspeakers, at 2008. For example, the renderer 222 of FIG. 2 renders the adjusted audio data 223 to generate the loudspeaker gains 219, 221.

The method 2000 includes outputting the adjusted decompressed audio data to the two or more loudspeakers for playback, at 2010. For example, the one or more processors 220 of FIG. 2 drive the loudspeakers 240, 242 with the pose-adjusted binaural audio signals 239, 241 based on the output the loudspeaker gains 219, 221.

In some implementations, the method 2000 includes performing binauralization of the adjusted decompressed audio data to generate the two or more loudspeaker gains, such as using HRTFs or BRIRs with or without headphone compensation filters associated with the electronic device.

In some implementations, the method 2000 also includes sending translation data to the streaming device (e.g., the first device 102), such as the data 166 or the translation metadata 478. The translation data is associated with the movement of the device (e.g., the second device 202). Responsive to sending the translation data, compressed updated audio data (e.g., the encoded audio data 229) is received from the streaming device (e.g., the first device 102). The compressed updated audio data (e.g., the encoded audio data 229) represents the sound field (e.g., the sound field 126) translated based on the translation data (e.g., the data 166 or the translation metadata 478). The compressed updated audio data (e.g., the encoded audio data 229) is decompressed to generate updated audio data (e.g., the audio data 227), and the updated audio data is adjusted to rotate the sound field (e.g., the sound field 226) based on the orientation. In some implementations, a first latency associated with sending the translation data (e.g., the data 166 or the translation metadata 478) to the streaming device (e.g., the first device 102) and receiving the compressed updated audio data (e.g., the encoded audio data 229) from the streaming device is larger than a second latency associated with adjusting the updated audio data (e.g., the audio data 227) to rotate the sound field (e.g., the sound field 226) based on the orientation.

In some implementations, the updated audio data (e.g., the audio data 227) is adjusted to translate the sound field (e.g., the sound field 226) based on a change of the translation of the device (e.g., the second device 202), and adjusting the updated audio data based on the change of the translation is restricted to translating the sound field forward, backward, left, or right, such as a 3DOF+ effect described with reference to FIGS. 3A-4B, FIG. 6, and FIG. 7. In other implementations, the sound field (e.g., the sound field 226)

represented by the decompressed audio data (e.g., the audio data 227) is independent of the movement of the device (e.g., the second device 202), and altering the sound field includes translating the sound field responsive to the data (e.g., the sensor data 246) indicating a change of the translation and rotating the sound field responsive to the data (e.g., the sensor data 246) indicating a change of the orientation, such as described with reference to the 6DOF scene displacement described with reference to FIGS. 5A and 5B.

By adjusting the decompressed audio data (e.g., the audio data 227) to alter the sound field (e.g., the sound field 226) based on movement of the device (e.g., the second device 202), latency associated with transmitting head tracking data (e.g., the data 166 or the translation metadata 478) to a remote source device (e.g., a streaming source device) is reduced. As a result, a user experience is improved.

Figure 21:
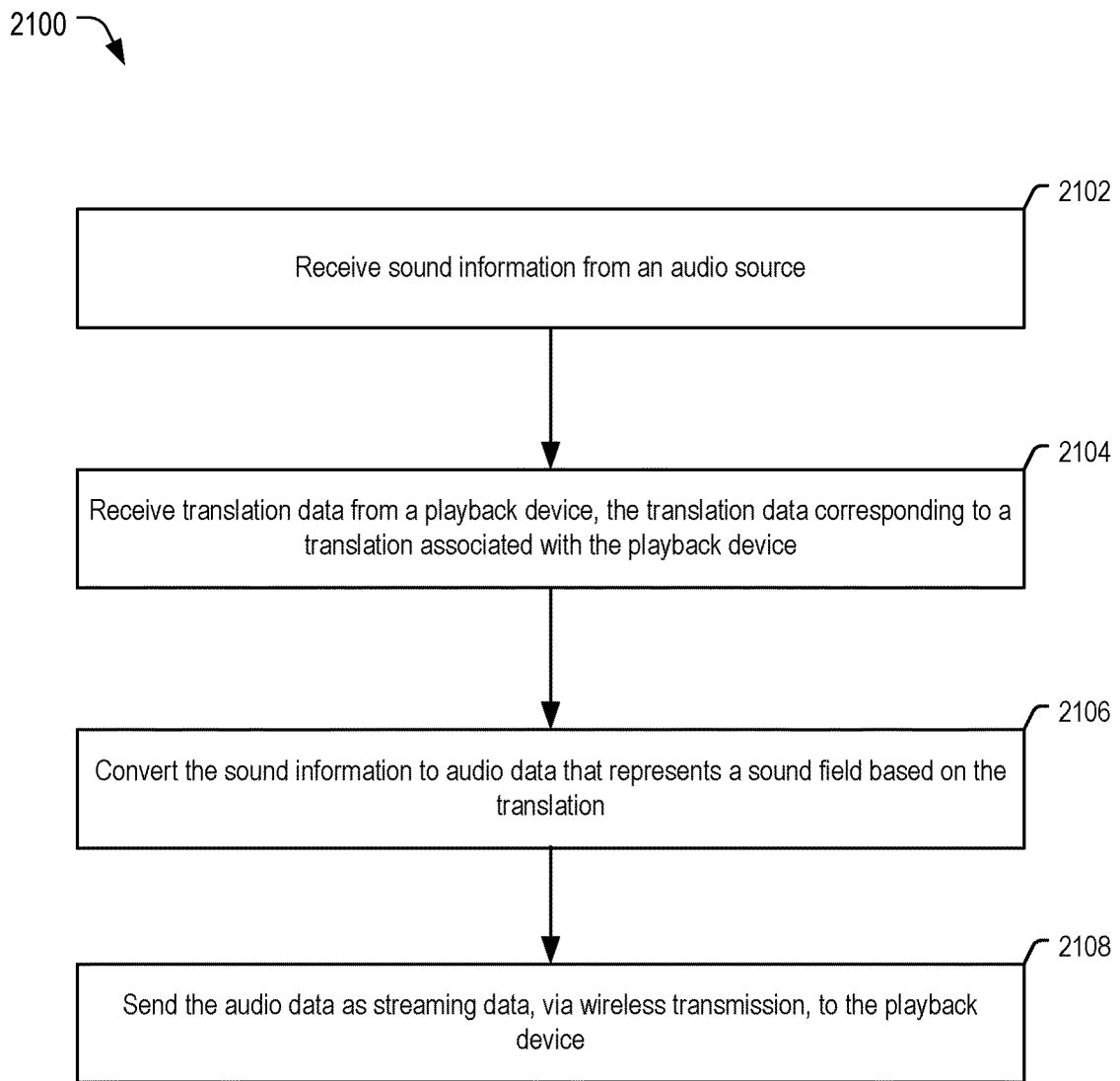
FIG. 21 illustrates a second example of a method for adjusting a sound field.

FIG. 21 illustrates a second example of a method for adjusting a sound field. The method 2100 may be performed by an electronic device, such as the first device 102, the streaming device 402, the streaming device 602, or the streaming device 702, as illustrative, non-limiting examples.

The method 2100 includes receiving sound information from an audio source, at 2102. For example, the sound information may correspond to the sound information 123, the streamed audio content 414, or the head-tracked audio portion 614.

The method 2100 includes receiving translation data from a playback device, the translation data corresponding to a translation associated with the playback device, at 2104. For example, the translation data may correspond to the data 166, the translation metadata 478, the translation data 656, or the metadata 766.

The method 2100 includes converting the sound information to audio data that represents a sound field based on the translation, at 2106. For example, the sound field representation generator 124 of FIG. 2 converts the sound information 123 to the audio data 127 that represents the sound field 126 based on the translation indicated by the data 166.

The method 2100 includes sending the audio data as streaming data, via wireless transmission, to the playback device, at 2108. For example, the encoder 128 of FIG. 2 encodes the audio data 127 to generate the encoded audio data 129 and the transceiver 130 sends the encoded audio data 129 as the streaming data.

Converting the sound information (e.g., the sound information 123) to audio data (e.g., the audio data 127) that represents a sound field (e.g., the sound field 126) based on the translation (e.g., indicated by the data 166) and sending the audio data to the playback device (and not as binaural data) offloads more intensive translation computations from the playback device (e.g., the second device 202), enabling reduced power consumption and cost of the playback device, while enabling the playback device to perform less computation-intensive rotation processing and binauralization, reducing the delay experienced by a user for the sound field (e.g., the sound field 226) to a respond to a change of orientation and improving the user's experience.

Figure 22:
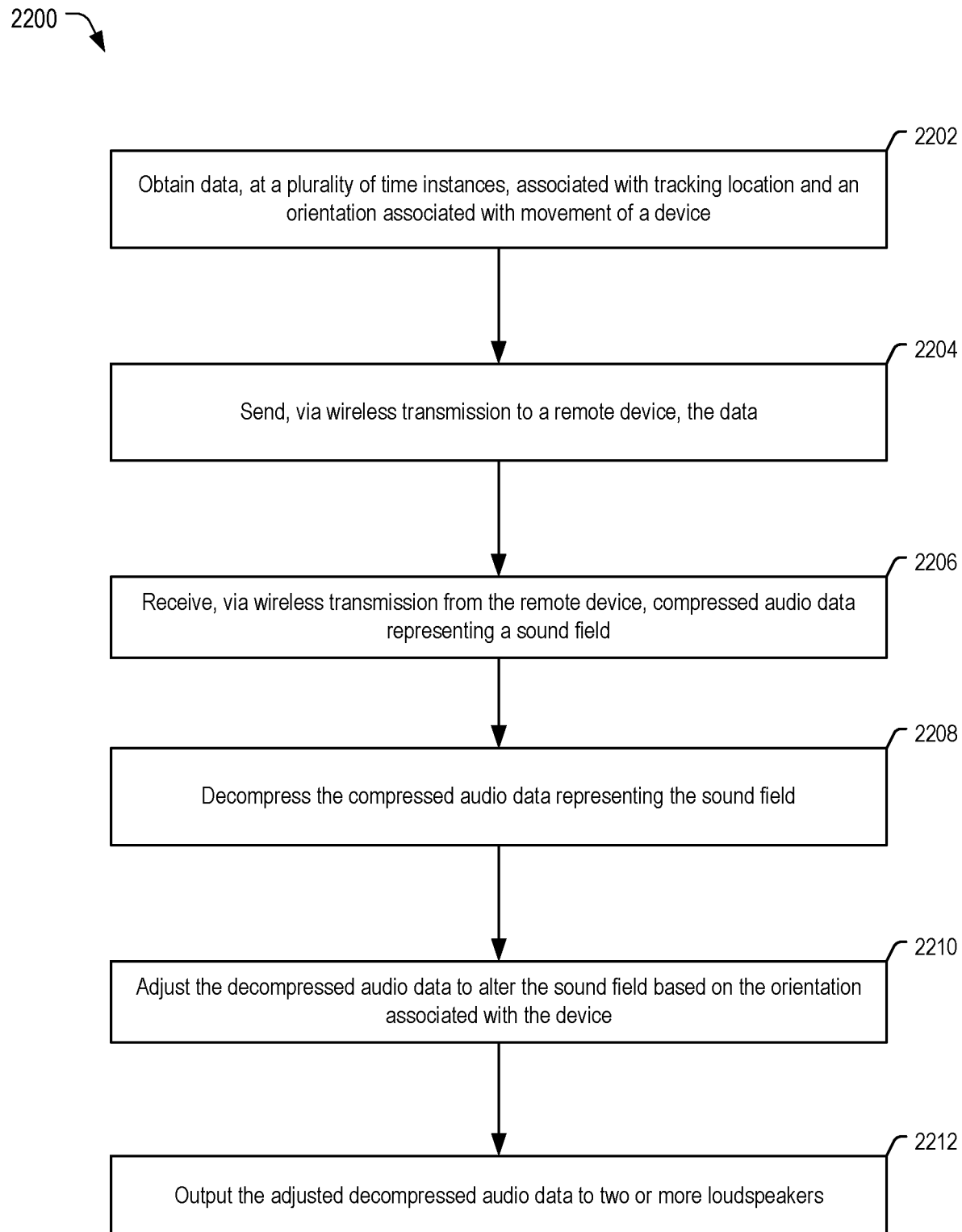
FIG. 22 illustrates a third example of a method for adjusting a sound field.

FIG. 22 illustrates a third example of a method 2200 for adjusting a sound field. The method 2200 may be performed by an electronic device, such as the second device 202 or the wearable device 604, as illustrative, non-limiting examples.

The method 2200 includes obtaining data, at a plurality of time instances, associated with tracking location and an orientation associated with movement of a device, at 2202. For example, the data may correspond to the data 166, the sensor data 246 the head-tracker data 648, the metadata 652, the time stamped user position data 656, the user position and time stamp data 766, or any combination thereof.

The method 2200 includes sending, via wireless transmission to a remote device, the data, at 2204. For example, the data may be sent to the first device 102, the streaming device 602, or to the wearable companion device 706.

The method 2200 includes receiving, via wireless transmission from the remote device, compressed audio data representing a sound field, at 2206. In an example, the compressed audio data includes ambisonics data. For example, the compressed audio data may correspond to the encoded audio data 229.

The method 2200 includes decompressing the compressed audio data representing the sound field, at 2208, and adjusting the decompressed audio data to alter the sound field based on the orientation associated with the device, at 2210. To illustrate, adjusting the decompressed audio data can be performed at the sound field adjuster 224 or at the ambisonics sound field 3DOF/3DOF+ rotation and binauralization operation 364. In an example, adjusting the decompressed audio data is based on applying the data associated with tracking the location and the orientation associated with the movement of the device. In some implementations, the method 2200 also includes adjusting the decompressed audio data to translate the sound field based on a difference between a location of the device and a location associated with the sound field, where the adjusting of the decompressed audio data based on the difference is restricted to translation of the sound field forward, backward, left, or right, such as a 3DOF+ effect.

The method 2200 includes outputting the adjusted decompressed audio data to two or more loudspeakers, at 2212.

In some implementations, the method 2200 includes receiving, via wireless transmission from the remote device, head-locked audio data, and combining the head-locked audio data with the adjusted decompressed audio data for output to the two or more loudspeakers, such as described with reference to the combiner 638. The adjusted decompressed audio data corresponds to pose-adjusted binaural audio (e.g., the pose-adjusted binaural audio data 636), and the head-locked audio data (e.g., the head-locked two-channel headphone audio stream 632) corresponds to pose-independent binaural audio.

In some implementations, the method 2200 includes receiving sound effect data ahead of time via wireless transmission and pre-buffering the sound effect data, such as the pre-buffered user interaction sound data 643. Responsive to an indication of user interaction with a virtual object associated with the sound effect data, a portion of the pre-buffered sound effect data corresponding to the virtual object is retrieved and combined (e.g., rendered as the user interaction sound 635) with the adjusted decompressed audio data (e.g., the pose-adjusted binaural audio data 636) for output to the two or more loudspeakers.

In some implementations, the method 2200 includes sending an indication of an ambisonic order to the remote device and, responsive to sending the indication, receiving updated audio data having the ambisonic order. For example, the indication of the ambisonic order can correspond to the request for a particular ambisonics order 654.

Figure 23:
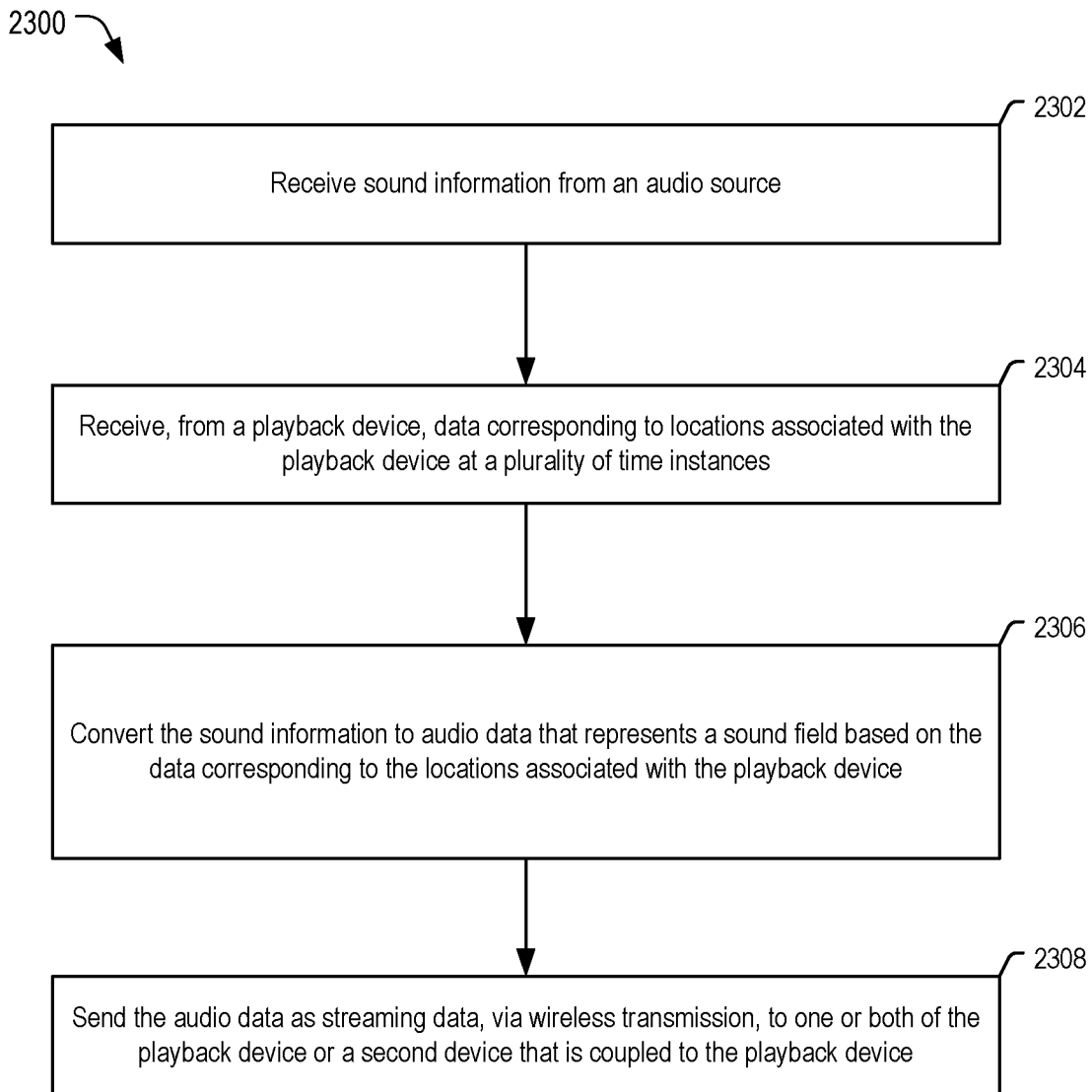
FIG. 23 illustrates a fourth example of a method for adjusting a sound field.

FIG. 23 illustrates a fourth example of a method for adjusting a sound field. The method 2300 may be performed by an electronic device, such as the first device 102, the streaming device 402, or the streaming device 602, as illustrative, non-limiting examples.

The method 2300 includes receiving sound information from an audio source, at 2302. For example, the audio source may correspond to the audio source 122 or the game audio engine 610.

The method 2300 includes receiving, from a playback device (e.g., the second device 202, the wearable device 404, or the wearable device 604), data corresponding to locations associated with the playback device at a plurality of time instances, at 2304. For example, the data may correspond to the data 166, the sensor data 246, the translation metadata 478, the head-tracker data 648, the metadata 652, the time stamped user position data 656, the user position and time stamp data 766, or any combination thereof.

The method 2300 includes converting the sound information to audio data that represents a sound field based on the data corresponding to the locations associated with the playback device, at 2306. For example, the sound information may be converted via the sound field representation generator 124, the rendering/conversion to ambisonics operation 416, or via rendering/conversion to HOA operation 616.

The method 2300 includes sending the audio data as streaming data, via wireless transmission, to one or both of the playback device (e.g., the second device 202, the wearable device 404, or the wearable device 604) or a second device (e.g., the wearable companion device 706) that is coupled to the playback device, at 2308.

Figure 24:
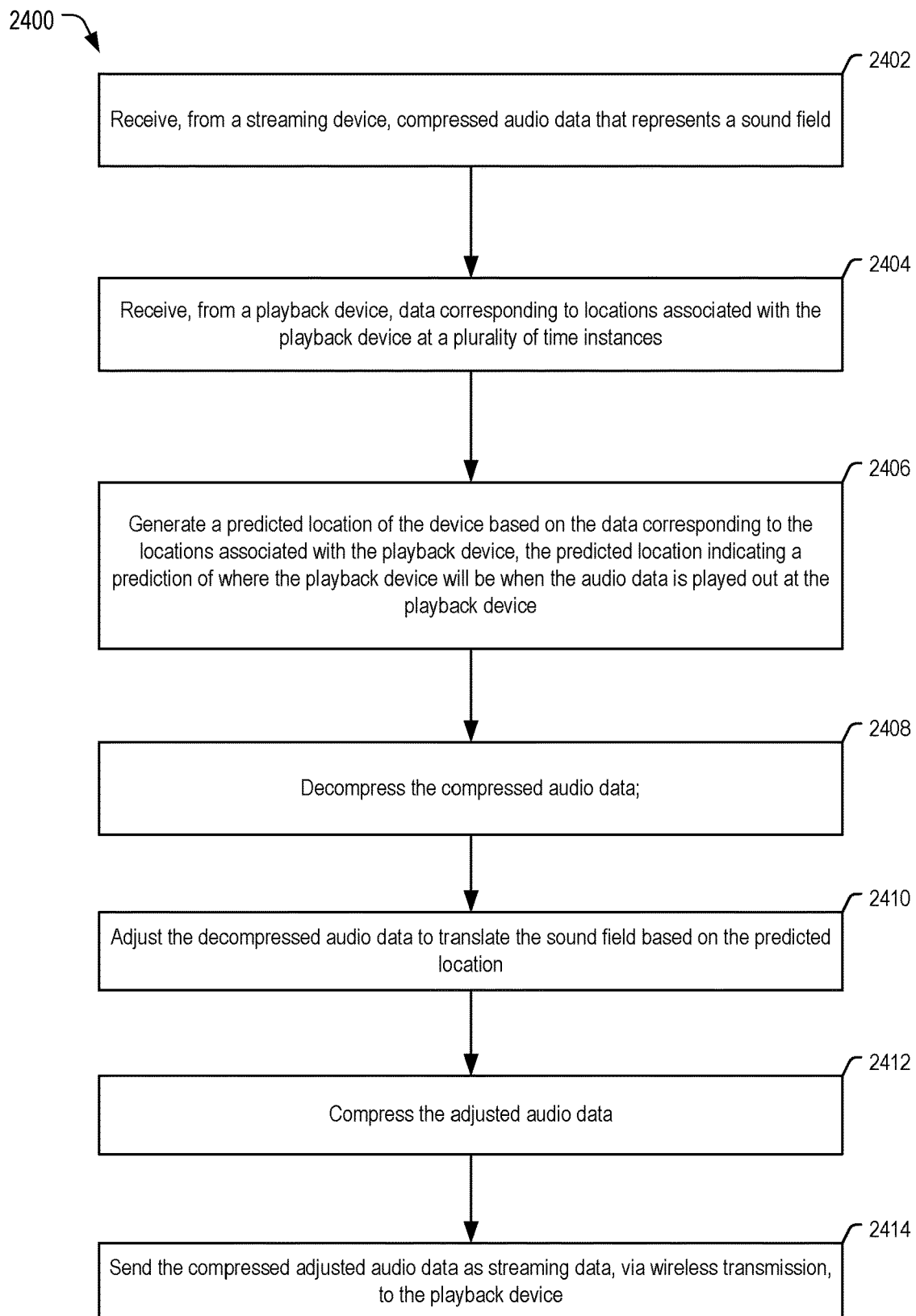
FIG. 24 illustrates a fifth example of a method for adjusting a sound field.

FIG. 24 illustrates a fifth example of a method 2400 for adjusting a sound field. The method 2400 may be performed by an electronic device, such as the wearable companion device 706.

The method 2400 includes receiving, from a streaming device, compressed audio data that represents a sound field, at 2402. For example, the compressed audio data may correspond to the encoded audio data 129 of FIG. 1 or a compressed version of the output ambisonics data 626 generated during an encoding portion of the audio coding operation 640.

The method 2400 includes receiving, from a playback device (e.g., the second device 202 or the wearable device 604), data corresponding to locations associated with the playback device at a plurality of time instances, at 2404. For example, the data may correspond to the user position and time stamp data 766.

The method 2400 may include generating a predicted location of the device based on the data corresponding to the locations associated with the playback device, at 2406. The predicted location indicates a prediction of where the playback device (e.g., the wearable device 604) will be when the audio data is played out at the playback device.

The method 2400 includes decompressing the compressed audio data, at 2408. For example, decompressing the audio data may be performed via a decoding portion of the audio coding operation 640.

The method 2400 includes adjusting the decompressed audio data to translate the sound field based on the predicted location, at 2410. For example, adjusting the decompressed audio data may be performed via the ambisonics sound field translation operation 768.

The method 2400 includes compressing the adjusted audio data (e.g., at an encoding portion of the audio coding operation 740), at 2412, and sending the compressed adjusted audio data as streaming data, via wireless transmission, to the playback device, at 2414. For example, the wearable companion device 706 generates compressed adjusted audio data by compressing the adjusted audio data 770 and sends the compressed adjusted audio data as streaming data, via the wireless transmission 750, to the wearable device 604.

Figure 25:
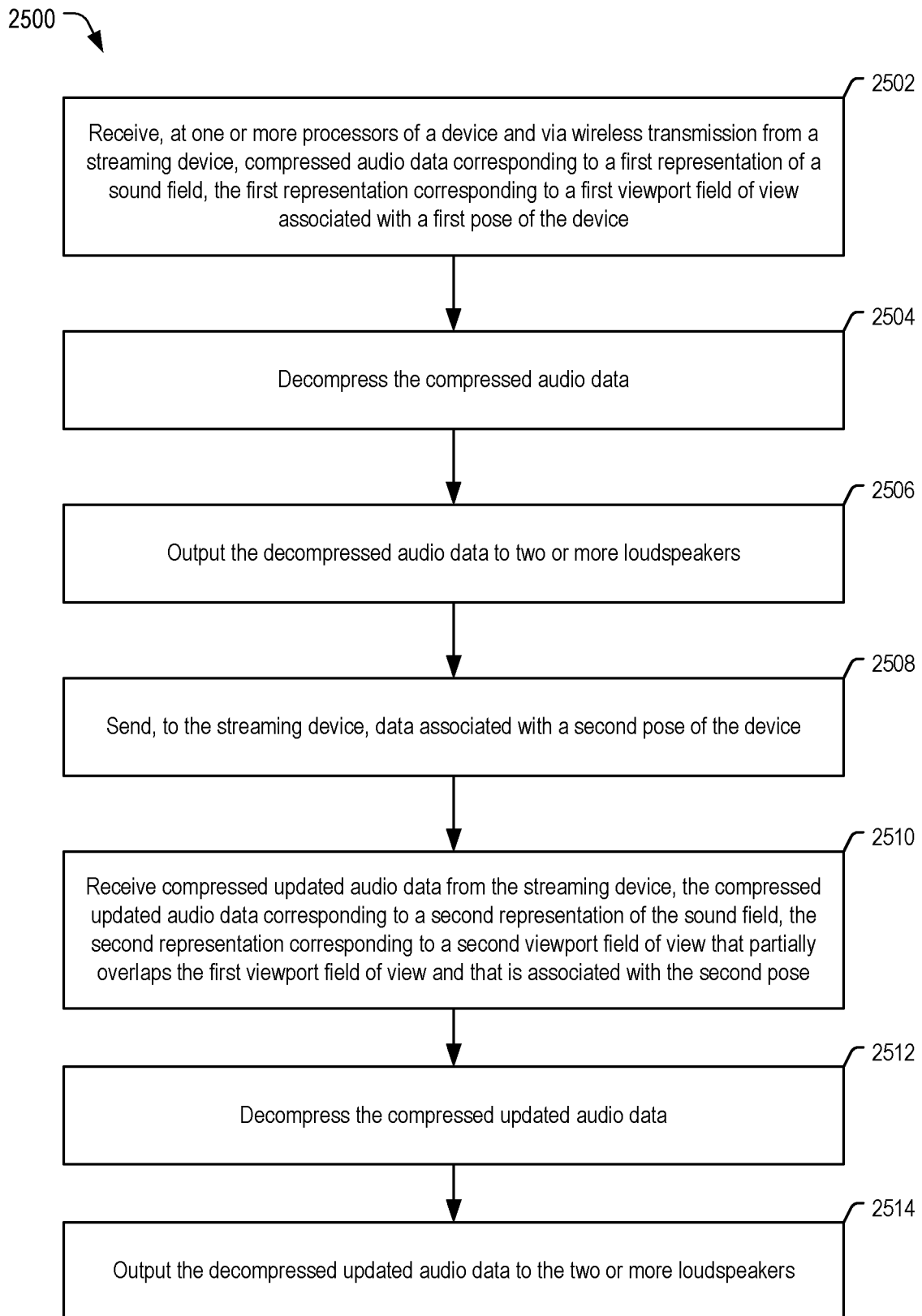
FIG. 25 illustrates a sixth example of a method for adjusting a sound field.

FIG. 25 illustrates a sixth example of a method for adjusting a sound field. The method 2500 may be performed by an electronic device, such as the second device 202 or the device 804, as illustrative, non-limiting examples.

The method 2500 includes receiving, at one or more processors of a device and via wireless transmission from a streaming device, compressed audio data corresponding to a first representation of a sound field, the first representation corresponding to a first viewport field of view associated with a first pose of the device, at 2502. For example, the device 804 may receive the audio stream 816 corresponding to the first ambisonics representation 822 which corresponds to the first viewport field of view 841 that is associated with a first pose of the device 804.

The method 2500 includes decompressing the compressed audio data, at 2504, and outputting the decompressed audio data to two or more loudspeakers, at 2506. For example, the audio decoder and binauralizer 808 may decompress a first portion of the audio stream 816 and output audio data to the speakers 834.

The method 2500 includes sending, to the streaming device, data associated with a second pose of the device, at 2508. For example, the device 804 sends the audio stream request 820 (e.g., indicating a second pose of the device 804) to the source device 802.

The method 2500 includes receiving compressed updated audio data from the streaming device, the compressed updated audio data corresponding to a second representation of the sound field, the second representation corresponding to a second viewport field of view that partially overlaps the first viewport field of view and that is associated with the second pose, at 2510. For example, the device 804 may receive a second portion of the audio stream 816 corresponding to the second ambisonics representation 824 which corresponds to the second viewport field of view 842 that is associated with the second pose of the device 804.

The method 2500 includes decompressing the compressed updated audio data, at 2512, and outputting the decompressed updated audio data to the two or more loudspeakers, at 2514. For example, the audio decoder and binauralizer 808 may decompress the second portion of the audio stream 816 and output the decompressed audio data to the speakers 834.

Figure 26:
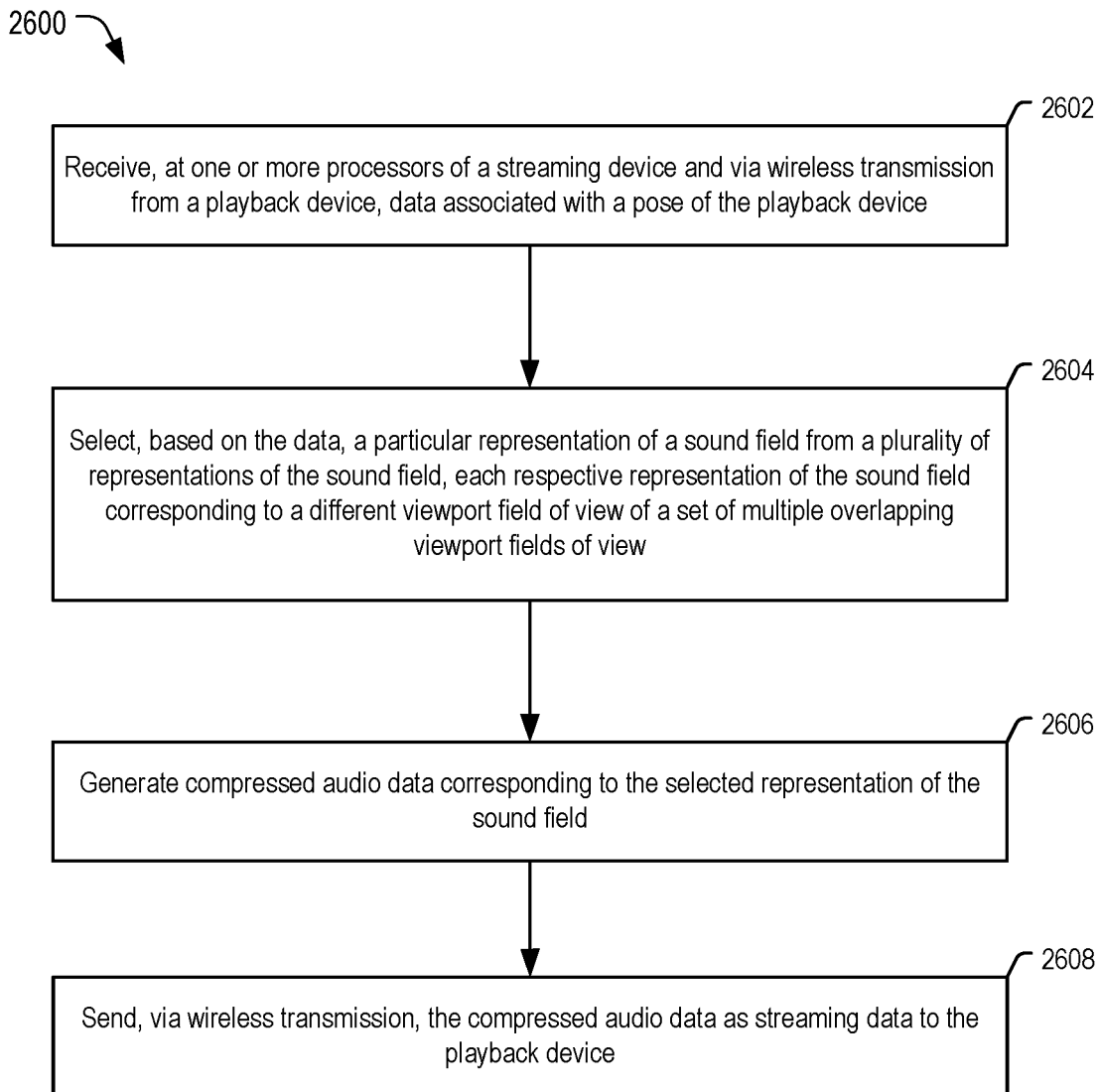
FIG. 26 illustrates a seventh example of a method for adjusting a sound field.

FIG. 26 illustrates a seventh example of a method for adjusting a sound field. The method 2600 may be performed by an electronic device, such as the first device 102 or the source device 802, as illustrative, non-limiting examples.

The method 2600 includes receiving, at one or more processors of a streaming device and via wireless transmission from a playback device, data associated with a pose of the playback device, at 2602. For example, the source device 802 receives the audio stream request 820.

The method 2600 includes selecting, based on the data, a particular representation of a sound field from a plurality of representations of the sound field, each respective representation of the sound field corresponding to a different viewport field of view of a set of multiple overlapping viewport fields of view, at 2604. For example, the source device 802 selects, based on the audio stream request 820 indicating a pose corresponding to the first viewport field of view 841, the first ambisonics representation 822 from the ambisonics representations 822-828 that correspond to overlapping viewport fields of view (e.g., VFOV 1-VFOV 8).

The method 2600 includes generating compressed audio data corresponding to the selected representation of the sound field, at 2606, and sending, via wireless transmission, the compressed audio data as streaming data to the playback device, at 2608. For example, the source device 802 sends the audio stream 816 corresponding to the first ambisonics representation 822 to the device 804.

Figure 27:
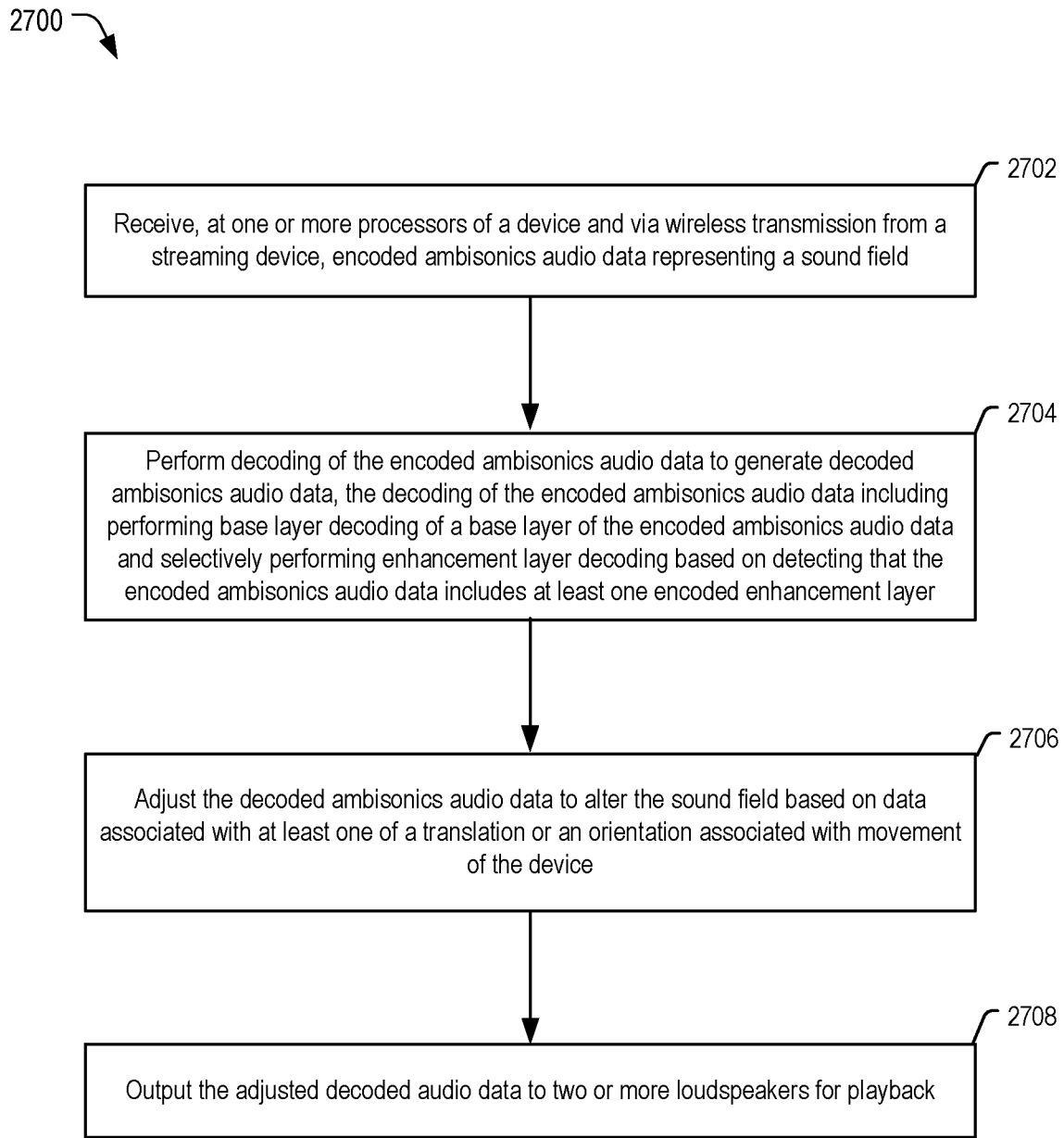
FIG. 27 illustrates an eighth example of a method for adjusting a sound field.

FIG. 27 illustrates an eighth example of a method for adjusting a sound field. The method 2700 may be performed by an electronic device, such as the second device 202 or the wearable device 1004, as illustrative, non-limiting examples.

The method 2700 includes receiving, at one or more processors of a device and via wireless transmission from a streaming device, encoded ambisonics audio data representing a sound field, at 2702. For example, the wearable device 1004 receives the encoded ambisonics audio data 1018 from the streaming device 1002.

The method 2700 includes performing decoding of the encoded ambisonics audio data to generate decoded ambisonics audio data, the decoding of the encoded ambisonics audio data including performing base layer decoding of a base layer of the encoded ambisonics audio data and selectively performing enhancement layer decoding based on detecting that the encoded ambisonics audio data includes at least one encoded enhancement layer, at 2704. For example, the wearable device 1004 preforms the ambisonics audio decoding operation 1020 using the base layer decoder 1040 for FOA frames and selectively using the first enhancement layer decoder 1042 when SOA frames are received.

The method 2700 includes adjusting the decoded ambisonics audio data to alter the sound field based on data associated with at least one of a translation or an orientation associated with movement of the device, at 2706, and outputting the adjusted decoded ambisonics audio data to two or more loudspeakers for playback, at 2708. For example, the wearable device 1004 performs the ambisonics sound field 3DOF/3DOF+ rotation and binauralization and provides the pose-adjusted binaural audio signal 1026, 1028 to the loudspeakers 1030, 1032.

Figure 28:
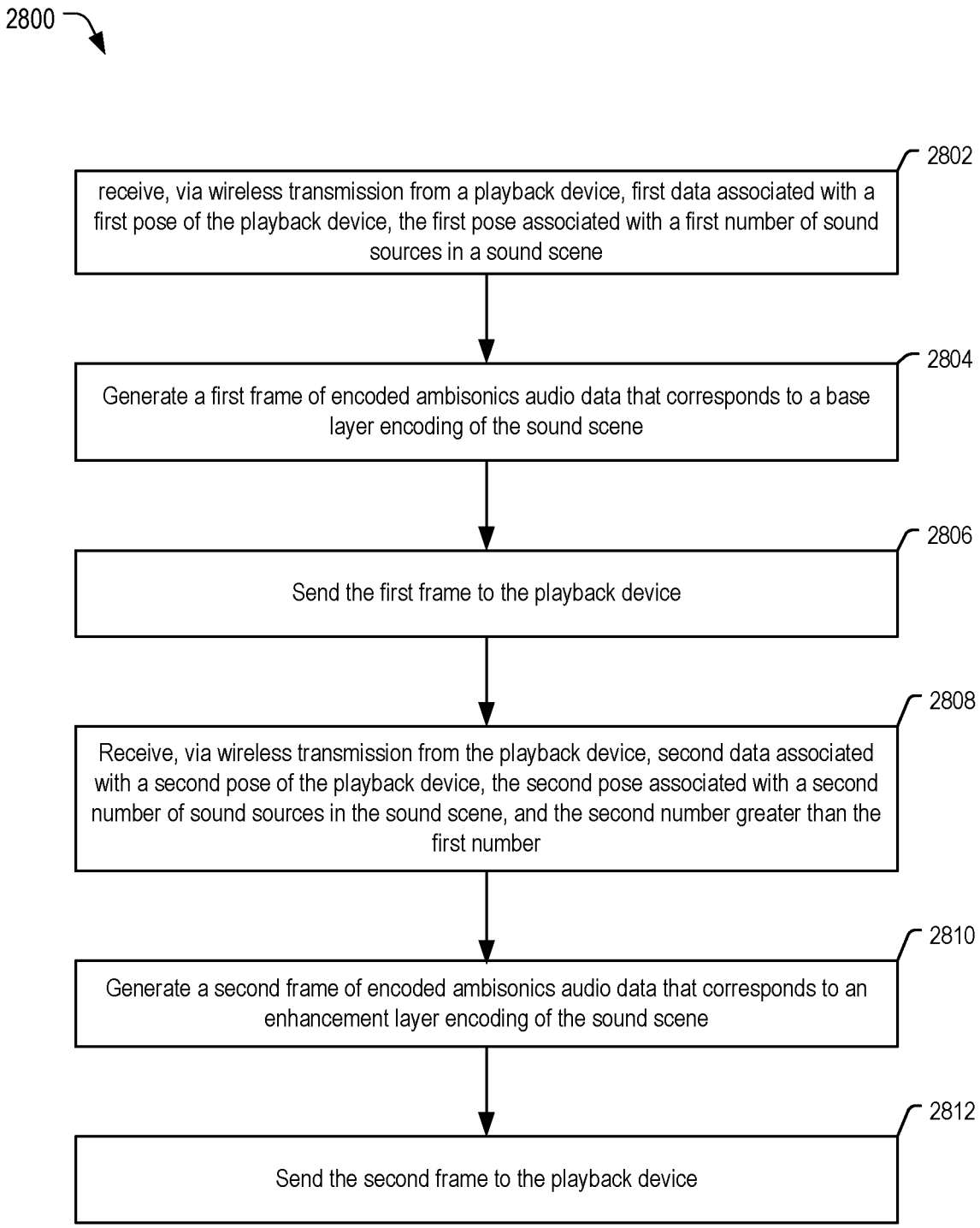
FIG. 28 illustrates a ninth example of a method for adjusting a sound field.

FIG. 28 illustrates a ninth example of a method for adjusting a sound field. The method 2800 may be performed by an electronic device, such as the first device 102 or the streaming device 1002, as illustrative, non-limiting examples.

The method 2800 includes receiving, via wireless transmission from a playback device, first data associated with a first pose of the playback device, the first pose associated with a first number of sound sources in a sound scene, at 2802. For example, the streaming device 1002 may receive at least a portion of the head-tracker data 1036.

The method 2800 includes generating a first frame of encoded ambisonics audio data that corresponds to a base layer encoding of the sound scene, at 2804, and sending the first frame to the playback device, at 2806. For example, the streaming device 1002 generates a frame corresponding to base level encoding, such as the first order ambisonics frame 1054, and transmits the frame to the wearable device 1004 via the wireless transmission 1006.

The method 2800 includes receiving, via wireless transmission from the playback device, second data associated with a second pose of the playback device, the second pose associated with a second number of sound sources in the sound scene, and the second number greater than the first number, at 2808. The method 2800 includes generating a second frame of encoded ambisonics audio data that corresponds to an enhancement layer encoding of the sound scene, at 2810, and sending the second frame to the playback device, at 2812. For example, the frames 1051-1054 can correspond to the wearable device 1004 on a user's head and oriented toward the first viewport field of view 841 of FIG. 8 having a relatively small number of sound sources. In response to the streaming device 1002 receiving data indicating the user's head movement changing the orientation of the wearable device 1004 to another viewport field of view (e.g., the second viewport field of view 842) that includes a greater number of audio sources than the first viewport field of view 841, the streaming device 1002 generates the subsequent frame 1055 that corresponds to an enhancement layer encoding for higher resolution to accommodate the larger number of sound sources.

Figure 29:
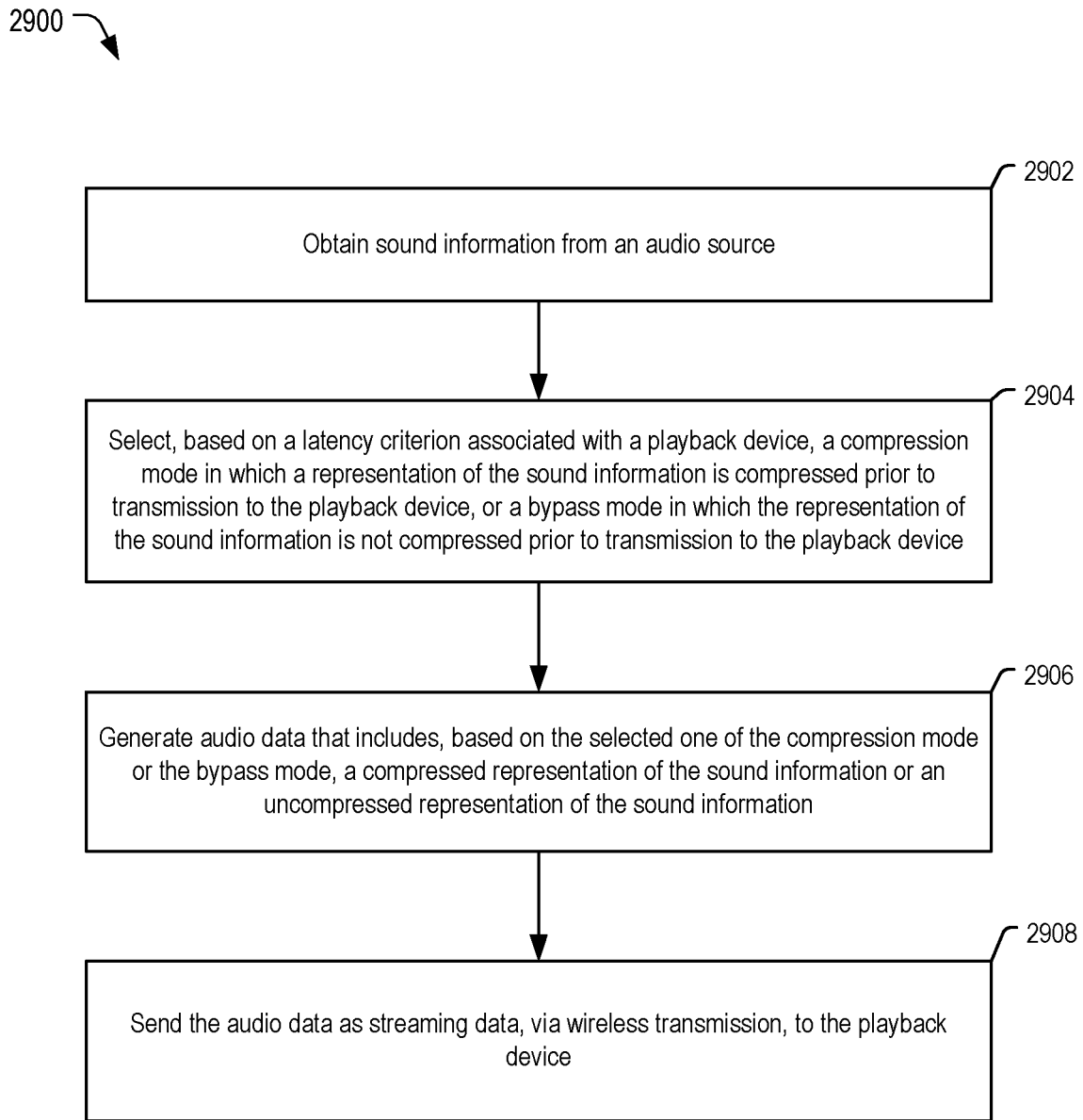
FIG. 29 illustrates a tenth example of a method for adjusting a sound field.

FIG. 29 is a flowchart illustrating a particular example of a method 2900 of processing audio data. According to a particular aspect, the method 2900 may be initiated, performed, or controlled by an electronic device, such as the first device 102 of FIG. 2, the streaming device 302 of FIG. 3B, the streaming device 402 of FIG. 4B, or the streaming device 502 of FIG. 5B, as illustrative, non-limiting examples.

The method 2900 includes, at 2902, obtaining sound information from an audio source. For example, the streaming device 302 receives the ambisonics data 312 from the audio source 310. According at a particular aspect, the sound information includes ambisonic data and corresponds to at least one of 2D audio data that represents a 2D sound field or 3D audio data that represents a 3D sound field.

The method 2900 also includes, at 2904, selecting, based on a latency criterion associated with a playback device, a compression mode in which a representation of the sound information is compressed prior to transmission to the playback device or a bypass mode in which the representation of the sound information is not compressed prior to transmission to the playback device. For example, the encoding operation 380 includes selection between the compression mode 330 and the bypass mode 329 based on the latency criterion 331.

In some implementations, the latency criterion is based on whether a playback latency associated with streaming data exceeds a latency threshold. In such implementations, the method 2900 may further include receiving, from the playback device, an indication that the playback latency associated with the streaming data exceeds the latency threshold and selecting the bypass mode based on receiving the indication. To illustrate, the streaming device 302 receives, from the playback device 304, an indication 333 that the playback latency associated with the streaming data exceeds the latency threshold 332, and the streaming device 302 selects the bypass mode 329 based on receiving the indication 333.

In a particular implementation, the latency criterion is based on a bandwidth of a wireless link to the playback device, such as described with reference to the latency criterion 331 that is at least partially based on a bandwidth of a wireless link associated with the wireless transmission 350 from the streaming device 302 to the playback device 304.

The method 2900 further includes, at 2906, generating audio data that includes, based on the selected one of the compression mode or the bypass mode, a compressed representation of the sound information or an uncompressed representation of the sound information. For example, the audio data 382 output from the encoding operation 380 can include compressed ambisonics coefficients from the compression encoding 324 or non-compressed ambisonics coefficients from the bypass operation 326.

In some implementations, in the bypass mode, generating the audio data includes discarding a high-resolution portion of the uncompressed representation based on a bandwidth of a wireless link to the playback device. In such implementations, for example, the uncompressed representation includes ambisonic coefficients, and the high-resolution portion of the uncompressed representation corresponds to a subset of the ambisonic coefficients, such as described with reference to the truncation operation 327.

The method 2900 also includes, at 2908, sending the audio data as streaming data, via wireless transmission, to the playback device.

In some implementations, the method 2900 includes determining whether a wireless link to the playback device corresponds to a higher-bandwidth wireless link (such as, for example, a 5G cellular digital network or a WiFi-type network) or to a lower-bandwidth wireless link (such as, for example, a Bluetooth network). In such implementations, the method 2900 may include selecting the bypass mode based on the wireless link corresponding to the higher-bandwidth wireless link. Alternatively, in such implementations, the method 2900 may include selecting the compression mode based on the wireless link corresponding to the lower-bandwidth wireless link.

In some implementations, the method 2900 includes receiving, from the playback device, a request for compressed audio data or for uncompressed audio data. In such implementations, the method 2900 may also include selecting the bypass mode or the compression mode based on the request.

In some implementations, the method 2900 further includes receiving translation data from the playback device. For example, the translation data may correspond to a translation associated with the playback device. In such implementations, the method 2900 may further include converting the sound information to audio data that represents a sound field based on the translation.

In some implementations, the method 2900 includes receiving, from the playback device, data corresponding to a location and an orientation associated with movement of the playback device. In such implementations, the method 2900 also includes updating the sound information to alter a sound field based on the received data. In some examples of such implementations, the method 2900 also includes sending, via wireless transmission, compressed audio data representing the sound field to the playback device. The compressed audio data representing the sound field may enable the playback device to decompress the compressed audio data representing the sound field, to adjust the decompressed audio data to alter the sound field based on the orientation associated with the device, and to output the adjusted decompressed audio data to two or more loudspeakers. In other examples of such implementation, the method 2900 includes sending, via wireless transmission, uncompressed audio data representing the sound field to the playback device. The uncompressed audio data may enable the playback device to adjust the audio data to alter the sound field based on the orientation associated with the device and to output the adjusted audio data to two or more loudspeakers.

Figure 30:
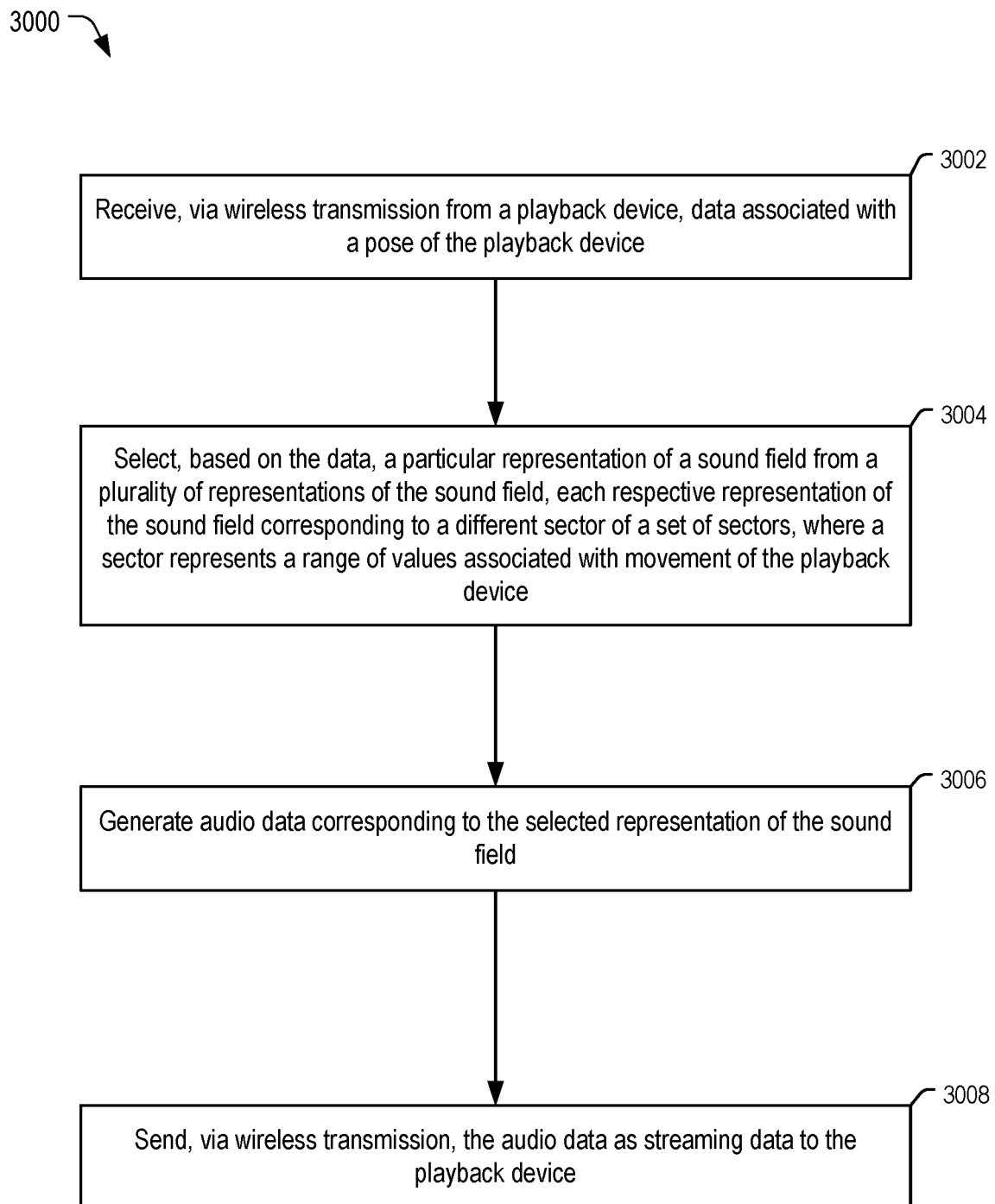
FIG. 30 illustrates an eleventh example of a method for adjusting a sound field.

FIG. 30 is a flowchart illustrating a particular example of a method 3000 of processing audio data. According to a particular aspect, the method 3000 may be initiated, performed, or controlled by an electronic device, such as the first device 102 of FIG. 2 or the source device 802 of FIG. 8B or FIG. 8C, as illustrative, non-limiting examples.

The method 3000 includes receiving, via wireless transmission from a playback device, data associated with a pose of the playback device, at 3002. For example, the source device 802 may receive the pose data 871 via the audio stream request 820.

The method 3000 also includes selecting, based on the data, a particular representation of a sound field from a plurality of representations of the sound field, at 3004. For example, the source device 802 selects one of the ambisonics representations 862-868 or one of the stereo representations 872-878 based on the pose data 871. Each respective representation of the sound field corresponds to a different sector of a set of sectors. A sector represents a range of values associated with movement of the playback device.

The method 3000 further includes generating audio data corresponding to the selected representation of the sound field, at 3006, and sending, via wireless transmission, the audio data as streaming data to the playback device, at 3008. For example, the source device 802 generates and sends the audio stream 816 based on the selected representation of the sound field.

Figure 31:
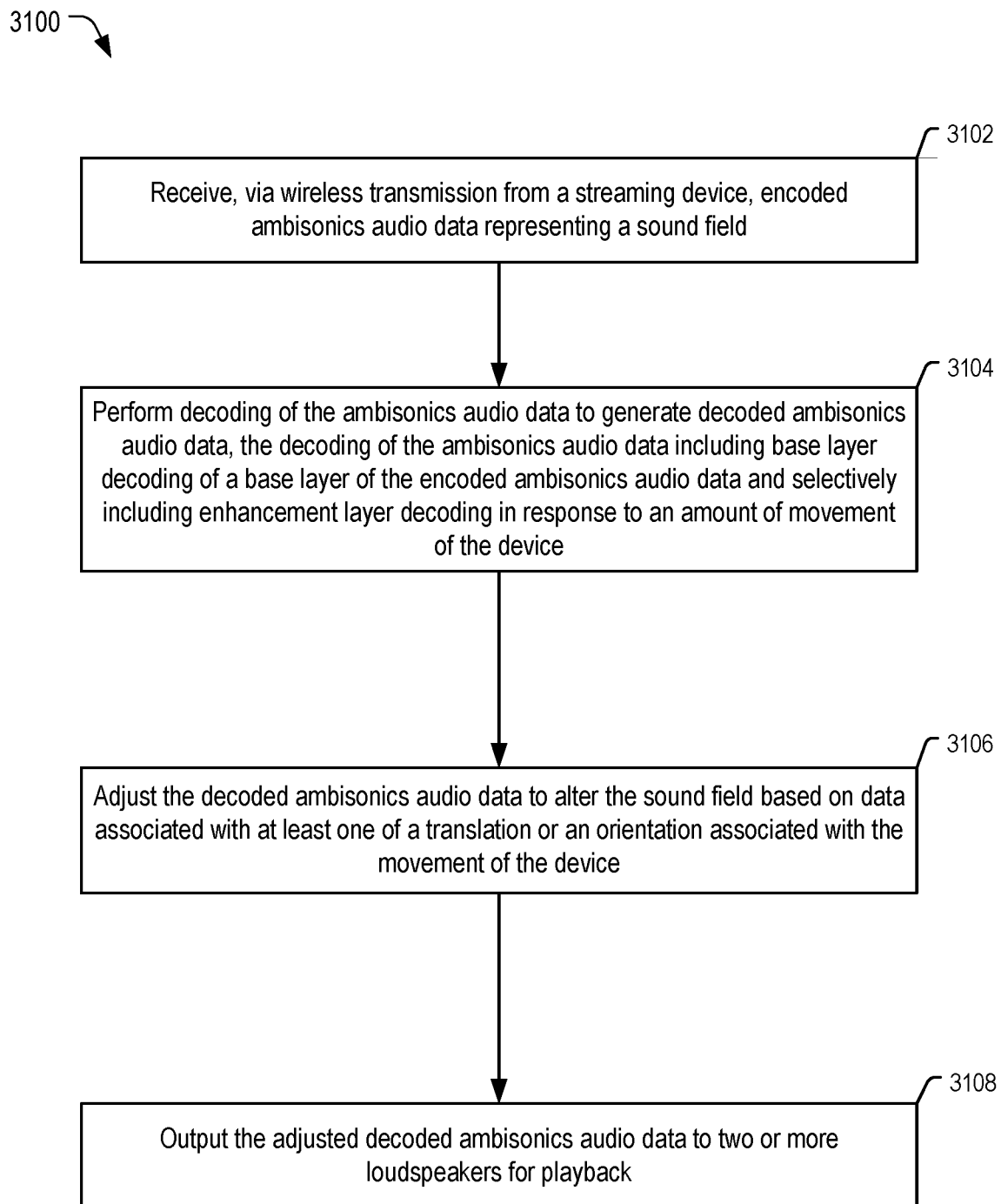
FIG. 31 illustrates a twelfth example of a method for adjusting a sound field.

FIG. 31 is a flowchart illustrating a particular example of a method 3100 of processing audio data. According to a particular aspect, the method 3100 may be initiated, performed, or controlled by an electronic device, such as the second device 202 of FIG. 2 or the wearable device 1004 of FIG. 10B, as illustrative, non-limiting examples.

The method 3100 includes receiving, via wireless transmission from a streaming device, encoded ambisonics audio data representing a sound field, at 3102. For example, the wearable device 1004 receives the encoded ambisonics audio data 1018 from the streaming device 1002.

The method 3100 also includes performing decoding of the ambisonics audio data to generate decoded ambisonics audio data, at 3104. For example, the wearable device 1004 performs the ambisonics audio decoding operation 1020 to generate the decode ambisonics audio data 1022. The decoding of the ambisonics audio data includes base layer decoding of a base layer of the encoded ambisonics audio data and selectively includes enhancement layer decoding in response to an amount of movement of the device. For example, the movement-based resolution selection 1070 generates the signals 1080-1086 to control the ambisonics audio decoding operation 1020 and operation of the base layer decoder 1040, the first enhancement layer decoder 1042, and the second enhancement layer decoder 1044 based on the amount of the movement 1072.

The method 3100 further includes adjusting the decoded ambisonics audio data to alter the sound field based on data associated with at least one of a translation or an orientation associated with the movement of the device, at 3106, and outputting the adjusted decoded ambisonics audio data to two or more loudspeakers for playback, at 3108. For example, the wearable device 1004 performs the ambisonics sound field 3DOF/DOF+ rotation and binauralization operation 1024 to provide pose-adjusted binaural audio signals 1026, 1028 to loudspeakers 1030, 1032 based on head-tracker data 1036 from one or more sensors 1034.

Referring to FIG. 32, a block diagram of a particular illustrative implementation of a device is depicted and generally designated 3200. In various implementations, the device 3200 may have more or fewer components than illustrated in FIG. 32. In an illustrative implementation, the device 3200 may correspond to the first device 102 or the second device 202. In an illustrative implementation, the device 3200 may perform one or more operations described with reference to FIGS. 2-31.

In a particular implementation, the device 3200 includes a processor 3206 (e.g., a central processing unit (CPU)). The device 3200 may include one or more additional processors 3210 (e.g., one or more DSPs). In a particular implementation, the processor 220 of FIG. 2 corresponds to the processor 3206, the processors 3210, or a combination thereof. For example, the processors 3210 may include a speech and music coder-decoder (CODEC) 3208, the renderer 222, the sound field adjuster 224, the decoder 228, or a combination thereof. In another particular implementation, the processor 120 of FIG. 2 corresponds to the processor 3206, the processors 3210, or a combination thereof. For example, the processors 3210 may include the speech and music coder-decoder (CODEC) 3208, the sound field representation generator 124, the encoder 128, or a combination thereof. The speech and music codec 3208 may include a voice coder ("vocoder") encoder 3236, a vocoder decoder 3238, or both.

The device 3200 may include a memory 3286 and a CODEC 3234. The memory 3286 may include instructions 3256, that are executable by the one or more additional processors 3210 (or the processor 3206) to implement the functionality described with reference to the renderer 222, the sound field adjuster 224, the decoder 228, or any combination thereof. The device 3200 may include a modem 3240 coupled, via a transceiver 3250, to an antenna 3252. The transceiver 3250 may correspond to the transceiver 230 of FIG. 2. In implementations in which the device 3200 corresponds to a sending device, the modem 3240 may be configured to modulate audio data for transmission to a playback device, and the antenna 3252 may be configured to transmit the modulated audio data to the playback device. In implementations in which the device 3200 corresponds to a playback device, the antenna 3252 may be configured to receive modulated transmission data that represents encoded audio data, and the modem 3240 may be configured to demodulate the received modulated transmission data to generate the encoded audio data.

The device 3200 may include a display 3228 coupled to a display controller 3226. Multiple speakers 3292 (e.g., the speakers 240, 242) and one or more microphones, such as a microphone 3294, may be coupled to the CODEC 3234. The CODEC 3234 may include a digital-to-analog converter (DAC) 3202 and an analog-to-digital converter (ADC) 3204. In a particular implementation, the CODEC 3234 may receive analog signals from the microphone 3294, convert the analog signals to digital signals using the analog-to-digital converter 3204, and send the digital signals to the speech and music codec 3208. In a particular implementation, the speech and music codec 3208, the renderer 222, or both, may provide digital signals to the CODEC 3234. The CODEC 3234 may convert the digital signals to analog signals using the digital-to-analog converter 3202 and may provide the analog signals to the speakers 3292.

In a particular implementation, the device 3200 may be included in a system-in-package or system-on-chip device 3222. In a particular implementation, the memory 3286, the processor 3206, the processors 3210, the display controller 3226, the CODEC 3234, and the modem 3240 are included in a system-in-package or system-on-chip device 3222. In a particular implementation, an input device 3230 (e.g., the one or more sensors 244) and a power supply 3244 are coupled to the system-on-chip device 3222. Moreover, in a particular implementation, as illustrated in FIG. 32, the display 3228, the input device 3230, the speakers 3292, the microphone 3294, the antenna 3252, and the power supply 3244 are external to the system-on-chip device 3222. In a particular implementation, each of the display 3228, the input device 3230, the speakers 3292, the microphone 3294, the antenna 3252, and the power supply 3244 may be coupled to a component of the system-on-chip device 3222, such as an interface or a controller.

The device 3200 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

In conjunction with the described techniques, a first apparatus includes means for receiving, at one or more processors via wireless transmission, compressed audio data representing a sound field, such as the transceiver 230, the receiver 234, the decoder 228, the one or more processors 220, the processor 3206, the processor 3210, the transceiver 3250, or a combination thereof.

The first apparatus includes means for decompressing the compressed audio data, such as the decoder 228, the one or more processors 220, the processor 3206, the processor 3210, one or more processors executing the ambisonics audio decoding operation 360, or a combination thereof.

The first apparatus includes means for adjusting the decompressed audio data to alter the sound field based on data associated with at least one of a translation or an orientation associated with movement of a device, such as the sound field adjuster 224, the one or more processors 220, the processor 3206, the processor 3210, one or more processors executing the ambisonics sound field 3DOF/3DOF+ rotation and binauralization operation 364, one or more processors executing the ambisonics sound field 6DOF scene displacement and binauralization operation 564, or a combination thereof.

The first apparatus includes means for rendering the adjusted decompressed audio data into two or more loudspeaker gains to drive two or more loudspeakers, such as the renderer 222, the one or more processors 220, the processor 3206, the processor 3210, one or more processors executing the ambisonics sound field 3DOF/3DOF+ rotation and binauralization operation 364, one or more processors executing the ambisonics sound field 6DOF scene displacement and binauralization operation 564, or a combination thereof.

The first apparatus includes means for outputting the adjusted decompressed audio data to the two or more loudspeakers for playback, such as the renderer 222, the one or more processors 220, the one or more processors 220, the processor 3206, the processor 3210, one or more processors executing the ambisonics sound field 3DOF/3DOF+ rotation and binauralization operation 364, one or more processors executing the ambisonics sound field 6DOF scene displacement and binauralization operation 564, or the combiner 638, or a combination thereof.

In conjunction with the described techniques, a second apparatus includes means for receiving sound information from an audio source, such as the sound field representation generator 124, the one or more processors 220, the processor 3206, the processor 3210, one or more processors executing the rendering/conversion to ambisonics operation 416, one or more processors executing the rendering/conversion to HOA operation 616, or a combination thereof.

The second apparatus includes means for receiving translation data from a playback device, the translation data corresponding to a translation associated with the playback device, such as the transceiver 130, the receiver 134, the one or more processors 120, the one or more processors 220, the processor 3206, the processor 3210, the transceiver 3250, or a combination thereof.

The second apparatus includes means for converting the sound information to audio data that represents a sound field based on the translation, such as the sound field representation generator 124, the one or more processors 220, the processor 3206, the processor 3210, one or more processors executing the rendering/conversion to ambisonics operation 416, one or more processors executing the rendering/conversion to HOA operation 616, or a combination thereof.

The second apparatus includes means for sending the audio data as streaming data, via wireless transmission, to the playback device, such as the transceiver 130, the transmitter 132, the one or more processors 120, the one or more processors 220, the processor 3206, the processor 3210, one or more processors or devices executing the wireless transmission 350, one or more processors or devices executing the audio coding 640 or the wireless transmission 650, the transceiver 3250, or a combination thereof.

In conjunction with the described techniques, a third apparatus includes means for obtaining data, at a plurality of time instances, associated with tracking location and an orientation associated with movement of the apparatus, such as the one or more sensors 244, the one or more processors 220, the one or more sensors 344, one or more processors of the wearable device 604 of FIG. 6 or FIG. 7 configured to receive the head-tracker data 648, the processor 3206, the processor 3210, or a combination thereof.

The third apparatus includes means for sending, via wireless transmission to a remote device, the data, such as the transceiver 230, the transmitter 232, the one or more processors 220, one or more processors of the wearable device 604 of FIG. 6 configured to perform the wireless transmission 653, one or more processors of the wearable device 604 of FIG. 7 configured to perform the wireless transmission 780, the processor 3206, the processor 3210, the transceiver 3250, or a combination thereof.

The third apparatus includes means for receiving, via wireless transmission from the remote device, compressed audio data representing a sound field, such as the transceiver 230, the receiver 234, the one or more processors 220, one or more processors of the wearable device 604 of FIG. 6, one or more processors of the wearable device 604 of FIG. 7, the processor 3206, the processor 3210, the transceiver 3250, or a combination thereof.

The third apparatus includes means for decompressing the compressed audio data representing the sound field, such as the one or more processors 220, the decoder 228, one or more processors of the wearable device 604 of FIG. 6 configured to perform a decoding portion of the audio coding operation 640, one or more processors of the wearable device 604 of FIG. 7 configured to perform a decoding portion of the audio coding operation 740, the processor 3206, the processor 3210, or a combination thereof.

The third apparatus includes means for adjusting the decompressed audio data to alter the sound field based on the orientation associated with the apparatus, such as the sound field adjuster 224, the one or more processors 220, one or more processors of the wearable device 604 of FIG. 6 or FIG. 7 configured to perform the ambisonics sound field 3DOF/3DOF+ rotation and binauralization operation 364, the processor 3206, the processor 3210, or a combination thereof.

The third apparatus includes means for outputting the adjusted decompressed audio data to two or more loudspeakers, such as the one or more processors 220, the renderer 222, the combiner 638, the processor 3206, the processor 3210, or a combination thereof.

In conjunction with the described techniques, a fourth apparatus includes means for receiving sound information from an audio source, such as the sound field representation generator 124, the one or more processors 120, one or more processors of the wearable device 604 of FIG. 6, one or more processors of the wearable device 604 of FIG. 7, one or more processors executing the rendering/conversion to HOA operation 616, the processor 3206, the processor 3210, the transceiver 3250, or a combination thereof.

The fourth apparatus includes means for receiving, from a playback device, data corresponding to locations associated with the playback device at a plurality of time instances, such as such as the transceiver 130, the receiver 134, the one or more processors 120, one or more processors of the wearable device 604 of FIG. 6 configured to receive the wireless transmission 653, one or more processors of the wearable device 604 of FIG. 7 configured to receive the wireless transmission 780, the processor 3206, the processor 3210, the transceiver 3250, or a combination thereof.

The fourth apparatus includes means for converting the sound information to audio data that represents a sound field based on the data corresponding to the locations associated with the playback device, such as the sound field representation generator 124, one or more processors executing the rendering/conversion to HOA operation 616, the processor 3206, the processor 3210, or a combination thereof.

The fourth apparatus includes means for sending the audio data as streaming data, via wireless transmission, to one or both of the playback device or a second device that is coupled to the playback device, such as the transceiver 130, the transmitter 132, the one or more processors 120, one or more processors or devices executing the audio coding operation 640 or the wireless transmission 650, the processor 3206, the processor 3210, the transceiver 3250, or a combination thereof.

In conjunction with the described techniques, a fifth apparatus includes means for receiving, from a streaming device, compressed audio data that represents a sound field, such as the one or more processors 760 executing a decode portion of the audio coding operation 640 or receive operations of the wireless transmission 650, the processor 3206, the processor 3210, or a combination thereof.

The fifth apparatus includes means for receiving, from a playback device, data corresponding to locations associated with the playback device at a plurality of time instances, such as the one or more processors 760 executing receive operations of the wireless transmission 780, the processor 3206, the processor 3210, or a combination thereof.

The fifth apparatus includes means for generating a predicted location of the device based on the data corresponding to the locations associated with the playback device, the predicted location indicating a prediction of where the playback device will be when the audio data is played out at the playback device, such as the one or more processors 760 executing a location prediction operation based on the user position and time stamp data 766 the processor 3206, the processor 3210, or a combination thereof.

The fifth apparatus includes means for decompressing the compressed audio data, such as the one or more processors 760 executing a decode portion of the audio coding operation 640, the processor 3206, the processor 3210, or a combination thereof.

The fifth apparatus includes means for adjusting the decompressed audio data to translate the sound field based on the predicted location, such as the one or more processors 760 executing the ambisonics sound field translation 768, the processor 3206, the processor 3210, or a combination thereof.

The fifth apparatus includes means for compressing the adjusted audio data, such as the one or more processors 760 executing an encode portion of the audio coding operation 740, the processor 3206, the processor 3210, or a combination thereof.

The fifth apparatus includes means for sending the compressed adjusted audio data as streaming data, via wireless transmission, to the playback device, such as the one or more processors 760 executing transmit operations of the wireless transmission 750, the processor 3206, the processor 3210, or a combination thereof.

In conjunction with the described techniques, a sixth apparatus includes means for receiving (e.g., the transceiver 230, the receiver 234, the one or more processors 220, the second device 202, the device 804, the streaming client 806, the processor 3206, the processor 3210, or a combination thereof), via wireless transmission from a streaming device, compressed audio data corresponding to a first representation of a sound field, the first representation corresponding to a first viewport field of view associated with a first pose of a device.

The sixth apparatus includes means for decompressing the compressed audio data, such as the one or more processors 220, the decoder 228, the second device 202, the streaming client 806, the audio decoder and binauralizer 808, the processor 3206, the processor 3210, or a combination thereof.

The sixth apparatus includes means for outputting the decompressed audio data to two or more loudspeakers, such as the one or more processors 220, the sound field adjuster 224, the renderer 222, the second device 202, the audio decoder and binauralizer 808, the processor 3206, the processor 3210, or a combination thereof.

The sixth apparatus includes means for sending, to the streaming device, data associated with a second pose of the device, such as the one or more processors 220, the transceiver 230, the transmitter 232, the second device 202, the streaming client 806, the processor 3206, the processor 3210, or a combination thereof.

The sixth apparatus includes means for receiving (e.g., the transceiver 230, the receiver 234, the one or more processors 220, the second device 202, the device 804, the streaming client 806, the processor 3206, the processor 3210, or a combination thereof) compressed updated audio data from the streaming device, the compressed updated audio data corresponding to a second representation of the sound field, and the second representation corresponding to a second viewport field of view that partially overlaps the first viewport field of view and that is associated with the second pose.

The sixth apparatus includes means for decompressing the compressed updated audio data, such as the one or more processors 220, the decoder 228, the second device 202, the streaming client 806, the audio decoder and binauralizer 808, the processor 3206, the processor 3210, or a combination thereof.

The sixth apparatus includes means for outputting the decompressed updated audio data to the two or more loudspeakers, such as the one or more processors 220, the sound field adjuster 224, the renderer 222, the second device 202, the audio decoder and binauralizer 808, the processor 3206, the processor 3210, or a combination thereof.

In conjunction with the described techniques, a seventh apparatus includes means for receiving, via wireless transmission from a playback device, data associated with a pose of the playback device, such as the first device 102, the transceiver 130, the receiver 134, the one or more processors 832, the source device 802, the processor 3206, the processor 3210, or a combination thereof.

The seventh apparatus includes means for selecting (e.g., the one or more processors 120, the memory 110, the first device 102, the one or more processors 832, the memory 830, the processor 3206, the processor 3210, or a combination thereof), based on the data, a particular representation of a sound field from a plurality of representations of the sound field, each respective representation of the sound field corresponding to a different viewport field of view of a set of multiple overlapping viewport fields of view.

The seventh apparatus includes means for generating compressed audio data corresponding to the selected representation of the sound field, such as the one or more processors 120, the sound field representation generator 124, the encoder 128, the first device 102, the one or more processors 832, the processor 3206, the processor 3210, or a combination thereof.

The seventh apparatus includes means for sending, via wireless transmission, the compressed audio data as streaming data to the playback device, such as the one or more processors 120, the transceiver 130, the transmitter 132, the first device 102, the one or more processors 832, the processor 3206, the processor 3210, or a combination thereof.

In conjunction with the described techniques, an eighth apparatus includes means for receiving, via wireless transmission from a streaming device, encoded ambisonics audio data representing a sound field, such as the transceiver 230, the receiver 234, the one or more processors 220, the second device 202, the device 1004, one or more processors configured to receive the encoded ambisonics audio data 1018 of FIG. 10, the processor 3206, the processor 3210, or a combination thereof.

The eighth apparatus includes means for performing decoding of the ambisonics audio data to generate decoded ambisonics audio data, such as the one or more processors 220, the decoder 228, the second device 202, or the base layer decoder 1040, the first enhancement layer decoder 1042, the processor 3206, the processor 3210, or a combination thereof. The decoding of the ambisonics audio data including base layer decoding of a base layer of the encoded ambisonics audio data, and selectively including enhancement layer decoding in response to detecting that the encoded ambisonics audio data includes at least one encoded enhancement layer.

The eighth apparatus includes means for adjusting the decoded ambisonics audio data to alter the sound field based on data associated with at least one of a translation or an orientation associated with movement of a device, such as the one or more processors 220, the sound field adjuster 224, the second device 202, one or more processors of the wearable device 1004 performing the ambisonics sound field 3DOF/3DOF+ rotation and binauralization operation 1024, the processor 3206, the processor 3210, or a combination thereof.

The eighth apparatus includes means for outputting the adjusted decoded ambisonics audio data to two or more loudspeakers for playback, such as the one or more processors 220, the renderer 222, the second device 202, one or more processors of the wearable device 1004 performing the ambisonics sound field 3DOF/3DOF+ rotation and binauralization operation 1024, the processor 3206, the processor 3210, or a combination thereof.

In conjunction with the described techniques, a ninth apparatus includes means for receiving, via wireless transmission from a playback device, first data associated with a first pose of the playback device, the first pose associated with a first number of sound sources in a sound scene, such as the first device 102, the sound field representation generator 124, the transceiver 130, the receiver 134, the streaming device 1002, the processor 3206, the processor 3210, the antenna 3252, the transceiver 3250, the modem 3240, or a combination thereof.

The ninth apparatus includes means for generating a first frame of encoded ambisonics audio data that corresponds to a base layer encoding of the sound scene, such as the one or more processors 120, the sound field representation generator 124, the memory 110, the first device 102, the streaming device 1002, the processor 3206, the processor 3210, or a combination thereof.

The ninth apparatus includes means for sending the first frame to the playback device, such as the first device 102, the sound field representation generator 124, the encoder 128, the transceiver 130, the transmitter 132, the streaming device 1002, the processor 3206, the processor 3210, the antenna 3252, the transceiver 3250, the modem 3240, or a combination thereof.

The ninth apparatus includes means for receiving, via wireless transmission from the playback device, second data associated with a second pose of the playback device, the second pose associated with a second number of sound sources in the sound scene, and the second number greater than the first number, such as the first device 102, the transceiver 130, the receiver 134, the sound field representation generator 124, the streaming device 1002, the processor 3206, the processor 3210, the antenna 3252, the transceiver 3250, the modem 3240, or a combination thereof.

The ninth apparatus includes means for generating a second frame of encoded ambisonics audio data that corresponds to an enhancement layer encoding of the sound scene, such as the one or more processors 120, the memory 110, the sound field representation generator 124, the first device 102, the streaming device 1002, the processor 3206, the processor 3210, or a combination thereof.

The ninth apparatus includes means for sending the second frame to the playback device, such as the first device 102, the sound field representation generator 124, the encoder 128, the transceiver 130, the transmitter 132, the streaming device 1002, the processor 3206, the processor 3210, the antenna 3252, the transceiver 3250, the modem 3240, or a combination thereof.

In conjunction with the described techniques, a tenth apparatus includes means for obtaining sound information from an audio source, such as the sound field representation generator 124, the one or more processors 120, the processor 3206, the processor 3210, one or more processors executing the rendering/conversion to ambisonics operation 316, one or more processors executing the encoding operation 380, one or more processors executing the rendering/conversion to HOA operation 616, or a combination thereof.

The tenth apparatus includes means for means for selecting, based on a latency criterion associated with a playback device, a compression mode in which a representation of the sound information is compressed prior to transmission to the playback device or a bypass mode in which the representation of the sound information is not compressed prior to transmission to the playback device, such as the one or more processors 120, one or more processors executing the encoding operation 380, the processor 3206, the processor 3210, or a combination thereof.

The tenth apparatus includes means for generating audio data that includes, based on the selected one of the compression mode or the bypass mode, a compressed representation of the sound information or an uncompressed representation of the sound information, such as the one or more processors 120, one or more processors executing the encoding operation 380, the processor 3206, the processor 3210, or a combination thereof.

The tenth apparatus includes means for sending the audio data as streaming data, via wireless transmission, to the playback device, such as the first device 102, the transceiver 130, the transmitter 132, the streaming device 302, the streaming device 402, the streaming device 502, the streaming device 602, the processor 3206, the processor 3210, the antenna 3252, the transceiver 3250, the modem 3240, or a combination thereof.

In conjunction with the described techniques, an eleventh apparatus includes means for receiving, via wireless transmission from a playback device, data associated with a pose of the playback device, such as the one or more processors 120, the transceiver 130, the receiver 134, the source device 802, the processor 832, the processor 3206, the processor 3210, the antenna 3252, the transceiver 3250, the modem 3240, or a combination thereof.

The eleventh apparatus includes means for means for selecting, based on the data, a particular representation of a sound field from a plurality of representations of the sound field, where each respective representation of the sound field corresponds to a different sector of a set of sectors, and a sector represents a range of values associated with movement of the playback device, such as the one or more processors 120, the one or more processors 832, the processor 3206, the processor 3210, or a combination thereof.

The eleventh apparatus includes means for generating audio data corresponding to the selected representation of the sound field, such the one or more processors 120, the one or more processors 832, the processor 3206, the processor 3210, or a combination thereof.

The eleventh apparatus includes means for sending, via wireless transmission, the audio data as streaming data to the playback device, such as the first device 102, the transceiver 130, the transmitter 132, the source device 802, the one or more processors 832, the processor 3206, the processor 3210, the antenna 3252, the transceiver 3250, the modem 3240, or a combination thereof.

In conjunction with the described techniques, a twelfth apparatus includes means for receiving, via wireless transmission from a streaming device, encoded ambisonics audio data representing a sound field, such as the one or more processors 220, the transceiver 230, the receiver 234, the wearable device 1004, the processor 3206, the processor 3210, the antenna 3252, the transceiver 3250, the modem 3240, or a combination thereof.

The twelfth apparatus includes means for performing decoding of the ambisonics audio data to generate decoded ambisonics audio data, where the decoding of the ambisonics audio data includes base layer decoding of a base layer of the encoded ambisonics audio data and selectively includes enhancement layer decoding in response to an amount of movement of the device, such as the one or more processors 220, one or more processors executing the ambisonics audio decoding operation 1020, the base layer decoder 1040, the first enhancement layer decoder 1042, the second enhancement layer decoder 1044, the processor 3206, the processor 3210, or a combination thereof.

The twelfth apparatus includes means for adjusting the decoded ambisonics audio data to alter the sound field based on data associated with at least one of a translation or an orientation associated with the movement of the device, such the one or more processors 220, one or more processors executing the ambisonics sound field 3DOF/DOF+ rotation and binauralization operation 1024, the processor 3206, the processor 3210, or a combination thereof.

The twelfth apparatus includes means for means for outputting the adjusted decoded ambisonics audio data to two or more loudspeakers for playback, such as the one or more processors 220, the renderer 222, one or more processors executing the ambisonics sound field 3DOF/DOF+ rotation and binauralization operation 1024, the processor 3206, the processor 3210, the codec 3234, or a combination thereof.

In some implementations, a non-transitory computer-readable medium (e.g., a computer-readable storage device, such as the memory 110, the memory 210, the memory 762, the memory 830, the memory 930, or the memory 3286) includes instructions (e.g., the instructions 112, the instructions 212, or the instructions 3256) that, when executed by one or more processors (e.g., the one or more processors 120, the one or more processors 220, the one or more processors 832, the processor 3206, or the one or more processors 3210), cause the one or more processors to perform operations corresponding to at least a portion of any of the techniques described with reference to FIGS. 1-19 or FIG. 32, any of the methods of FIGS. 20-31, or any combination thereof.

This disclosure includes the following examples.

Example 1. A device comprising one or more processors configured to receive, via wireless transmission, compressed audio data representing a sound field; decompress the compressed audio data; adjust the decompressed audio data to alter the sound field based on data associated with at least one of a translation or an orientation associated with movement of a device; render the adjusted decompressed audio data into two or more loudspeaker gains to drive two or more loudspeakers; and output the adjusted decompressed audio data to the two or more loudspeakers for playback.

Example 2. The device of example 1, wherein the one or more processors are configured to perform binauralization of the adjusted decompressed audio data to generate the two or more loudspeaker gains.

Example 3. The device of example 1, wherein the decompressed audio data includes ambisonic data and corresponds to at least one of two-dimensional (2D) audio data or three-dimensional (3D) audio data.

Example 4. The device of example 1, wherein the one or more processors are further configured to receive the compressed audio data as streaming data from a streaming device, the streaming device corresponding to at least one of a portable electronic device or a server.

Example 5. The device of example 4, wherein the one or more processors are further configured to send translation data to the streaming device, the translation data associated with the movement of the device; responsive to sending the translation data, receive compressed updated audio data from the streaming device, the compressed updated audio data representing the sound field translated based on the translation data; decompress the compressed updated audio data to generate updated audio data; and adjust the updated audio data to rotate the sound field based on the orientation.

Example 6. The device of example 4, wherein the one or more processors are further configured to send translation data to the streaming device, the translation data associated with the movement of the device; and responsive to sending the translation data, receive compressed updated audio data from the streaming device, the compressed updated audio data representing the sound field translated based on the translation data, and wherein a first latency associated with sending translation data to the streaming device and receiving compressed updated audio data from the streaming device is larger than a second latency associated with adjusting the updated audio data to rotate the sound field based on the orientation.

Example 7. The device of example 4, wherein the one or more processors are further configured to send translation data to the streaming device, the translation data associated with the movement of the device; and responsive to sending the translation data, receive compressed updated audio data from the streaming device, the compressed updated audio data representing the sound field translated based on the translation data; decompress the compressed updated audio data to generate updated audio data; and adjust the updated audio data to translate the sound field based on a change of the translation of the device, wherein adjustment of the updated audio data based on the change of the translation is restricted to translation of the sound field forward, backward, left, or right.

Example 8. The device of example 1, wherein the sound field represented by the decompressed audio data is independent of the movement of the device, and wherein the one or more processors are configured to adjust the audio data to translate the sound field responsive to the data indicating a change of the translation.

Example 9. The device of example 1, wherein the one or more processors are configured to adjust the audio data to rotate the sound field responsive to the data indicating a change of the orientation.

Example 10. The device of example 1, wherein the one or more processors are configured to translate and rotate the sound field responsive to the movement of the device and without sending translation data associated with the movement of the device to a streaming device.

Example 11. The device of example 1, wherein the one or more processors are integrated in a headphone device.

Example 12. The device of example 11, wherein the headphone device further includes a memory configured to store instructions executable by the one or more processors; one or more sensors configured to generate the data; a first loudspeaker configured to be positioned proximate to a first ear of a user while the headphone device is worn by the user; a second loudspeaker configured to be positioned proximate to a second ear of the user while the headphone device is worn by the user; and a wireless receiver configured to receive the compressed audio data via the wireless transmission.

Example 13. The device of example 1, wherein the one or more processors are integrated into a vehicle, and wherein the data indicates a translation of the vehicle and an orientation of the vehicle.

Example 14. The device of example 1, wherein the one or more processors are integrated into a speaker array device and are further configured to perform a beam steering operation to steer binaural signals to a location associated with a user.

Example 15. The device of example 1, wherein the one or more processors are integrated in at least one of a mobile phone, a tablet computer device, a wearable electronic device, a camera device, a virtual reality headset, a mixed reality headset, or an augmented reality headset.

Example 16. A method comprising receiving, at one or more processors via wireless transmission, compressed audio data representing a sound field; decompressing the compressed audio data; adjusting the decompressed audio data to alter the sound field based on data associated with at least one of a translation or an orientation associated with movement of a device; rendering the adjusted decompressed audio data into two or more loudspeaker gains to drive two or more loudspeakers; and outputting the adjusted decompressed audio data to the two or more loudspeakers for playback.

Example 17. The method of example 16, further comprising performing binauralization of the adjusted decompressed audio data to generate the two or more loudspeaker gains.

Example 18. The method of example 16, wherein the decompressed audio data includes ambisonic data.

Example 19. The method of example 16, wherein the compressed audio data is received as streaming data from a streaming device, the streaming device corresponding to at least one of a portable electronic device or a server.

Example 20. The method of example 19, further comprising sending translation data to the streaming device, the translation data associated with the movement of the device; responsive to sending the translation data, receiving compressed updated audio data from the streaming device, the compressed updated audio data representing the sound field translated based on the translation data; decompressing the compressed updated audio data to generate updated audio data; and adjusting the updated audio data to rotate the sound field based on the orientation.

Example 21. The method of example 20, wherein a first latency associated with sending the translation data to the streaming device and receiving the compressed updated audio data from the streaming device is larger than a second latency associated with adjusting the updated audio data to rotate the sound field based on the orientation.

Example 22. The method of example 20, further comprising adjusting the updated audio data to translate the sound field based on a change of the translation of the device, wherein adjusting the updated audio data based on the change of the translation is restricted to translating the sound field forward, backward, left, or right.

Example 23. The method of example 16, wherein the sound field represented by the decompressed audio data is independent of the movement of the device, and wherein altering the sound field includes translating the sound field responsive to the data indicating a change of the translation; and rotating the sound field responsive to the data indicating a change of the orientation.

Example 24. A non-transitory computer-readable medium comprising instructions that, when executed by one or more processors, cause the one or more processors to receive, via wireless transmission, compressed audio data representing a sound field; decompress the compressed audio data; adjust the decompressed audio data to alter the sound field based on data associated with at least one of a translation or an orientation associated with movement of a device; render the adjusted decompressed audio data into two or more loudspeaker gains to drive two or more loudspeakers; and output the adjusted decompressed audio data to the two or more loudspeakers for playback.

Example 25. The non-transitory computer-readable medium of example 24, wherein the instructions, when executed by the one or more processors, further cause the one or more processors to perform binauralization of adjusted decompressed audio data to generate the two or more loudspeaker gains.

Example 26. The non-transitory computer-readable medium of example 24, wherein the instructions, when executed by the one or more processors, further cause the one or more processors to receive the compressed audio data as streaming data from at least one of a portable electronic device or a server.

Example 27. An apparatus comprising means for receiving, at one or more processors via wireless transmission, compressed audio data representing a sound field; means for decompressing the compressed audio data; means for adjusting the decompressed audio data to alter the sound field based on data associated with at least one of a translation or an orientation associated with movement of a device; means for rendering the adjusted decompressed audio data into two or more loudspeaker gains to drive two or more loudspeakers; and means for outputting the adjusted decompressed audio data to the two or more loudspeakers for playback.

Example 28. A device comprising one or more processors configured to receive sound information from an audio source; receive translation data from a playback device, the translation data corresponding to a translation associated with the playback device; convert the sound information to audio data that represents a sound field based on the translation; and send the audio data as streaming data, via wireless transmission, to the playback device.

Example 29. The device of example 28, wherein the audio data includes ambisonic data and corresponds to at least one of two-dimensional (2D) audio data that represents a 2D sound field or three-dimensional (3D) audio data that represents a 3D sound field.

Example 30. The device of example 28, wherein the streaming data is sent via a fifth generation (5G) cellular digital network.

Example 31. The device of example 28, wherein the audio source corresponds to a portion of a media file, and wherein the streaming data is associated with a virtual reality experience that is streamed to the playback device via at least one of a fifth generation (5G) cellular digital network or a Bluetooth network.

Example 32. The device of example 28, wherein the one or more processors are integrated in a portable electronic device.

Example 33. The device of example 28, wherein the one or more processors are integrated in a server.

Example 34. A method comprising receiving sound information from an audio source; receiving translation data from a playback device, the translation data corresponding to a translation associated with the playback device; converting the sound information to audio data that represents a sound field based on the translation; and sending the audio data as streaming data, via wireless transmission, to the playback device.

Example 35. A non-transitory computer-readable medium comprising instructions that, when executed by one or more processors, cause the one or more processors to receive sound information from an audio source; receive translation data from a playback device, the translation data corresponding to a translation associated with the playback device; convert the sound information to audio data that represents a sound field based on the translation; and send the audio data as streaming data, via wireless transmission, to the playback device.

Example 36. An apparatus comprising means for receiving sound information from an audio source; means for receiving translation data from a playback device, the translation data corresponding to a translation associated with the playback device; means for converting the sound information to audio data that represents a sound field based on the translation; and means for sending the audio data as streaming data, via wireless transmission, to the playback device.

Example 37. A device comprising one or more processors configured to obtain data, at a plurality of time instances, associated with tracking location and an orientation associated with movement of the device; send, via wireless transmission to a remote device, the data; receive, via wireless transmission from the remote device, compressed audio data representing a sound field; decompress the compressed audio data representing the sound field; adjust the decompressed audio data to alter the sound field based on the orientation associated with the device; and output the adjusted decompressed audio data to two or more loudspeakers.

Example 38. The device of example 37, further comprising a memory configured to store the decompressed audio data, and wherein the one or more processors are configured to adjust the decompressed audio data based on applying the data associated with tracking the location and the orientation associated with the movement of the device.

Example 39. The device of example 37, wherein the decompressed audio data includes ambisonic data that corresponds to at least one of two-dimensional (2D) data that represents a 2D sound field or three-dimensional (3D) data that represents a 3D sound field.

Example 40. The device of example 37, wherein the one or more processors are configured to further adjust the decompressed audio data to translate the sound field based on a difference between a location of the device and a location associated with the sound field, wherein adjustment of the decompressed audio data based on the difference is restricted to translation of the sound field forward, backward, left, or right.

Example 41. The device of example 37, wherein the one or more processors are further configured to receive head-locked audio data via wireless transmission; and combine the head-locked audio data with the adjusted decompressed audio data for output to the two or more loudspeakers.

Example 42. The device of example 41, wherein the adjusted decompressed audio data corresponds to pose-adjusted binaural audio, and wherein the head-locked audio data corresponds to pose-independent binaural audio.

Example 43. The device of example 37, further comprising a buffer accessible to the one or more processors, and wherein the one or more processors are further configured to receive sound effect data ahead of time via wireless transmission; and pre-buffer the sound effect data in the buffer.

Example 44. The device of example 43, wherein the one or more processors are further configured to, responsive to receiving an indication of user interaction with a virtual object associated with the sound effect data retrieve, from the buffer, a portion of the pre-buffered sound effect data corresponding to the virtual object; and combine the portion of the pre-buffered sound effect data with the adjusted decompressed audio data for output to the two or more loudspeakers.

Example 45. The device of example 37, wherein the audio data includes ambisonic data, and wherein the one or more processors are further configured to send an indication of an ambisonic order to the remote device; and responsive to sending the indication, receive updated audio data having the ambisonic order via wireless transmission.

Example 46. The device of example 37, wherein the one or more processors are integrated in a headphone device.

Example 47. The device of example 46, wherein the headphone device further includes a memory configured to store instructions executable by the one or more processors; one or more sensors configured to generate the data associated with tracking the location and the orientation; a first loudspeaker configured to be positioned proximate to a first ear of a user while the headphone device is worn by the user; a second loudspeaker configured to be positioned proximate to a second ear of the user while the headphone device is worn by the user; and a receiver configured to receive the compressed audio data via the wireless transmission.

Example 48. The device of example 37, wherein the one or more processors are integrated into a vehicle, and wherein the data associated with tracking the location and the orientation indicates a location of the vehicle and an orientation of the vehicle.

Example 49. The device of example 37, wherein the one or more processors are integrated into a speaker array device and are further configured to perform a beam steering operation to steer binaural signals to a location associated with a user.

Example 50. The device of example 37, wherein the one or more processors are integrated in at least one of a mobile phone, a tablet computer device, a wearable electronic device, a camera device, a virtual reality headset, a mixed reality headset, or an augmented reality headset.

Example 51. A method comprising obtaining data, at a plurality of time instances, associated with tracking location and an orientation associated with movement of a device; sending, via wireless transmission to a remote device, the data; receiving, via wireless transmission from the remote device, compressed audio data representing a sound field; decompressing the compressed audio data representing the sound field; adjusting the decompressed audio data to alter the sound field based on the orientation associated with the device; and outputting the adjusted decompressed audio data to two or more loudspeakers.

Example 52. The method of example 51, wherein adjusting the decompressed audio data is based on applying the data associated with tracking the location and the orientation associated with the movement of the device.

Example 53. The method of example 51, wherein the compressed audio data includes ambisonic data.

Example 54. The method of example 51, further comprising adjusting the decompressed audio data to translate the sound field based on a difference between a location of the device and a location associated with the sound field, wherein the adjusting of the decompressed audio data based on the difference is restricted to translation of the sound field forward, backward, left, or right.

Example 55. The method of example 51, further comprising receiving, via wireless transmission from the remote device, head-locked audio data; and combining the head-locked audio data with the adjusted decompressed audio data for output to the two or more loudspeakers.

Example 56. The method of example 55, wherein the adjusted decompressed audio data corresponds to pose-adjusted binaural audio, and wherein the head-locked audio data corresponds to pose-independent binaural audio.

Example 57. The method of example 51, further comprising receiving sound effect data ahead of time via wireless transmission; and pre-buffering the sound effect data.

Example 58. The method of example 57, further comprising, responsive to an indication of user interaction with a virtual object associated with the sound effect data retrieving a portion of the pre-buffered sound effect data corresponding to the virtual object; and combining the portion of the pre-buffered sound effect data with the adjusted decompressed audio data for output to the two or more loudspeakers.

Example 59. The method of example 51, wherein the audio data includes ambisonic data, and further comprising sending an indication of an ambisonic order to the remote device; and responsive to sending the indication, receiving updated audio data having the ambisonic order.

Example 60. A non-transitory computer-readable medium comprising instructions that, when executed by one or more processors, cause the one or more processors to obtain data, at a plurality of time instances, associated with tracking location and an orientation associated with movement of a device; send, via wireless transmission to a remote device, the data; receive, via wireless transmission from the remote device, compressed audio data representing a sound field; decompress the compressed audio data representing the sound field; adjust the decompressed audio data to alter the sound field based on the orientation associated with the device; and output the adjusted decompressed audio data to two or more loudspeakers.

Example 61. An apparatus comprising means for obtaining data, at a plurality of time instances, associated with tracking location and an orientation associated with movement of the apparatus; means for sending, via wireless transmission to a remote device, the data; means for receiving, via wireless transmission from the remote device, compressed audio data representing a sound field; means for decompressing the compressed audio data representing the sound field; means for adjusting the decompressed audio data to alter the sound field based on the orientation associated with the apparatus; and means for outputting the adjusted decompressed audio data to two or more loudspeakers.

Example 62. A device comprising one or more processors configured to receive sound information from an audio source; receive, from a playback device, data corresponding to locations associated with the playback device at a plurality of time instances; convert the sound information to audio data that represents a sound field based on the data corresponding to the locations associated with the playback device; and send the audio data as streaming data, via wireless transmission, to one or both of the playback device or a second device that is coupled to the playback device.

Example 63. The device of example 62, wherein the one or more processors are further configured to generate a predicted location of the playback device based on the data corresponding to the locations associated with the playback device, the predicted location indicating a prediction of where the playback device will be when the audio data is played out at the playback device; and convert the sound information to the audio data that represents the sound field based on the predicted location.

Example 64. The device of example 62, wherein the one or more processors are further configured to send, to one or both of the playback device or the second device, sound effects data from the audio source to be buffered and accessible to the playback device for future playout, wherein at least a portion of the sound effects data is sent independently of any scheduled playout of the portion of the sound effects data.

Example 65. The device of example 62, wherein the one or more processors are further configured to receive, from the audio source, a head-locked audio portion; generate, based on the head-locked audio portion, head-locked audio data corresponding to pose-independent binaural audio; and send the head-locked audio data, via wireless transmission, to one or both of the playback device or the second device to be played out at the playback device.

Example 66. The device of example 62, wherein the audio data corresponds to ambisonics data, and wherein the one or more processors are further configured to receive an indication of an ambisonics order from the playback device; and adjust the audio data to have the ambisonic order.

Example 67. The device of example 62, wherein the one or more processors are further configured to, after receiving the data corresponding to the locations associated with the playback device receive additional data corresponding to locations associated with the playback device; generate updated audio data based on the additional data; and send the updated audio data to the playback device.

Example 68. A method comprising receiving sound information from an audio source; receiving, from a playback device, data corresponding to locations associated with the playback device at a plurality of time instances; converting the sound information to audio data that represents a sound field based on the data corresponding to the locations associated with the playback device; and sending the audio data as streaming data, via wireless transmission, to one or both of the playback device or a second device that is coupled to the playback device.

Example 69. A non-transitory computer-readable medium comprising instructions that, when executed by one or more processors, cause the one or more processors to receive sound information from an audio source; receive, from a playback device, data corresponding to locations associated with the playback device at a plurality of time instances; convert the sound information to audio data that represents a sound field based on the data corresponding to the locations associated with the playback device; and send the audio data as streaming data, via wireless transmission, to one or both of the playback device or a second device that is coupled to the playback device.

Example 70. An apparatus comprising means for receiving sound information from an audio source; means for receiving, from a playback device, data corresponding to locations associated with the playback device at a plurality of time instances; means for converting the sound information to audio data that represents a sound field based on the data corresponding to the locations associated with the playback device; and means for sending the audio data as streaming data, via wireless transmission, to one or both of the playback device or a second device that is coupled to the playback device.

Example 71. A device comprising one or more processors configured to receive, from a streaming device, compressed audio data that represents a sound field; receive, from a playback device, data corresponding to locations associated with the playback device at a plurality of time instances; generate a predicted location of the device based on the data corresponding to the locations associated with the playback device, the predicted location indicating a prediction of where the playback device will be when the audio data is played out at the playback device; decompress the compressed audio data; adjust the decompressed audio data to translate the sound field based on the predicted location; compress the adjusted audio data; and send the compressed adjusted audio data as streaming data, via wireless transmission, to the playback device.

Example 72. A method comprising receiving, from a streaming device, compressed audio data that represents a sound field; receiving, from a playback device, data corresponding to locations associated with the playback device at a plurality of time instances; generating a predicted location of the device based on the data corresponding to the locations associated with the playback device, the predicted location indicating a prediction of where the playback device will be when the audio data is played out at the playback device; decompressing the compressed audio data; adjusting the decompressed audio data to translate the sound field based on the predicted location; compressing the adjusted audio data; and sending the compressed adjusted audio data as streaming data, via wireless transmission, to the playback device.

Example 73. A non-transitory computer-readable medium comprising instructions that, when executed by one or more processors, cause the one or more processors to receive, from a streaming device, compressed audio data that represents a sound field; receive, from a playback device, data corresponding to locations associated with the playback device at a plurality of time instances; generate a predicted location of the playback device based on the data corresponding to the locations associated with the playback device, the predicted location indicating a prediction of where the playback device will be when the audio data is played out at the playback device; decompress the compressed audio data; adjust the decompressed audio data to translate the sound field based on the predicted location; compress the adjusted audio data; and send the compressed adjusted audio data as streaming data, via wireless transmission, to the playback device.

Example 74. An apparatus comprising means for receiving, from a streaming device, compressed audio data that represents a sound field; means for receiving, from a playback device, data corresponding to locations associated with the playback device at a plurality of time instances; means for generating a predicted location of the device based on the data corresponding to the locations associated with the playback device, the predicted location indicating a prediction of where the playback device will be when the audio data is played out at the playback device; means for decompressing the compressed audio data; means for adjusting the decompressed audio data to translate the sound field based on the predicted location; means for compressing the adjusted audio data; and means for sending the compressed adjusted audio data as streaming data, via wireless transmission, to the playback device.

Example 75. A device comprising one or more processors configured to receive, via wireless transmission from a streaming device, compressed audio data corresponding to a first representation of a sound field, the first representation corresponding to a first viewport field of view associated with a first pose of the device; decompress the compressed audio data; output the decompressed audio data to two or more loudspeakers; send, to the streaming device, data associated with a second pose of the device; receive compressed updated audio data from the streaming device, the compressed updated audio data corresponding to a second representation of the sound field, and the second representation corresponding to a second viewport field of view that partially overlaps the first viewport field of view and that is associated with the second pose; decompress the compressed updated audio data; and output the decompressed updated audio data to the two or more loudspeakers.

Example 76. The device of example 75, wherein the decompressed audio data includes ambisonic data.

Example 77. The device of example 75, wherein the first representation of the sound field provides higher resolution for audio sources in the first viewport field of view than for audio sources outside the first viewport field of view, and wherein the second representation of the sound field provides higher resolution for audio sources in the second viewport field of view than for audio sources outside the second viewport field of view.

Example 78. The device of example 75, wherein the compressed updated audio data corresponds to a rotation of the sound field based on rotation of the device between the first pose and the second pose; and a translation of the sound field.

Example 79. The device of example 78, wherein the translation of the sound field corresponds to a translation of the device between the first pose and the second pose.

Example 80. The device of example 78, wherein the translation of the sound field exceeds a translation of the device between the first pose and the second pose.

Example 81. The device of example 75, wherein the one or more processors are further configured to adjust the decompressed audio data to alter the first representation of the sound field based on data associated with at least one of a translation or an orientation associated with movement of the device to the second pose; and output the adjusted decompressed audio data to the two or more loudspeakers.

Example 82. The device of example 75, wherein the one or more processors are integrated in a headphone device.

Example 83. The device of example 82, wherein the headphone device further includes a memory configured to store instructions executable by the one or more processors; one or more sensors configured to generate data corresponding to a pose of the device; a first loudspeaker configured to be positioned proximate to a first ear of a user while the headphone device is worn by the user; a second loudspeaker configured to be positioned proximate to a second ear of the user while the headphone device is worn by the user; and a wireless receiver configured to receive the compressed audio data via the wireless transmission.

Example 84. A method comprising receiving, at one or more processors of a device and via wireless transmission from a streaming device, compressed audio data corresponding to a first representation of a sound field, the first representation corresponding to a first viewport field of view associated with a first pose of the device; decompressing the compressed audio data; outputting the decompressed audio data to two or more loudspeakers; sending, to the streaming device, data associated with a second pose of the device; receiving compressed updated audio data from the streaming device, the compressed updated audio data corresponding to a second representation of the sound field, and the second representation corresponding to a second viewport field of view that partially overlaps the first viewport field of view and that is associated with the second pose; decompressing the compressed updated audio data; and outputting the decompressed updated audio data to the two or more loudspeakers.

Example 85. A non-transitory computer-readable medium comprising instructions that, when executed by one or more processors, cause the one or more processors to receive, via wireless transmission from a streaming device, compressed audio data corresponding to a first representation of a sound field, the first representation corresponding to a first viewport field of view associated with a first pose of a device; decompress the compressed audio data; output the decompressed audio data to two or more loudspeakers; send, to the streaming device, data associated with a second pose of the device; receive compressed updated audio data from the streaming device, the compressed updated audio data corresponding to a second representation of the sound field, and the second representation corresponding to a second viewport field of view that partially overlaps the first viewport field of view and that is associated with the second pose; decompress the compressed updated audio data; and output the decompressed updated audio data to the two or more loudspeakers.

Example 86. An apparatus comprising means for receiving, via wireless transmission from a streaming device, compressed audio data corresponding to a first representation of a sound field, the first representation corresponding to a first viewport field of view associated with a first pose of a device; means for decompressing the compressed audio data; means for outputting the decompressed audio data to two or more loudspeakers; means for sending, to the streaming device, data associated with a second pose of the device; means for receiving compressed updated audio data from the streaming device, the compressed updated audio data corresponding to a second representation of the sound field, and the second representation corresponding to a second viewport field of view that partially overlaps the first viewport field of view and that is associated with the second pose; means for decompressing the compressed updated audio data; and means for outputting the decompressed updated audio data to the two or more loudspeakers.

Example 87. A device comprising one or more processors configured to receive, via wireless transmission from a playback device, data associated with a pose of the playback device; select, based on the data, a particular representation of a sound field from a plurality of representations of the sound field, each respective representation of the sound field corresponding to a different viewport field of view of a set of multiple overlapping viewport fields of view; generate compressed audio data corresponding to the selected representation of the sound field; and send, via wireless transmission, the compressed audio data as streaming data to the playback device.

Example 88. The device of example 87, wherein the selected representation corresponds to a first representation of the sound field corresponding to a first viewport field of view, and wherein the one or more processors are further configured to receive, from the playback device, second data associated with a second pose of the playback device; select, based on the second data, a second representation of the sound field from the plurality of representations of the sound field, the second representation corresponding to a second viewport field of view of the set, wherein the second viewport field of view partially overlaps the first viewport field of view; generate second compressed audio data corresponding to the second representation of the sound field; and send, via wireless transmission, the second compressed audio data to the playback device.

Example 89. The device of example 87, wherein the selected representation corresponds to a first representation of the sound field corresponding to a first viewport field of view, and wherein the one or more processors are further configured to receive, from the playback device, second data associated with a second pose of the playback device; select, based on the second data, a second representation of the sound field from the plurality of representations of the sound field, the second representation corresponding to a translation of the sound field; generate second compressed audio data corresponding to the second representation of the sound field; and send, via wireless transmission, the second compressed audio data to the playback device.

Example 90. The device of example 89, wherein the translation of the sound field corresponds to a translation of the playback device between the first pose and the second pose.

Example 91. The device of example 89, wherein the translation of the sound field exceeds a translation of the playback device between the first pose and the second pose.

Example 92. The device of example 87, further comprising a memory coupled to the one or more processors and configured to store the plurality of representations of the sound field.

Example 93. The device of example 87, wherein the one or more processors are integrated in a portable electronic device.

Example 94. The device of example 87, wherein the one or more processors are integrated in a server.

Example 95. A method comprising receiving, at one or more processors of a streaming device and via wireless transmission from a playback device, data associated with a pose of the playback device; selecting, based on the data, a particular representation of a sound field from a plurality of representations of the sound field, each respective representation of the sound field corresponding to a different viewport field of view of a set of multiple overlapping viewport fields of view; generating compressed audio data corresponding to the selected representation of the sound field; and sending, via wireless transmission, the compressed audio data as streaming data to the playback device.

Example 96. A non-transitory computer-readable medium comprising instructions that, when executed by one or more processors, cause the one or more processors to receive, via wireless transmission from a playback device, data associated with a pose of the playback device; select, based on the data, a particular representation of a sound field from a plurality of representations of the sound field, each respective representation of the sound field corresponding to a different viewport field of view of a set of multiple overlapping viewport fields of view; generate compressed audio data corresponding to the selected representation of the sound field; and send, via wireless transmission, the compressed audio data as streaming data to the playback device.

Example 97. An apparatus comprising means for receiving, via wireless transmission from a playback device, data associated with a pose of the playback device; means for selecting, based on the data, a particular representation of a sound field from a plurality of representations of the sound field, each respective representation of the sound field corresponding to a different viewport field of view of a set of multiple overlapping viewport fields of view; means for generating compressed audio data corresponding to the selected representation of the sound field; and means for sending, via wireless transmission, the compressed audio data as streaming data to the playback device.

Example 98. A device comprising one or more processors configured to receive, via wireless transmission from a streaming device, encoded ambisonics audio data representing a sound field; perform decoding of the ambisonics audio data to generate decoded ambisonics audio data, the decoding of the ambisonics audio data including base layer decoding of a base layer of the encoded ambisonics audio data and selectively including enhancement layer decoding in response to detecting that the encoded ambisonics audio data includes at least one encoded enhancement layer; adjust the decoded ambisonics audio data to alter the sound field based on data associated with at least one of a translation or an orientation associated with movement of the device; and output the adjusted decoded ambisonics audio data to two or more loudspeakers for playback.

Example 99. The device of example 98, wherein the one or more processors are further configured to obtain data, at a plurality of time instances, associated with tracking location and an orientation associated with the movement of the device; and send the data to the streaming device via wireless transmission, wherein a transition, in the ambisonics audio data, from a frame encoded according to the base layer to a subsequent frame encoded according to the enhancement layer corresponds to the movement of the device.

Example 100. The device of example 99, wherein the transition from encoding according to the base layer to encoding according to the enhancement layer encoding corresponds to a transition from a first orientation of the device associated with a first number of sound sources to a second orientation of the device associated with a second number of sound sources, the second number larger than the first number.

Example 101. The device of example 98, wherein the one or more processors are further configured to perform the base layer decoding using a base layer decoder; and perform the enhancement layer decoding using at least a first enhancement layer decoder corresponding to a first enhancement layer of the encoded ambisonics audio data.

Example 102. The device of example 101, wherein the encoded ambisonics audio data includes first order ambisonics data in the base layer; and higher order ambisonics data in the first enhancement layer, and wherein the first enhancement layer decoder is configured to decode the higher order ambisonics data.

Example 103. The device of example 99, wherein the encoded ambisonics audio data includes first order ambisonics data in the base layer; higher order ambisonics data of one or more higher orders in the first enhancement layer; and additional higher order ambisonics data of one or more additional higher orders in a second enhancement layer, and wherein the one or more processors are further configured to perform the enhancement layer decoding using a second enhancement layer decoder that is configured to decode the additional higher order ambisonics data.

Example 104. The device of example 98, wherein the encoded ambisonics audio data includes mixed order ambisonics data including a partial set of coefficients of an ambisonics order in the base layer; and additional ambisonics data in the enhancement layer, the additional ambisonics data including one or more coefficients of the ambisonics order that are omitted from the base layer.

Example 105. The device of example 98, wherein the one or more processors are integrated in a headphone device.

Example 106. The device of example 103, wherein the headphone device further includes a memory configured to store instructions executable by the one or more processors; one or more sensors configured to generate data corresponding to a pose of the device; a first loudspeaker configured to be positioned proximate to a first ear of a user while the headphone device is worn by the user; a second loudspeaker configured to be positioned proximate to a second ear of the user while the headphone device is worn by the user; and a wireless receiver configured to receive the encoded ambisonics audio data via the wireless transmission.

Example 107. A method comprising receiving, at one or more processors of a device and via wireless transmission from a streaming device, encoded ambisonics audio data representing a sound field; performing decoding of the encoded ambisonics audio data to generate decoded ambisonics audio data, the decoding of the encoded ambisonics audio data including performing base layer decoding of a base layer of the encoded ambisonics audio data and selectively performing enhancement layer decoding based on detecting that the encoded ambisonics audio data includes at least one encoded enhancement layer; adjusting the decoded ambisonics audio data to alter the sound field based on data associated with at least one of a translation or an orientation associated with movement of the device; and outputting the adjusted decoded ambisonics audio data to two or more loudspeakers for playback.

Example 108. A non-transitory computer-readable medium comprising instructions that, when executed by one or more processors, cause the one or more processors to receive, via wireless transmission from a streaming device, encoded ambisonics audio data representing a sound field; perform decoding of the encoded ambisonics audio data to generate decoded ambisonics audio data, the decoding of the encoded ambisonics audio data including base layer decoding of a base layer of the encoded ambisonics audio data and selectively including enhancement layer decoding based on detecting that the encoded ambisonics audio data includes at least one encoded enhancement layer; adjust the decoded ambisonics audio data to alter the sound field based on data associated with at least one of a translation or an orientation associated with movement of a device; and output the adjusted decoded ambisonics audio data to two or more loudspeakers for playback.

Example 109. An apparatus comprising means for receiving, via wireless transmission from a streaming device, encoded ambisonics audio data representing a sound field; means for performing base layer decoding of a base layer of the encoded ambisonics audio data; means for selectively performing enhancement layer decoding based on detecting that the encoded ambisonics audio data includes at least one encoded enhancement layer; means for adjusting decoded ambisonics audio data to alter the sound field based on data associated with at least one of a translation or an orientation associated with movement of a device; and means for outputting the adjusted decoded ambisonics audio data to two or more loudspeakers for playback.

Example 110. A device comprising one or more processors configured to receive, via wireless transmission from a playback device, first data associated with a first pose of the playback device, the first pose associated with a first number of sound sources in a sound scene; generate a first frame of encoded ambisonics audio data that corresponds to a base layer encoding of the sound scene; send the first frame to the playback device; receive, via wireless transmission from the playback device, second data associated with a second pose of the playback device, the second pose associated with a second number of sound sources in the sound scene, and the second number greater than the first number; generate a second frame of encoded ambisonics audio data that corresponds to an enhancement layer encoding of the sound scene; and send the second frame to the playback device.

Example 111. A method comprising receiving, via wireless transmission from a playback device, first data associated with a first pose of the playback device, the first pose associated with a first number of sound sources in a sound scene; generating a first frame of encoded ambisonics audio data that corresponds to a base layer encoding of the sound scene; sending the first frame to the playback device; receiving, via wireless transmission from the playback device, second data associated with a second pose of the playback device, the second pose associated with a second number of sound sources in the sound scene, and the second number greater than the first number; generating a second frame of encoded ambisonics audio data that corresponds to an enhancement layer encoding of the sound scene; and sending the second frame to the playback device.

Example 112. A non-transitory computer-readable medium comprising instructions that, when executed by one or more processors, cause the one or more processors to receive, via wireless transmission from a playback device, first data associated with a first pose of the playback device, the first pose associated with a first number of sound sources in a sound scene; generate a first frame of encoded ambisonics audio data that corresponds to a base layer encoding of the sound scene; send the first frame to the playback device; receive, via wireless transmission from the playback device, second data associated with a second pose of the playback device, the second pose associated with a second number of sound sources in the sound scene, and the second number greater than the first number; generate a second frame of encoded ambisonics audio data that corresponds to an enhancement layer encoding of the sound scene; and send the second frame to the playback device.

Example 113. An apparatus comprising means for receiving, via wireless transmission from a playback device, first data associated with a first pose of the playback device, the first pose associated with a first number of sound sources in a sound scene; means for generating a first frame of encoded ambisonics audio data that corresponds to a base layer encoding of the sound scene; means for sending the first frame to the playback device; means for receiving, via wireless transmission from the playback device, second data associated with a second pose of the playback device, the second pose associated with a second number of sound sources in the sound scene, and the second number greater than the first number; means for generating a second frame of encoded ambisonics audio data that corresponds to an enhancement layer encoding of the sound scene; and means for sending the second frame to the playback device.

Particular aspects of the disclosure are described below in the following sets of interrelated clauses:

According to Clause 1, a device includes one or more processors configured to: obtain sound information from an audio source; select, based on a latency criterion associated with a playback device, a compression mode in which a representation of the sound information is compressed prior to transmission to the playback device, or a bypass mode in which the representation of the sound information is not compressed prior to transmission to the playback device; generate audio data that includes, based on the selected one of the compression mode or the bypass mode, a compressed representation of the sound information or an uncompressed representation of the sound information; and send the audio data as streaming data, via wireless transmission, to the playback device.

Clause 2 includes the device of Clause 1, wherein the representation of the sound information includes ambisonic data and corresponds to at least one of two-dimensional (2D) audio data that represents a 2D sound field or three-dimensional (3D) audio data that represents a 3D sound field.

Clause 3 includes the device of Clause 1 or Clause 2, wherein the latency criterion is based on whether a playback latency associated with streaming data exceeds a latency threshold, and wherein the one or more processors are further configured to: receive, from the playback device, an indication that the playback latency associated with the streaming data exceeds the latency threshold; and select the bypass mode based on receiving the indication.

Clause 4 includes the device of any of Clauses 1 to 3, wherein the latency criterion is based on a bandwidth of a wireless link from the device to the playback device.

Clause 5 includes the device of any of Clauses 1 to 4, wherein the one or more processors are configured to: determine whether a wireless link to the playback device corresponds to a higher-bandwidth wireless link or to a lower-bandwidth wireless link; and select the bypass mode based on the wireless link corresponding to the higher-bandwidth wireless link.

Clause 6 includes the device of Clause 5, wherein the higher-bandwidth wireless link corresponds to a fifth generation (5G) cellular digital network or a WiFi-type network.

Clause 7 includes the device of any of Clauses 1 to 6, wherein the one or more processors are configured to: determine whether a wireless link to the playback device corresponds to a higher-bandwidth wireless link or to a lower-bandwidth wireless link; and select the compression mode based on the wireless link corresponding to the lower-bandwidth wireless link.

Clause 8 includes the device of Clause 7, wherein the lower-bandwidth wireless link corresponds to a Bluetooth network.

Clause 9 includes the device of any of Clauses 1 to 8, wherein the one or more processors are further configured to: receive, from the playback device, a request for compressed audio data or for uncompressed audio data; and select the bypass mode or the compression mode based on the request.

Clause 10 includes the device of any of Clauses 1 to 9, wherein the one or more processors are further configured to, in the bypass mode, discard a high-resolution portion of the uncompressed representation based on a bandwidth of a wireless link from the device to the playback device.

Clause 11 includes the device of Clause 10, wherein the uncompressed representation includes ambisonic coefficients, and wherein the high-resolution portion of the uncompressed representation corresponds to a subset of the ambisonic coefficients.

Clause 12 includes the device of any of Clauses 1 to 11, wherein the one or more processors are further configured to: receive, from the playback device, data corresponding to a location and an orientation associated with movement of the playback device; update the sound information to alter a sound field based on the received data; and send, via wireless transmission, compressed audio data representing the sound field to the playback device, to enable the playback device to decompress the compressed audio data representing the sound field, to adjust the decompressed audio data to alter the sound field based on the orientation associated with the device, and to output the adjusted decompressed audio data to two or more loudspeakers.

Clause 13 includes the device of any of Clauses 1 to 12, wherein the one or more processors are further configured to: receive, from the playback device, data corresponding to a location and an orientation associated with movement of the playback device; update the sound information to alter a sound field based on the received data; and send, via wireless transmission, uncompressed audio data representing the sound field to the playback device, to enable the playback device to adjust the audio data to alter the sound field based on the orientation associated with the device and to output the adjusted audio data to two or more loudspeakers.

Clause 14 includes the device of any of Clauses 1 to 13, wherein the one or more processors are further configured to: receive translation data from the playback device, the translation data corresponding to a translation associated with the playback device; and convert the sound information to audio data that represents a sound field based on the translation.

Clause 15 includes the device of any of Clauses 1 to 14, wherein the one or more processors are integrated in a portable electronic device.

Clause 16 includes the device of any of Clauses 1 to 14, wherein the one or more processors are integrated in a server.

Clause 17 includes the device of any of Clauses 1 to 16, further including a modem configured to modulate the audio data for transmission to the playback device.

Clause 18 includes the device of Clause 17, further including an antenna coupled to the modem and configured to transmit the modulated audio data to the playback device.

According to Clause 19, a method includes: obtaining sound information from an audio source; selecting, based on a latency criterion associated with a playback device, a compression mode in which a representation of the sound information is compressed prior to transmission to the playback device, or a bypass mode in which the representation of the sound information is not compressed prior to transmission to the playback device; generating audio data that includes, based on the selected one of the compression mode or the bypass mode, a compressed representation of the sound information or an uncompressed representation of the sound information; and sending the audio data as streaming data, via wireless transmission, to the playback device.

Clause 20 includes the method of Clause 19, wherein the representation of the sound information includes ambisonic data and corresponds to at least one of two-dimensional (2D) audio data that represents a 2D sound field or three-dimensional (3D) audio data that represents a 3D sound field.

Clause 21 includes the method of Clause 19 or Clause 20, wherein the latency criterion is based on whether a playback latency associated with the streaming data exceeds a latency threshold, and further including: receiving, from the playback device, an indication that the playback latency associated with the streaming data exceeds the latency threshold; and selecting the bypass mode based on receiving the indication.

Clause 22 includes the method of any of Clauses 19 to 21, wherein the latency criterion is based on a bandwidth of a wireless link to the playback device.

Clause 23 includes the method of any of Clauses 19 to 22, further including: determining whether a wireless link to the playback device corresponds to a higher-bandwidth wireless link or to a lower-bandwidth wireless link; and selecting the bypass mode based on the wireless link corresponding to the higher-bandwidth wireless link.

Clause 24 includes the method of Clause 23, wherein the higher-bandwidth wireless link corresponds to a fifth generation (5G) cellular digital network or a WiFi-type network.

Clause 25 includes the method of any of Clauses 19 to 24, further including: determining whether a wireless link to the playback device corresponds to a higher-bandwidth wireless link or to a lower-bandwidth wireless link; and selecting the compression mode based on the wireless link corresponding to the lower-bandwidth wireless link.

Clause 26 includes the method of Clause 25, wherein the lower-bandwidth wireless link corresponds to a Bluetooth network.

Clause 27 includes the method of any of Clauses 19 to 26, further including: receiving, from the playback device, a request for compressed audio data or for uncompressed audio data; and selecting the bypass mode or the compression mode based on the request.

Clause 28 includes the method of any of Clauses 19 to 27, further including, in the bypass mode, discarding a high-resolution portion of the uncompressed representation based on a bandwidth of a wireless link to the playback device.

Clause 29 includes the method of Clause 28, wherein the uncompressed representation includes ambisonic coefficients, and wherein the high-resolution portion of the uncompressed representation corresponds to a subset of the ambisonic coefficients.

Clause 30 includes the method of any of Clauses 19 to 29, further including: receiving, from the playback device, data corresponding to a location and an orientation associated with movement of the playback device; updating the sound information to alter a sound field based on the received data; and sending, via wireless transmission, compressed audio data representing the sound field to the playback device, to enable the playback device to decompress the compressed audio data representing the sound field, adjust the decompressed audio data to alter the sound field based on the orientation associated with the device, and to output the adjusted decompressed audio data to two or more loudspeakers.

Clause 31 includes the method of any of Clauses 19 to 29, further including: receiving, from the playback device, data corresponding to a location and an orientation associated with movement of the playback device; updating the sound information to alter a sound field based on the received data; and sending, via wireless transmission, uncompressed audio data representing the sound field to the playback device, to enable the playback device to adjust the audio data to alter the sound field based on the orientation associated with the device and to output the adjusted audio data to two or more loudspeakers.

Clause 32 includes the method of any of Clauses 19 to 31, further including: receiving translation data from the playback device, the translation data corresponding to a translation associated with the playback device; and converting the sound information to audio data that represents a sound field based on the translation.

According to Clause 33, an apparatus includes: means for obtaining sound information from an audio source; means for selecting, based on a latency criterion associated with a playback device, a compression mode in which a representation of the sound information is compressed prior to transmission to the playback device, or a bypass mode in which the representation of the sound information is not compressed prior to transmission to the playback device; means for generating audio data that includes, based on the selected one of the compression mode or the bypass mode, a compressed representation of the sound information or an uncompressed representation of the sound information; and means for sending the audio data as streaming data, via wireless transmission, to the playback device.

Clause 34 includes the apparatus of Clause 33, wherein the representation of the sound information includes ambisonic data and corresponds to at least one of two-dimensional (2D) audio data that represents a 2D sound field or three-dimensional (3D) audio data that represents a 3D sound field.

Clause 35 includes the apparatus of Clause 33 or Clause 34, wherein the latency criterion is based on whether a playback latency associated with the streaming data exceeds a latency threshold, and further including means for receiving, from the playback device, an indication that the playback latency associated with the streaming data exceeds the latency threshold, wherein the means for selecting is configured to select the bypass mode based on receiving the indication.

Clause 36 includes the apparatus of any of Clauses 33 to 35, wherein the latency criterion is based on a bandwidth of a wireless link to the playback device.

Clause 37 includes the apparatus of any of Clauses 33 to 36, further including means for determining whether a wireless link to the playback device corresponds to a higher-bandwidth wireless link or to a lower-bandwidth wireless link, wherein the means for selecting is configured to select the bypass mode based on the wireless link corresponding to the higher-bandwidth wireless link.

Clause 38 includes the apparatus of Clause 37, wherein the higher-bandwidth wireless link corresponds to a fifth generation (5G) cellular digital network or a WiFi-type network.

Clause 39 includes the apparatus of any of Clauses 33 to 38, further including means for determining whether a wireless link to the playback device corresponds to a higher-bandwidth wireless link or to a lower-bandwidth wireless link, wherein the means for selecting is configured to select the compression mode based on the wireless link corresponding to the lower-bandwidth wireless link.

Clause 40 includes the apparatus of Clause 39, wherein the lower-bandwidth wireless link corresponds to a Bluetooth network.

Clause 41 includes the apparatus of any of Clauses 33 to 40, further including means for receiving, from the playback device, a request for compressed audio data or for uncompressed audio data, wherein the means for selecting is configured to select the bypass mode or the compression mode based on the request.

Clause 42 includes the apparatus of any of Clauses 33 to 41, further including means for discarding, in the bypass mode, a high-resolution portion of the uncompressed representation based on a bandwidth of a wireless link to the playback device.

Clause 43 includes the apparatus of Clause 42, wherein the uncompressed representation includes ambisonic coefficients, and wherein the high-resolution portion of the uncompressed representation corresponds to a subset of the ambisonic coefficients.

Clause 44 includes the apparatus of any of Clauses 33 to 43, further including: means for receiving translation data from the playback device, the translation data corresponding to a translation associated with the playback device; and means for converting the sound information to audio data that represents a sound field based on the translation.

According to Clause 45, a non-transitory computer-readable medium includes instructions that, when executed by one or more processors, cause the one or more processors to: obtain sound information from an audio source; select, based on a latency criterion associated with a playback device, a compression mode in which a representation of the sound information is compressed prior to transmission to the playback device, or a bypass mode in which the representation of the sound information is not compressed prior to transmission to the playback device; generate audio data that includes, based on the selected one of the compression mode or the bypass mode, a compressed representation of the sound information or an uncompressed representation of the sound information; and send the audio data as streaming data, via wireless transmission, to the playback device.

Clause 46 includes the non-transitory computer-readable medium of Clause 45, wherein the representation of the sound information includes ambisonic data and corresponds to at least one of two-dimensional (2D) audio data that represents a 2D sound field or three-dimensional (3D) audio data that represents a 3D sound field.

Clause 47 includes the non-transitory computer-readable medium of Clause 45 or Clause 46, wherein the latency criterion is based on whether a playback latency associated with the streaming data exceeds a latency threshold, and wherein the instructions, when executed, further cause the one or more processors to: receive, from the playback device, an indication that the playback latency associated with the streaming data exceeds the latency threshold; and select the bypass mode based on receiving the indication.

Clause 48 includes the non-transitory computer-readable medium of any of Clauses 45 to 47, wherein the latency criterion is based on a bandwidth of a wireless link to the playback device.

Clause 49 includes the non-transitory computer-readable medium of any of Clauses 45 to 48, wherein the instructions, when executed, further cause the one or more processors to: determine whether a wireless link to the playback device corresponds to a higher-bandwidth wireless link or to a lower-bandwidth wireless link; and select the bypass mode based on the wireless link corresponding to the higher-bandwidth wireless link.

Clause 50 includes the non-transitory computer-readable medium of Clause 49, wherein the higher-bandwidth wireless link corresponds to a fifth generation (5G) cellular digital network or a WiFi-type network.

Clause 51 includes the non-transitory computer-readable medium of any of Clauses 45 to 50, wherein the instructions, when executed, further cause the one or more processors to: determine whether a wireless link to the playback device corresponds to a higher-bandwidth wireless link or to a lower-bandwidth wireless link; and select the compression mode based on the wireless link corresponding to the lower-bandwidth wireless link.

Clause 52 includes the non-transitory computer-readable medium of Clause 51, wherein the lower-bandwidth wireless link corresponds to a Bluetooth network.

Clause 53 includes the non-transitory computer-readable medium of any of Clauses 45 to 52, wherein the instructions, when executed, further cause the one or more processors to: receive, from the playback device, a request for compressed audio data or for uncompressed audio data; and select the bypass mode or the compression mode based on the request.

Clause 54 includes the non-transitory computer-readable medium of any of Clauses 45 to 53, wherein the instructions, when executed, further cause the one or more processors to, in the bypass mode, discard a high-resolution portion of the uncompressed representation based on a bandwidth of a wireless link to the playback device.

Clause 55 includes the non-transitory computer-readable medium of Clause 54, wherein the uncompressed representation includes ambisonic coefficients, and wherein the high-resolution portion of the uncompressed representation corresponds to a subset of the ambisonic coefficients.

Clause 56 includes the non-transitory computer-readable medium of any of Clauses 45 to 55, wherein the instructions, when executed, further cause the one or more processors to: receive, from the playback device, data corresponding to a location and an orientation associated with movement of the playback device; update the sound information to alter a sound field based on the received data; and send, via wireless transmission, compressed audio data representing the sound field to the playback device, to enable the playback device to decompress the compressed audio data representing the sound field, adjust the decompressed audio data to alter the sound field based on the orientation associated with the device, and to output the adjusted decompressed audio data to two or more loudspeakers.

Clause 57 includes the non-transitory computer-readable medium of any of Clauses 45 to 56, wherein the instructions, when executed, further cause the one or more processors to: receive, from the playback device, data corresponding to a location and an orientation associated with movement of the playback device; update the sound information to alter a sound field based on the received data; and send, via wireless transmission, uncompressed audio data representing the sound field to the playback device, to enable the playback device to adjust the audio data to alter the sound field based on the orientation associated with the device and to output the adjusted audio data to two or more loudspeakers.

Clause 58 includes the non-transitory computer-readable medium of any of Clauses 45 to 57, wherein the instructions, when executed, further cause the one or more processors to: receive translation data from the playback device, the translation data corresponding to a translation associated with the playback device; and convert the sound information to audio data that represents a sound field based on the translation.

According to clause 59, a device includes: one or more processors configured to: receive, via wireless transmission, audio data representing a sound field; selectively decompress the audio data based on a determination of whether the audio data includes compressed audio data or uncompressed audio data; adjust the audio data to alter the sound field based on data associated with at least one of a translation or an orientation associated with movement of the device; render the adjusted audio data into two or more loudspeaker gains to drive two or more loudspeakers; and output the adjusted audio data to the two or more loudspeakers for playback.

According to clause 60, a method includes: receiving, at a device and via wireless transmission, audio data representing a sound field; selectively decompressing the audio data based on a determination of whether the audio data includes compressed audio data or uncompressed audio data; adjusting the audio data to alter the sound field based on data associated with at least one of a translation or an orientation associated with movement of the device; rendering the adjusted audio data into two or more loudspeaker gains to drive two or more loudspeakers; and outputting the adjusted audio data to the two or more loudspeakers for playback.

According to clause 61, a non-transitory computer-readable medium includes instructions that, when executed by one or more processors of a device, cause the one or more processors to: receive, via wireless transmission, audio data representing a sound field; selectively decompress the audio data based on a determination of whether the audio data includes compressed audio data or uncompressed audio data; adjust the audio data to alter the sound field based on data associated with at least one of a translation or an orientation associated with movement of the device; render the adjusted audio data into two or more loudspeaker gains to drive two or more loudspeakers; and output the adjusted audio data to the two or more loudspeakers for playback.

According to clause 62, an apparatus includes: means for receiving, at a device and via wireless transmission, audio data representing a sound field; means for selectively decompressing the audio data based on a determination of whether the audio data includes compressed audio data or uncompressed audio data; means for adjusting the audio data to alter the sound field based on data associated with at least one of a translation or an orientation associated with movement of the device; means for rendering the adjusted audio data into two or more loudspeaker gains to drive two or more loudspeakers; and means for outputting the adjusted audio data to the two or more loudspeakers for playback.

According to Clause 63, a device includes: one or more processors configured to: receive, via wireless transmission from a playback device, data associated with a pose of the playback device; select, based on the data, a particular representation of a sound field from a plurality of representations of the sound field, each respective representation of the sound field corresponding to a different sector of a set of sectors, wherein a sector represents a range of values associated with movement of the playback device; generate audio data corresponding to the selected representation of the sound field; and send, via wireless transmission, the audio data as streaming data to the playback device.

Clause 64 includes the device of Clause 63, wherein the plurality of representations of the sound field include ambisonics data.

Clause 65 includes the device of Clause 63 or Clause 64, wherein the plurality of representations of the sound field include pre-rotated sound fields.

Clause 66 includes the device of any of Clause 63 to Clause 65, wherein the plurality of representations of the sound field include pre-rendered stereo data.

Clause 67 includes the device of any of Clause 63 to Clause 66, wherein the one or more processors are configured to select the particular representation based on a predicted pose of the playback device.

Clause 68 includes the device of Clause 67, wherein the one or more processors are configured to determine the predicted pose based on a time series of pose data received from the playback device.

Clause 69 includes the device of Clause 67, wherein the one or more processors are configured to receive the predicted pose from the playback device.

Clause 70 includes the device of any of Clause 63 to Clause 69, wherein the one or more processors are configured to: select the particular representation further based on a reference pose of the playback device; and update the reference pose based on the pose of the playback device.

Clause 71 includes the device of Clause 70, wherein the one or more processors are configured to update the reference pose based on receiving a reference reset instruction.

Clause 72 includes the device of any of Clause 63 to Clause 71, wherein the one or more processors are configured to select the particular representation of the sound field to have a different audio format than an audio format of a prior representation of the sound field based on a change of an orientation of the playback device exceeding a threshold.

Clause 73 includes the device of any of Clause 63 to Clause 72, wherein the sectors of the set of sectors include overlapping sectors that correspond to overlapping viewport fields of view.

Clause 74 includes the device of any of Clause 63 to Clause 72, wherein the sectors of the set of sectors are non-overlapping sectors.

Clause 75 includes the device of any of Clause 63 to Clause 74, wherein the selected representation corresponds to a first representation of the sound field corresponding to a first sector, and wherein the one or more processors are further configured to: receive, from the playback device, second data associated with a second pose of the playback device; select, based on the second data, a second representation of the sound field from the plurality of representations of the sound field, the second representation corresponding to a second sector of the set, wherein the second sector partially overlaps the first sector; generate second audio data corresponding to the second representation of the sound field; and send, via wireless transmission, the second audio data to the playback device.

Clause 76 includes the device of any of any of Clause 63 to Clause 74, wherein the selected representation corresponds to a first representation of the sound field corresponding to a first sector, and wherein the one or more processors are further configured to: receive, from the playback device, second data associated with a second pose of the playback device; select, based on the second data, a second representation of the sound field from the plurality of representations of the sound field, the second representation corresponding to a translation of the sound field; generate second audio data corresponding to the second representation of the sound field; and send, via wireless transmission, the second audio data to the playback device.

Clause 77 includes the device of Clause 76, wherein the translation of the sound field corresponds to a translation of the playback device between the first pose and the second pose.

Clause 78 includes the device of Clause 76, wherein the translation of the sound field exceeds a translation of the playback device between the first pose and the second pose.

Clause 79 includes the device of any of Clause 63 to Clause 78, further including a memory coupled to the one or more processors and configured to store the plurality of representations of the sound field.

Clause 80 includes the device of any of Clause 63 to Clause 79, wherein the one or more processors are integrated in a portable electronic device.

Clause 81 includes the device of any of Clause 63 to Clause 80, wherein the one or more processors are integrated in a server.

Clause 82 includes the device of any of Clause 63 to Clause 81, further including a modem configured to modulate the audio data for transmission to the playback device.

Clause 83 includes the device of Clause 82, further including an antenna coupled to the modem and configured to transmit the modulated audio data to the playback device.

According to Clause 84, a method includes: receiving, at a device via wireless transmission from a playback device, data associated with a pose of the playback device; selecting, based on the data, a particular representation of a sound field from a plurality of representations of the sound field, each respective representation of the sound field corresponding to a different sector of a set of sectors, wherein a sector represents a range of values associated with movement of the playback device; generating, at the device, audio data corresponding to the selected representation of the sound field; and sending, via wireless transmission, the audio data as streaming data from the device to the playback device.

Clause 85 includes the method of Clause 84, wherein the plurality of representations of the sound field include ambisonics data.

Clause 86 includes the method of Clause 84 or Clause 85, wherein the plurality of representations of the sound field include pre-rotated sound fields.

Clause 87 includes the method of any of Clause 84 to Clause 86, wherein the plurality of representations of the sound field include pre-rendered stereo data.

Clause 88 includes the method of any of Clause 84 to Clause 87, wherein the one or more processors are configured to select the particular representation based on a predicted pose of the playback device.

Clause 89 includes the device of Clause 88, wherein the one or more processors are configured to determine the predicted pose based on a time series of pose data received from the playback device.

Clause 90 includes the device of Clause 88, wherein the one or more processors are configured to receive the predicted pose from the playback device.

According to Clause 91, a non-transitory computer-readable storage medium stores instructions that, when executed by one or more processors, cause the one or more processors to: receive, via wireless transmission from a playback device, data associated with a pose of the playback device; select, based on the data, a particular representation of a sound field from a plurality of representations of the sound field, each respective representation of the sound field corresponding to a different sector of a set of sectors, wherein a sector represents a range of values associated with movement of the playback device; generate audio data corresponding to the selected representation of the sound field; and send, via wireless transmission, the audio data as streaming data to the playback device.

According to Clause 92, an apparatus includes: means for receiving, via wireless transmission from a playback device, data associated with a pose of the playback device; means for selecting, based on the data, a particular representation of a sound field from a plurality of representations of the sound field, each respective representation of the sound field corresponding to a different sector of a set of sectors, wherein a sector represents a range of values associated with movement of the playback device; means for generating audio data corresponding to the selected representation of the sound field; and means for sending, via wireless transmission, the audio data as streaming data to the playback device.

According to Clause 93, a device includes one or more processors configured to receive, via wireless transmission from a streaming device, audio data corresponding to a first representation of a sound field, the first representation corresponding to a first sector that represents a first range of values associated with a first pose of the device; output the audio data to two or more loudspeakers; send, to the streaming device, data associated with a second pose of the device; receive updated audio data from the streaming device, the updated audio data corresponding to a second representation of the sound field, and the second representation corresponding to a second sector that represents a second range of values associated with a second pose of the device; and output the updated audio data to the two or more loudspeakers.

According to Clause 94, a method includes receiving, at a device and via wireless transmission from a streaming device, audio data corresponding to a first representation of a sound field, the first representation corresponding to a first sector that represents a first range of values associated with a first pose of the device; outputting the audio data to two or more loudspeakers; sending, to the streaming device, data associated with a second pose of the device; receiving updated audio data from the streaming device, the updated audio data corresponding to a second representation of the sound field, and the second representation corresponding to a second sector that represents a second range of values associated with a second pose of the device; and outputting the updated audio data to the two or more loudspeakers.

According to Clause 95, a non-transitory computer-readable storage medium stores instructions that, when executed by one or more processors of a device, cause the one or more processors to: receive, via wireless transmission from a streaming device, audio data corresponding to a first representation of a sound field, the first representation corresponding to a first sector that represents a first range of values associated with a first pose of the device; output the audio data to two or more loudspeakers; send, to the streaming device, data associated with a second pose of the device; receive updated audio data from the streaming device, the updated audio data corresponding to a second representation of the sound field, and the second representation corresponding to a second sector that represents a second range of values associated with a second pose of the device; and output the updated audio data to the two or more loudspeakers.

According to Clause 96, an apparatus includes means for receiving, at a device and via wireless transmission from a streaming device, audio data corresponding to a first representation of a sound field, the first representation corresponding to a first sector that represents a first range of values associated with a first pose of the device; means for outputting the audio data to two or more loudspeakers; means for sending, to the streaming device, data associated with a second pose of the device; means for receiving updated audio data from the streaming device, the updated audio data corresponding to a second representation of the sound field, and the second representation corresponding to a second sector that represents a second range of values associated with a second pose of the device; and means for outputting the updated audio data to the two or more loudspeakers.

According to Clause 97, a device includes: one or more processors configured to: receive, via wireless transmission from a streaming device, encoded ambisonics audio data representing a sound field; perform decoding of the ambisonics audio data to generate decoded ambisonics audio data, the decoding of the ambisonics audio data including base layer decoding of a base layer of the encoded ambisonics audio data and selectively including enhancement layer decoding in response to an amount of movement of the device; adjust the decoded ambisonics audio data to alter the sound field based on data associated with at least one of a translation or an orientation associated with the movement of the device; and output the adjusted decoded ambisonics audio data to two or more loudspeakers for playback.

Clause 98 includes the device of Clause 97, wherein the one or more processors are further configured to perform the enhancement layer decoding based on the amount of movement being less than a threshold amount and to refrain from performing the enhancement layer decoding based on the amount of movement not being less than the threshold amount.

Clause 99 includes the device of Clause 97 or Clause 98, wherein the one or more processors are further configured to send, to the streaming device and based on the amount of movement, a message to refrain from sending enhancement layer audio data.

Clause 100 includes the device of any of Clause 97 to Clause 99, wherein the amount of movement corresponds to an amount of predicted movement, and wherein the one or more processors are further configured to send, to the streaming device and based on the amount of predicted movement, a message to refrain from sending enhancement layer audio data for a particular duration.

Clause 101 includes the device of Clause 100, wherein the one or more processors are further configured to determine the particular duration based on a prediction of when the amount of movement of the device will be less than a threshold amount.

Clause 102 includes the device of any of Clause 97 to Clause 101, wherein the ambisonics audio data includes one or more enhancement layers of the encoded ambisonics audio data, and wherein selectively including the enhancement layer decoding in response to the amount of movement of the device includes: determining a threshold ambisonics order based on the amount of movement; decoding any of the one or more enhancement layers that corresponds to an ambisonics order less than the threshold ambisonics order; and refraining from decoding any of the one or more enhancement layers that corresponds to an ambisonics order greater than or equal to the threshold ambisonics order.

Clause 103 includes the device of any of Clause 97 to Clause 102, wherein the one or more processors are further configured to: obtain data, at a plurality of time instances, associated with a tracking location and an orientation associated with the movement of the device; and send the data to the streaming device via wireless transmission, wherein an amount of enhancement layer audio data received in the encoded ambisonics audio data from the streaming device corresponds to the amount of movement of the device.

Clause 104 includes the device of any of Clause 97 to Clause 103, wherein the base layer includes zeroth order ambisonics data and is devoid of any ambisonics data of higher order than zeroth order.

Clause 105 includes the device of any of Clause 97 to Clause 104, wherein the one or more processors are further configured to: perform the base layer decoding using a base layer decoder; and perform the enhancement layer decoding using at least a first enhancement layer decoder corresponding to a first enhancement layer of the encoded ambisonics audio data.

Clause 106 includes the device of Clause 105, wherein the encoded ambisonics audio data includes: first order ambisonics data in the base layer; and higher order ambisonics data in the first enhancement layer, and wherein the first enhancement layer decoder is configured to decode the higher order ambisonics data.

Clause 107 includes the device of Clause 105, wherein the encoded ambisonics audio data includes: first order ambisonics data in the base layer; higher order ambisonics data of one or more higher orders in the first enhancement layer; and additional higher order ambisonics data of one or more additional higher orders in a second enhancement layer, and wherein the one or more processors are further configured to perform the enhancement layer decoding using a second enhancement layer decoder that is configured to decode the additional higher order ambisonics data.

Clause 108 includes the device of any of Clause 97 to Clause 107, wherein the encoded ambisonics audio data includes: mixed order ambisonics data including a partial set of coefficients of an ambisonics order in the base layer; and additional ambisonics data in the enhancement layer, the additional ambisonics data including one or more coefficients of the ambisonics order that are omitted from the base layer.

Clause 109 includes the device of any of Clause 97 to Clause 108, wherein the one or more processors are integrated in a headphone device.

Clause 110 includes the device of Clause 109, wherein the headphone device further includes: a memory configured to store instructions executable by the one or more processors; one or more sensors configured to generate data corresponding to a pose of the device; a first loudspeaker configured to be positioned proximate to a first ear of a user while the headphone device is worn by the user; a second loudspeaker configured to be positioned proximate to a second ear of the user while the headphone device is worn by the user; and a modem configured to demodulate received wireless transmission data to generate the encoded ambisonics audio data.

According to Clause 111, a method includes: receiving, at a device via wireless transmission from a streaming device, encoded ambisonics audio data representing a sound field; performing, at the device, decoding of the ambisonics audio data to generate decoded ambisonics audio data, the decoding of the ambisonics audio data including base layer decoding of a base layer of the encoded ambisonics audio data and selectively including enhancement layer decoding in response to an amount of movement of the device; adjusting, at the device, the decoded ambisonics audio data to alter the sound field based on data associated with at least one of a translation or an orientation associated with the movement of the device; and output the adjusted decoded ambisonics audio data from the device to two or more loudspeakers for playback.

Clause 112 includes the method of Clause 111, further including performing the enhancement layer decoding based on the amount of movement being less than a threshold amount and refraining from performing the enhancement layer decoding based on the amount of movement not being less than the threshold amount.

Clause 113 includes the method of Clause 111 or Clause 112, further including sending, from the device to the streaming device and based on the amount of movement, a message to refrain from sending enhancement layer audio data.

Clause 114 includes the method of any of Clause 111 to Clause 113, wherein the amount of movement corresponds to an amount of predicted movement, further including sending, from the device to the streaming device and based on the amount of predicted movement, a message to refrain from sending enhancement layer audio data for a particular duration.

Clause 115 includes the method of Clause 114, wherein further including determining the particular duration based on a prediction of when the amount of movement of the device will be less than a threshold amount.

Clause 116 includes the method of any of Clause 111 to Clause 115, wherein the ambisonics audio data includes one or more enhancement layers of the encoded ambisonics audio data, and wherein selectively including the enhancement layer decoding in response to the amount of movement of the device includes: determining a threshold ambisonics order based on the amount of movement; decoding any of the one or more enhancement layers that corresponds to an ambisonics order less than the threshold ambisonics order; and refraining from decoding any of the one or more enhancement layers that corresponds to an ambisonics order greater than or equal to the threshold ambisonics order.

Clause 117 includes the method of any of Clause 111 to Clause 116, further including: obtaining data, at a plurality of time instances, associated with a tracking location and an orientation associated with the movement of the device; and sending the data to the streaming device via wireless transmission, wherein an amount of enhancement layer audio data received in the encoded ambisonics audio data from the streaming device corresponds to the amount of movement of the device.

Clause 118 includes the method of any of Clause 111 to Clause 117, wherein the base layer includes zeroth order ambisonics data and is devoid of any ambisonics data of higher order than zeroth order.

Clause 119 includes the method of any of Clause 111 to Clause 118, wherein further including: performing the base layer decoding using a base layer decoder; and performing the enhancement layer decoding using at least a first enhancement layer decoder corresponding to a first enhancement layer of the encoded ambisonics audio data.

Clause 120 includes the method of Clause 119, wherein the encoded ambisonics audio data includes: first order ambisonics data in the base layer; and higher order ambisonics data in the first enhancement layer, and wherein the first enhancement layer decoder is configured to decode the higher order ambisonics data.

Clause 121 includes the method of Clause 119, wherein the encoded ambisonics audio data includes: first order ambisonics data in the base layer; higher order ambisonics data of one or more higher orders in the first enhancement layer; and additional higher order ambisonics data of one or more additional higher orders in a second enhancement layer, further including performing the enhancement layer decoding using a second enhancement layer decoder that is configured to decode the additional higher order ambisonics data.

Clause 122 includes the method of any of Clause 111 to Clause 121, wherein the encoded ambisonics audio data includes: mixed order ambisonics data including a partial set of coefficients of an ambisonics order in the base layer; and additional ambisonics data in the enhancement layer, the additional ambisonics data including one or more coefficients of the ambisonics order that are omitted from the base layer.

Clause 123 includes the method of any of Clause 111 to Clause 122, wherein the device is integrated in a headphone device.

According to Clause 124, a non-transitory computer-readable storage medium stores instructions that, when executed by one or more processors, cause the one or more processors to: receive, via wireless transmission from a streaming device, encoded ambisonics audio data representing a sound field; perform decoding of the ambisonics audio data to generate decoded ambisonics audio data, the decoding of the ambisonics audio data including base layer decoding of a base layer of the encoded ambisonics audio data and selectively including enhancement layer decoding in response to an amount of movement of the device; adjust the decoded ambisonics audio data to alter the sound field based on data associated with at least one of a translation or an orientation associated with the movement of the device; and output the adjusted decoded ambisonics audio data to two or more loudspeakers for playback.

Clause 125 includes the non-transitory computer-readable storage medium of Clause 124, wherein the instructions, when executed by the one or more processors, further cause the one or more processors to perform the enhancement layer decoding based on the amount of movement being less than a threshold amount and to refrain from performing the enhancement layer decoding based on the amount of movement not being less than the threshold amount.

According to Clause 126, an apparatus includes: means for receiving, via wireless transmission from a streaming device, encoded ambisonics audio data representing a sound field; means for performing decoding of the ambisonics audio data to generate decoded ambisonics audio data, the decoding of the ambisonics audio data including base layer decoding of a base layer of the encoded ambisonics audio data and selectively including enhancement layer decoding in response to an amount of movement of the device; means for adjusting the decoded ambisonics audio data to alter the sound field based on data associated with at least one of a translation or an orientation associated with the movement of the device; and means for outputting the adjusted decoded ambisonics audio data to two or more loudspeakers for playback.

According to Clause 127, a device includes one or more processors configured to receive, via wireless transmission from a playback device, data associated with movement of the playback device; generate a frame of encoded ambisonics audio data that includes a base layer encoding of a sound scene, wherein the frame selectively includes at least one enhancement layer encoding of the sound scene based on an amount of the movement of the playback device; and send the frame of encoded ambisonics audio data to the playback device.

According to Clause 128, a method includes receiving, via wireless transmission from a playback device, data associated with movement of the playback device; generating a frame of encoded ambisonics audio data that includes a base layer encoding of a sound scene, wherein the frame selectively includes at least one enhancement layer encoding of the sound scene based on an amount of the movement of the playback device; and sending the frame of encoded ambisonics audio data to the playback device.

According to Clause 129, a non-transitory computer-readable storage medium stores instructions that, when executed by one or more processors, cause the one or more processors to receive, via wireless transmission from a playback device, data associated with movement of the playback device; generate a frame of encoded ambisonics audio data that includes a base layer encoding of a sound scene, wherein the frame selectively includes at least one enhancement layer encoding of the sound scene based on an amount of the movement of the playback device; and send the frame of encoded ambisonics audio data to the playback device.

According to Clause 130, an apparatus includes means for receiving, via wireless transmission from a playback device, data associated with movement of the playback device; means for generating a frame of encoded ambisonics audio data that includes a base layer encoding of a sound scene, wherein the frame selectively includes at least one enhancement layer encoding of the sound scene based on an amount of the movement of the playback device; and means for sending the frame of encoded ambisonics audio data to the playback device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The foregoing techniques may be performed with respect to any number of different contexts and audio ecosystems. A number of example contexts are described below, although the techniques should not be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based on one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed includes an audio ecosystem that may include broadcast recording audio objects, professional audio systems, consumer on-device capture, ambisonics audio data format, on-device rendering, consumer audio, TV, and accessories, and car audio systems.

The broadcast recording audio objects, the professional audio systems, and the consumer on-device capture may all code their output using ambisonics audio format. In this way, the audio content may be coded using the ambisonics audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.).

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a sound field. For instance, the mobile device may acquire a sound field via the wired and/or wireless acquisition devices and/or the on-device surround sound capture (e.g., a plurality of microphones integrated into the mobile device). The mobile device may then code the acquired sound field into the ambisonics coefficients for playback by one or more of the playback elements. For instance, a user of the mobile device may record (acquire a sound field of) a live event (e.g., a meeting, a conference, a play, a concert, etc.), and code the recording into ambisonics coefficients.

The mobile device may also utilize one or more of the playback elements to playback the ambisonics coded sound field. For instance, the mobile device may decode the ambisonics coded sound field and output a signal to one or more of the playback elements that causes the one or more of the playback elements to recreate the sound field. As one example, the mobile device may utilize the wired and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D sound field and playback the same 3D sound field at a later time. In some examples, the mobile device may acquire a 3D sound field, encode the 3D sound field into ambisonics, and transmit the encoded 3D sound field to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of ambisonics signals. For instance, the one or more DAWs may include ambisonics plugins and/or tools which may be configured to operate with (e.g., work with) one or more game audio systems. In some examples, the game studios may output new stem formats that support ambisonics audio data. In any case, the game studios may output coded audio content to the rendering engines which may render a sound field for playback by the delivery systems.

The techniques may also be performed with respect to exemplary audio acquisition devices. For example, the techniques may be performed with respect to an Eigen microphone which may include a plurality of microphones that are collectively configured to record a 3D sound field. In some examples, the plurality of microphones of the Eigen microphone may be located on the surface of a substantially spherical ball with a radius of approximately 4 cm.

Another exemplary audio acquisition context may include a production truck which may be configured to receive a signal from one or more microphones, such as one or more Eigen microphones. The production truck may also include an audio encoder.

The mobile device may also, in some instances, include a plurality of microphones that are collectively configured to record a 3D sound field. In other words, the plurality of microphone may have X, Y, Z diversity. In some examples, the mobile device may include a microphone which may be rotated to provide X, Y, Z diversity with respect to one or more other microphones of the mobile device. The mobile device may also include an audio encoder.

Example audio playback devices that may perform various aspects of the techniques described in this disclosure are further discussed below. In accordance with one or more techniques of this disclosure, speakers and/or sound bars may be arranged in any arbitrary configuration while still playing back a 3D sound field. Moreover, in some examples, headphone playback devices may be coupled to a decoder via either a wired or a wireless connection. In accordance with one or more techniques of this disclosure, a single generic representation of a sound field may be utilized to render the sound field on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a sound field may be utilized to render the sound field on any of the foregoing playback environments. Additionally, the techniques of this disclosure enable a rendered to render a sound field from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D sound field of the sports game may be acquired (e.g., one or more Eigen microphones may be placed in and/or around the baseball stadium), HOA coefficients corresponding to the 3D sound field may be obtained and transmitted to a decoder, the decoder may reconstruct the 3D sound field based on the HOA coefficients and output the reconstructed 3D sound field to a renderer, the renderer may obtain an indication as to the type of playback environment (e.g., headphones), and render the reconstructed 3D sound field into signals that cause the headphones to output a representation of the 3D sound field of the sports game.

It should be noted that various functions performed by the one or more components of the systems and devices disclosed herein are described as being performed by certain components. This division of components is for illustration only. In an alternate implementation, a function performed by a particular component may be divided amongst multiple components. Moreover, in an alternate implementation, two or more components may be integrated into a single component or module. Each component may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, circuits, and algorithm steps described in connection with the implementations disclosed herein may be implemented as electronic hardware, computer software executed by a processing device such as a hardware processor, or combinations of both. Various illustrative components, blocks, configurations, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM)), or any other form of non-transient storage medium known in the art. An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:
one or more processors configured to:
receive, via a wireless link, an indication of motion from a playback device;
select, based on a bandwidth associated with the playback device, a remaining portion of uncompressed ambisonic coefficients, after a high-resolution portion of the uncompressed ambisonic coefficients are discarded based on a number of sound sources of a particular portion of a sound field, the particular portion based on a playback device orientation that is associated with the motion of the playback device; and
send audio data as streaming data via the wireless link to the playback device, wherein the audio data includes the remaining portion of the uncompressed ambisonic coefficients.

2. The device of claim 1, wherein the one or more processors are configured to discard the high-resolution portion of the uncompressed ambisonic coefficients based on a received request for a particular ambisonic order from the playback device.

3. The device of claim 1, wherein the one or more processors are configured to select between sending compressed audio data or uncompressed audio data based on whether the one or more processors receive over the wireless link, from the playback device, an indication that a playback latency exceeds a latency threshold.

4. The device of claim 1, wherein the one or more processors are configured to discard the high-resolution portion of the uncompressed ambisonic coefficients based on a received request for a particular ambisonic order from the playback device to reduce a processing load at the playback device.

5. The device of claim 1, wherein the one or more processors are configured to:
determine whether the wireless link to the playback device corresponds to a higher-bandwidth wireless link or to a lower-bandwidth wireless link; and
select the uncompressed ambisonic coefficients based on the wireless link corresponding to the higher-bandwidth wireless link.

6. The device of claim 5, wherein the higher-bandwidth wireless link corresponds to a fifth generation (5G) cellular digital network or a WiFi-type network.

7. The device of claim 1, wherein the one or more processors are configured to:
determine whether the wireless link to the playback device corresponds to a higher-bandwidth wireless link or to a lower-bandwidth wireless link; and
select the remaining portion of the uncompressed ambisonic coefficients based on the wireless link corresponding to the lower-bandwidth wireless link.

8. The device of claim 7, wherein the lower-bandwidth wireless link corresponds to a BLUETOOTH network.

9. The device of claim 1, wherein the one or more processors are configured to:
receive, from the playback device, via the wireless link a request for the uncompressed ambisonic coefficients or for the remaining portion of the uncompressed ambisonic coefficients; and
select the uncompressed ambisonic coefficients, or the remaining portion of the uncompressed ambisonic coefficients, based on the request.

10. The device of claim 1, wherein the bandwidth corresponds to the wireless link from the device to the playback device.

11. The device of claim 10, wherein the selection, of the remaining portion of the uncompressed ambisonic coefficients, includes selection of progressively lower orders of ambisonic coefficients to discard the uncompressed ambisonic coefficients until a combined size of the remaining portion of the ambisonic coefficients is sufficiently small to enable transmission of the remaining ambisonic coefficients via the wireless link to the playback device.

12. The device of claim 1, wherein the one or more processors are configured to discard the uncompressed ambisonic coefficients other than first order coefficients.

13. The device of claim 1, wherein the indication of the motion indicates an actual or predicted amount of motion of the playback device and is based on data corresponding to a location and an orientation associated with the playback device.

14. The device of claim 1, wherein the indication of the motion from the playback device is based on translation data corresponding to a translation associated with the playback device.

15. The device of claim 1, wherein the one or more processors are integrated in a portable electronic device, and the device is the portable electronic device.

16. The device of claim 1, wherein the one or more processors are integrated in a server, and the device is the server.

17. The device of claim 1, further comprising a modem configured to modulate the audio data for transmission, via the wireless link, to the playback device.

18. The device of claim 17, further comprising an antenna coupled to the modem and configured to transmit, via the wireless link, the modulated audio data to the playback device.

19. A method comprising:
receiving, via a wireless link, an indication of motion from a playback device;
selecting, based on a bandwidth associated with the playback device, a remaining portion of uncompressed ambisonic coefficients, after a high-resolution portion of the uncompressed ambisonic coefficients are discarded based on a number of sound sources of a particular portion of a sound field, the particular portion based on a playback device orientation that is associated with the motion of the playback device; and
sending audio data as streaming data via the wireless link to the playback device, wherein the audio data includes the remaining portion of the uncompressed ambisonic coefficients.

20. The method of claim 19, wherein the discarded high-resolution portion of the uncompressed ambisonic coefficients is based on a received request for a particular ambisonic order from the playback device.

21. The method of claim 19, wherein the a selection between sending compressed audio data or uncompressed audio data is based on receiving, over the wireless link, from the playback device, an indication that a playback latency exceeds the latency threshold.

22. The method of claim 19, further comprising:
determining whether the wireless link to the playback device corresponds to a higher-bandwidth wireless link or to a lower-bandwidth wireless link; and
selecting the uncompressed ambisonic coefficients based on the wireless link corresponding to the higher-bandwidth wireless link.

23. The method of claim 19, further comprising:
determining whether the wireless link to the playback device corresponds to a higher-bandwidth wireless link or to a lower-bandwidth wireless link; and
selecting the remaining portion of the uncompressed ambisonic coefficients after the high-resolution portion of the uncompressed ambisonic coefficients are discarded based on the wireless link corresponding to the lower-bandwidth wireless link.

24. The method of claim 19, further comprising discarding the high-resolution portion of the uncompressed ambisonic coefficients based on a received request for a particular ambisonic order.

25. The method of claim 19, further comprising discarding the uncompressed ambisonic coefficients other than first order coefficients.

26. An apparatus comprising:
means for receiving, via a wireless link, an indication of motion from a playback device;
means for selecting, based on a bandwidth associated with the playback device, a remaining portion of uncompressed ambisonic coefficients after a high-resolution portion of the uncompressed ambisonic coefficients are discarded based on a number of sound sources of a particular portion of a sound field, the particular portion based on a playback device orientation that is associated with the motion of the playback device; and
means for sending audio data as streaming data via the wireless link to the playback device, wherein the audio data includes the remaining portion of the uncompressed ambisonic coefficients.

27. A non-transitory computer-readable medium comprising instructions that, when executed by one or more processors, cause the one or more processors to:
receive, via a wireless link, an indication of motion from a playback device;
select, based on a bandwidth associated with the playback device, a remaining portion of uncompressed ambisonic coefficients, after a high-resolution portion of the uncompressed ambisonic coefficients are discarded based on a number of sound sources of a particular portion of a sound field, the particular portion based on a playback device orientation that is associated with the motion of the playback device; and
send audio data as streaming data via the wireless link to the playback device, wherein the audio data includes the remaining portion of the uncompressed ambisonic coefficients.

* * * * *